(12) United States Patent
Nguyen et al.

(10) Patent No.: US 11,591,275 B2
(45) Date of Patent: Feb. 28, 2023

(54) SMART RELEASE POTASH FERTILIZER GRANULES

(71) Applicant: RYNAN TECHNOLOGIES PTE LTD, Singapore (SG)

(72) Inventors: My T. Nguyen, Tra Vinh (VN); Hoa V. Tran, Tra Cu District (VN); Man M. Ly, Tran De District (VN); Van T. Kim, Tra Vinh (VN); Nhien H. Le, Can Tho (VN); Na Thach, Tra Cu District (VN); Sony T. Vo, Cang Long District (VN); Vinh Q. Nguyen, Tieu Can District (VN)

(73) Assignee: RYNAN TECHNOLOGIES PTE LTD, Paya Lebar Square (SG)

( * ) Notice: Subject to any disclaimer, the term of this patent is extended or adjusted under 35 U.S.C. 154(b) by 251 days.

(21) Appl. No.: 16/961,919

(22) PCT Filed: Feb. 6, 2019

(86) PCT No.: PCT/CA2019/050152
§ 371 (c)(1),
(2) Date: Jul. 13, 2020

(87) PCT Pub. No.: WO2019/153078
PCT Pub. Date: Aug. 15, 2019

(65) Prior Publication Data
US 2021/0139388 A1    May 13, 2021

Related U.S. Application Data

(60) Provisional application No. 62/628,633, filed on Feb. 9, 2018.

(51) Int. Cl.
*C05G 3/30* (2020.01)
*C05G 5/30* (2020.01)
(Continued)

(52) U.S. Cl.
CPC ............... *C05G 3/44* (2020.02); *C05D 1/005* (2013.01); *C05F 11/10* (2013.01); *C05G 1/00* (2013.01); *C05G 3/30* (2020.02); *C05G 5/37* (2020.02)

(58) Field of Classification Search
None
See application file for complete search history.

(56) References Cited

U.S. PATENT DOCUMENTS

| 3,502,458 | A | 3/1970 | Schenk |
| 4,019,890 | A | 4/1977 | Fujita et al. |

(Continued)

FOREIGN PATENT DOCUMENTS

| CN | 101500410 A1 | 8/2009 |
| CN | 101875584 A | 11/2010 |

(Continued)

OTHER PUBLICATIONS

Varadachari et al., "Slow-release and Controlled-release Nitrogen Fertilizers", ING Bulletins on Regional Assessment of Reactive Nitrogen, 2010, Bulletin No. 11, (Ed. Bijay Singh), SCON-ING, New Delhi, pp. i-iv & 1-42.

(Continued)

*Primary Examiner* — Wayne A Langel
(74) *Attorney, Agent, or Firm* — Brian C. Trinque; Lathrop GPM LLP

(57) ABSTRACT

There is provided a smart release potash fertilizer granule comprising a potash core; an extended release layer covering the potash core, wherein the extended release layer comprises water-swellable copolymeric nanoparticles and at least one water-soluble organic acid or water-soluble organic carboxylate salt; a controlled release layer covering the extended release layer, wherein the controlled release layer comprises water-swellable copolymeric nanoparticles; and (Continued)

an anticaking layer covering the controlled release layer, wherein the anticaking layer comprises water-insoluble copolymeric nanoparticles.

22 Claims, 15 Drawing Sheets

(51) Int. Cl.
*C05D 1/00* (2006.01)
*C05F 11/10* (2006.01)
*C05G 1/00* (2006.01)
*C05G 3/40* (2020.01)

(56) References Cited

U.S. PATENT DOCUMENTS

| | | |
|---|---|---|
| 4,657,576 A | 4/1987 | Lambie |
| 4,851,027 A | 7/1989 | Murayama et al. |
| 4,880,455 A | 11/1989 | Blank |
| 5,089,041 A | 2/1992 | Thompson et al. |
| 6,187,074 B1 | 2/2001 | Von Locquenghien et al. |
| 7,267,707 B2 | 9/2007 | Rosenthal et al. |
| 8,764,873 B2 | 7/2014 | Nevin |
| 2012/0272700 A1 | 11/2012 | Nevin |
| 2015/0239790 A1 | 8/2015 | Iwig et al. |
| 2018/0346659 A1* | 12/2018 | Miller ............ C05D 9/02 |
| 2020/0352161 A1* | 11/2020 | Sumerlin ............ C05G 5/37 |

FOREIGN PATENT DOCUMENTS

| | | |
|---|---|---|
| CN | 102822122 A | 12/2012 |
| CN | 102942415 A1 | 2/2013 |
| CN | 104355874 A | 2/2015 |
| CN | 101875584 A | 11/2020 |
| EP | 0848906 A1 | 6/1998 |
| WO | WO 1997/07676 A1 | 3/1997 |
| WO | 2007041234 A2 | 4/2007 |
| WO | 2017/161101 A1 | 9/2017 |

OTHER PUBLICATIONS

Dong et al., "Humic acids buffer the effects of urea on soil ammonia oxidizers and potential nitrification", Soil Biol Biochem., Aug. 2009, 41(8): 1612-1621.

Sempeho et al., "Meticulous Overview on the Controlled Release Fertilizers", Advances in Chemistry, vol. 2014, Article ID 363071, 16 pages.

* cited by examiner

SMART RELEASE POTASH FERTILIZER GRANULES

CROSS REFERENCE TO RELATED APPLICATIONS

This application is a 35 U.S.C. § 371 filing of International Application No. PCT/CA2019/050152, filed Feb. 6, 2019, which claims benefit, under 35 U.S.C. § 119(e), of U.S. provisional application Ser. No. 62/628,633, filed on Feb. 9, 2018.

FIELD OF THE INVENTION

The present invention relates to smart release potash fertilizer granules. More specifically, the present invention is concerned with potash fertilizer granules in which the potash release can be timed and the potash release rate can be controlled according to the needs of the plants to be fertilized.

BACKGROUND OF THE INVENTION

Potassium (K) is second only to nitrogen in terms of plant nutrient requirements. It plays a critical role in the control and regulation of various minerals, promotion of meristematic tissue, water retention and rooting. In addition, potassium also activates plant enzymes to enhance respiration and photosynthesis. Potassium is known as the "health element" because it reduces susceptibility to abiotic and biotic stresses, such as cold, heat, drought and disease to keep plants healthy.

Muriate of Potash (MOP), also called potassium chloride (KCl), is a naturally occurring mineral created by the evaporation of ancient seabeds. It is the most common potassium source used in agriculture fertilizers, accounting for about 95% of all potash fertilizers used worldwide. Conventionally, potash fertilizers contain mainly potassium chloride often together with other potassium salts. Of note, no matter which potassium salts a potash fertilizer contains, it is customary to report its potassium content as $K_2O$ equivalent (that is, how much $K_2O$ would be present in the fertilizer if all the potassium salts were in $K_2O$ form) to ease comparison between different fertilizers using different types of potash.

Fertilizers are commonly identified using the NPK rating system. This system describes the amount of nitrogen, phosphorus, and potassium in a given fertilizer. NPK ratings consist of three numbers separated by dashes (e.g., 10-10-10 or 16-4-8) describing the chemical content of fertilizers. The first number represents the weight percentage of nitrogen in the product. The second number represents the weight percentage of phosphorus, expressed as $P_2O_5$ in the product. Lastly, the third number represents the weight percentage of potassium, expressed as $K_2O$ in the product. For example, a 50-kilogram bag of fertilizer labeled 16-4-8 contains:

8 kg of nitrogen (16% of the 50 kg),
  an amount of phosphorus equivalent to that in 2 kg of $P_2O_5$ (4% of the 50 kg), and
  an amount of potassium equivalent to that in 4 kg of $K_2O$ (8% of the 50 kg).

A pure KCl fertilizer would be labeled 0-0-63. A typically potash fertilizer may have a NPK rating of 0-0-35 to 0-0-63 for example.

Potash fertilizers are commonly manufactured using compaction granulation that produce irregularly shaped granules with sharp edges. Different grades of potassium fertilizers are commercially available on the market with a granular size range of 0.8 mm to 5.0 mm.

Potash fertilizers are very soluble in water and the potassium cation is unfortunately poorly retained in soil with low cation exchange capacity due to the lack of electrostatic attraction necessary for potassium retention. A large amount of potassium is thus lost in farming, mainly due to leaching and water runoff. The loss of potassium is typically more important in sandy sods.

The use of polymer coated potash fertilizers for reducing the loss of potassium in farming is known in the prior arts. U.S. Pat. No. 5,089,041 taught to encapsulate potassium containing fertilizers with poly(vinylidene chloride) latex by spray coating in a fluidized bed system with an air flow rate between 1 and 6 cubic meters per hour per gram of water to be removed from said coating at a temperature between 35 and 60° C.

U.S. Pat. No. 7,267,707 taught to encapsulate potassium containing fertilizers with polyurethane by reacting polyether polyol and reactive compounds containing isocyanato functional group by using a rotational drum coating system.

Controlled release fertilizers, which were coated with water based emulsion copolymers, are also known in the prior arts. Chinese patent CN101875584 taught to prepare water based emulsion copolymers comprising methyl acrylate as a hard monomer, n-butyl acrylate as a soft monomer, methacrylic acid, acrylic acid or acrylamide as functional monomers, and trimethoxy vinyl silane as an unsaturated siloxane compound coating agent. The copolymers with different molar ratios of the mentioned monomers were synthesized by using sodium dodecyl sulfonate as surfactant, potassium persulfate as polymerization initiator, baking soda as pH buffering agent, propylene glycol-aziridine and aziridine-zinc oxide as a crosslinking agent. However, the presence of unsaturated siloxane compound, such as trimethoxy vinyl silane caused precipitation of large amounts of particles during polymerization.

Chinese patent CN104355874 from the same inventors taught to overcome this precipitation problem by using saturated siloxane compounds, such as hexamethyl cyclotrisiloxane, octamethyl cyclotetrasiloxane, dimethyl cyclic siloxane, and the mixture thereof. The preferred saturated siloxane compound was octamethylcyclotetrasiloxane. The purpose for using siloxane compounds in these two patents was mainly to prevent the controlled release fertilizer granules from sticking together.

The production of polymer coated potash fertilizers from commonly manufactured potash fertilizer granules, that have an irregular shape, conventionally requires thick polymeric layers to achieve encapsulation, i.e. to avoid incomplete surface coverage and to prolong the release of the potassium cation to the soil. Such practice raises the production costs and requires long time for decomposition of the leftover polymeric shell after harvest.

Various plants have growth periods of various lengths during which their potassium need may vary. For example, okra plants require potassium in the first 5 weeks, 100-days rice varieties need potassium in the first two months, while sugarcanes uptake large amount of potassium four months after ratoons are placed in the soil. Some plants may need more potassium earlier during their growth periods, or later during their growth periods, or their potassium need may remain the same all along. For conventional fertilizers, with which potassium is quickly released and then quickly lost to leaching and water runoff, this means that potash fertilizers may need to be applied several times and in different quantities during the growth periods of the plants.

SUMMARY OF THE INVENTION

In accordance with the present invention, there is provided:
1. A smart release potash fertilizer granule comprising:
   a potash core;
   an extended release layer covering the potash core, wherein the extended release layer comprises water-swellable copolymeric nanoparticles and at least one water-soluble organic acid or water-soluble organic carboxylate salt;
   a controlled release layer covering the extended release layer, wherein the controlled release layer comprises water-swellable copolymeric nanoparticles; and
   an anticaking layer covering the controlled release layer, wherein the anticaking layer comprises water-insoluble copolymeric nanoparticles.
2. The fertilizer granule of claim 1, wherein the potash core comprises one or more of potassium carbonate, potassium bicarbonate, potassium chloride, potassium sulfate, potassium magnesium sulfate, potassium nitrate, potassium sodium nitrate, potassium orthophosphate, potassium polyphosphate, potassium metaphosphate, potassium oxide, and potassium hydroxide.
3. The fertilizer granule of claim 1 or 2, wherein the potash core comprises one or more of potassium chloride, potassium nitrate, potassium oxide, and potassium sulfate, preferably two or more of these in admixture together.
4. The fertilizer granule of any one of claims 1 to 4, wherein the potash core mainly comprises potassium chloride and, optionally, one or more other water-soluble potassium salts, oxide and hydroxide, such as potassium nitrate, potassium oxide, or potassium sulfate.
5. The fertilizer granule of any one of claims 1 to 4, wherein the potash core has a NPK rating of 0-0-35 or more, preferably of about 0-0-61 or more.
6. The fertilizer granule of any one of claims 1 to 5, wherein the potash core is of the shape of a conventional, uncoated, potash granule commercially sold for use as a fertilizer.
7. The fertilizer granule of any one of claims 1 to 6, wherein the potash core is an irregularly shaped potash granule with sharp edges.
8. The fertilizer granule of any one of claims 1 to 7, wherein the potash core is of the size of a conventional, uncoated, potash granule commercially sold for use as a fertilizer.
9. The fertilizer granule of any one of claims 1 to 8, wherein the potash core ranges from about 0.8 mm to about 5.0 mm in size, preferably from about 1.5 mm to about 4.0 mm in size.
10. The fertilizer granule of any one of claims 1 to 9, wherein the potash core is a conventional, uncoated, potash granule commercially sold for use as a fertilizer.
11. The fertilizer granule of any one of claims 1 to 10, wherein the organic acid or the organic carboxylate salt is a phosphorus solubilizer or a plant hormone.
12. The fertilizer granule of any one of claims 1 to 11, wherein the organic acid or the organic carboxylate salt is a phosphorus solubilizer
13. The fertilizer granule of any one of claims 1 to 11, wherein the organic acid or the organic carboxylate salt is a plant hormone.
14. The fertilizer granule of claim 11 or 12, wherein the phosphorus solubilizer is citric acid, lauric acid, alkyl sulfuric acid, wherein the alkyl group is preferably a linear or branched alkyl chain with 4 to 24 carbon atoms (preferably lauryl sulfuric acid), oxalic acid, or gluconic acid, or a salt thereof.
15. The fertilizer granule of any one of claim 12, 12, or 14, wherein the phosphorus solubilizer is citric acid, gluconic acid, or oxalic acid or a salt therefor, or an alkyl sulfuric acid salt.
16. The fertilizer granule of claim 14 or 15, wherein the alkyl sulfuric acid salt is sodium alkyl sulfate or potassium alkyl sulfate.
17. The fertilizer granule of claim 11 or 13, wherein the plant hormone is a plant growth hormone or a plant immune hormone.
18. The fertilizer granule of any one of claims 11, 13 and 17, wherein the plant hormone is:
    abscisic acid;
    an auxin, including:
        native auxins such as indole-3-acetic acid, 4-chloroindole-3-acetic acid, 2-phenylacetic acid, indole-3-butanoic acid, and indole-3-propanoic acid, and
        synthetic auxins such as 1-naphthaleneacetic acid, 2,4,5-trichlorophenoxyacetic acid, 2,4-dichlorophenoxyacetic acid, 4-chlorophenoxyacetic acid, 2-methoxy-3,6-dichlorobenzoic acid, 4-nitrobenzoic acid, 2-hydroxybenzoic acid, 4-chlorobenzoic acid, 2,4-dichlorobenzoic acid, 2,4,5,-trichlorobenzoic acid, and 4-amino-3,5,6-trichloropicolinic acid;
    a gibberellin,
    gluconic acid,
    salicylic acid;
    jasmonic acid;
    oxalic acid;
    citric acid; or
    pipecolic acid,
    or a salt thereof.
19. The fertilizer granule of claim 18, wherein the gibberellin is GA1, gibberellic acid (GA3), GA4, GA5, GA6, GA7, GA13, or a salt thereof, and preferably gibberellic acid or a salt thereof.
20. The fertilizer granule of any one of claims 11, 13, and 17 to 19, wherein the plant hormone is 1-naphthalene acetic acid, 2,4,5-trichlorobenzoic acid, 2,4,5-trichlorophenoxyacetic acid, 2,4-dichlorobenzoic acid, 2,4-dichlorophenoxyacetic acid, 2-hydroxybenzoic acid, 4-chlorobenzoic acid, 4-chlorophenoxyacetic acid, 4-nitrobenzoic acid, abscisic acid, citric acid, gibberellic acid, gibberellin A13, gibberellin A3, gibberellin A4, gluconic acid, indole-3-acetic acid, indole-3-butanoic acid, oxalic acid, or salicylic acid, or a salt thereof.
21. The fertilizer granule of any one of claims 11, 13, and 17 to 20, wherein the plant hormone is 1-naphthalene acetic acid, 4-chlorophenoxyacetic acid, abscisic acid, citric acid, gibberellic acid, gibberellin A3, gluconic acid, indole-3-acetic acid, indole-3-butanoic acid, oxalic acid, or salicylic acid, or a salt thereof.
22. The fertilizer granule of any one of claims 11, 13, and 17 to 21, wherein the plant hormone is 1-naphthalene acetic acid, 4-chlorophenoxyacetic acid, 4-nitrobenzoic acid, gibberellic acid, gibberellin A3, gluconic acid, indole-3-acetic acid, oxalic acid, salicylic acid, or citric acid, or a salt thereof.
23. The fertilizer granule of any one of claims 11, 13, and 17 to 22, wherein the plant hormone is 1-naphthalene acetic acid or gibberellic acid, or a salt thereof.

24. The fertilizer granule of any one of claims 1 to 23, wherein the extended release layer comprises the organic carboxylate salt.
25. The fertilizer granule of any one of claims 1 to 24, wherein the organic carboxylate salt is an alkaline carboxylate salt or alkaline earth carboxylate salt, and most preferably a sodium, potassium, or calcium carboxylate salt, preferably an alkaline carboxylate salt, and more preferably a sodium or potassium carboxylate salt.
26. The fertilizer granule of any one of claims 1 to 25, wherein the extended release layer comprises about 30 wt % or more, about 35 wt % or more, about 40 wt % or more, about 45 wt % or more, or about 50 wt % or more; and/or about 70 wt % or less, about 65 wt % or less, about 60 wt % or less, about 55 wt % or less, or about 50 wt % or less of the organic acid or the organic carboxylate salt, based on the weight of the extended release layer.
27. The fertilizer granule of any one of claims 1 to 26, wherein the extended release layer comprises about 30 wt % or more, about 35 wt % or more, about 40 wt % or more, about 45 wt % or more, or about 50 wt % or more; and/or about 70 wt % or less, about 65 wt % or less, about 60 wt % or less, about 55 wt % or less, or about 50 wt % or less of the water-swellable copolymeric nanoparticles, based on the weight of the extended release layer.
28. The fertilizer granule of any one of claims 1 to 27, wherein the extended release layer comprises 50 wt % of the organic acid or the organic carboxylate salt, based on the weight of the extended release layer.
29. The fertilizer granule of any one of claims 1 to 28, wherein the extended release layer comprises about 50 wt % of the water-swellable copolymeric nanoparticles based on the weight of the extended release layer.
30. The fertilizer granule of any one of claims 1 to 29, wherein the extended release layer has a coating weight between about 0.5 wt % and about 10 wt % preferably between about 1 wt % and about 5 wt %, and more preferably between about 1.0 wt % and about 3.0 wt %, based on the weight of the potash core.
31. The fertilizer granule of any one of claims 1 to 30, wherein the copolymer making the water-swellable copolymeric nanoparticles comprised in the extended release layer comprises crosslinkable repeat units.
32. The fertilizer granule of any one of claims 1 to 31, wherein the copolymer making the water-swellable copolymeric nanoparticles comprised in the extended release layer has a glass transition temperature between about 18 and about 25° C.
33. The fertilizer granule of any one of claims 1 to 32, wherein the copolymer making the water-swellable copolymeric nanoparticles comprised in the extended release layer is of formula (I):

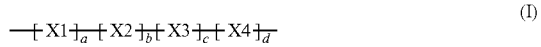  (I)

wherein:
X1 represents styrene repeat units;
X2 represents alkyl acrylate or alkyl methacrylate repeat units;
X3 represents alkoxy dialkyl vinylsilane, dialkoxy alkyl vinylsilane, or trialkoxy vinylsilane repeat units;
X4 represents acrylic acid, methacrylic acid, acrylamide, methacrylamide, vinyl phosphoric acid, or N,N-dimethylaminoethyl methacrylamide repeat units; and
a, b, c and d represents the weight percent of repeat units X1, X2, X3, and X4, respectively, based on the total weight of the copolymer, and each vary between about 0.5 wt % and about 50 wt %,
wherein the X3 repeat units are optionally crosslinked with each other within the nanoparticles.
34. The fertilizer granule of claim 33, wherein some of the X3 repeat units are crosslinked with each other within the nanoparticles.
35. The fertilizer granule of claim 33 or 34, wherein up to about 3% of the X3 repeat unit are crosslinked.
36. The fertilizer granule of any one of claims 33 to 35, wherein the alkyl group of the alkyl acrylate or alkyl methacrylate repeat unit is butyl.
37. The fertilizer granule of any one of claims 33 to 36, wherein X2 represents alkyl acrylate, preferably butyl acrylate.
38. The fertilizer granule of any one of claims 33 to 37, wherein the alkoxy group of the alkoxy dialkyl vinylsilane, dialkoxy alkyl vinylsilane, or trialkoxy vinylsilane repeat units is ethoxy.
39. The fertilizer granule of any one of claims 33 to 38, wherein X3 represents trialkoxy vinylsilane, preferably triethoxy vinylsilane repeat units.
40. The fertilizer granule of any one of claims 33 to 39, wherein X4 represents acrylic acid, acrylamide, or vinyl phosphoric acid repeat units.
41. The fertilizer granule of any one of claims 33 to 40, wherein a is about 25 wt % or more, about 35 wt % or more, about 40 wt % or more, or about 45 wt % or more; and/or about 75 wt % or less, about 65 wt % or less, about 60 wt % or less, about 55 wt % or less, or about 50 wt % or less.
42. The fertilizer granule of any one of claims 33 to 41, wherein a is about 48 wt %.
43. The fertilizer granule of any one of claims 33 to 42, wherein b is about 25 wt % or more, about 35 wt % or more, about 40 wt % or more, or about 45 wt % or more; and/or about 75 wt % or less, about 65 wt % or less, about 60 wt % or less, about 55 wt % or less, or about 50 wt % or less.
44. The fertilizer granule of any one of claims 33 to 43, wherein b is about 48 wt %.
45. The fertilizer granule of any one of claims 33 to 44, wherein c is about 0.5 wt % or more, about 1 wt % or more, about 1.5 wt % or more, about 2 wt % or more, about 2.5 wt % or more; and/or about 15 wt % or less, about 10 wt % or less, about 7.5 wt % or less, about 5 wt % or less, about 4 wt % or less, or about 3.5 wt % or less.
46. The fertilizer granule of any one of claims 33 to 45, wherein c is about 3 wt %.
47. The fertilizer granule of any one of claims 33 to 46, wherein d is about 0.5 wt % or more, about 0.6 wt % or more, about 0.7 wt % or more, about 0.8 wt % or more, about 0.9 wt % or more; and/or about 10 wt % or less, about 5 wt % or less, about 3 wt % or less, about 2 wt % or less, or about 1.5 wt % or less.
48. The fertilizer granule of any one of claims 33 to 47, wherein d is about 1 wt %.
49. The fertilizer granule of any one of claims 33 to 48, wherein the copolymer of formula (I) has the following ideal chemical structure:

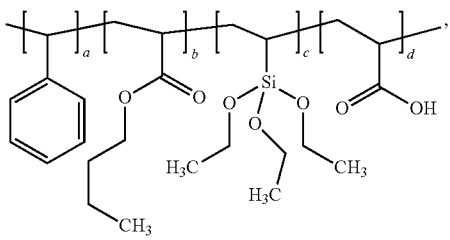

POLY-001

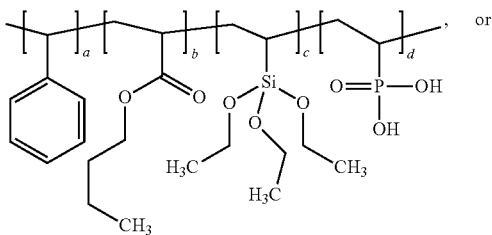

POLY-002

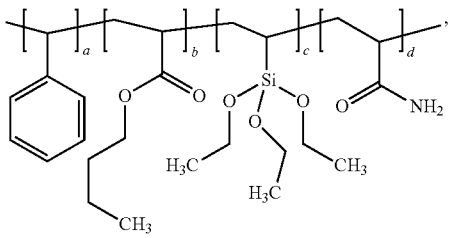

POLY-003 preferably wherein a, b, c and d are about 48 wt %, about 48 wt %, about 3 wt % and about 1 wt %, respectively, based on the total weight of the copolymer.

50. The fertilizer granule of any one of claims 1 to 49, wherein the controlled release layer has a coating weight between about 2 wt % and about 20 wt % preferably between about 4 wt % and about 15 wt %, and more preferably between about 5 wt % and about 10 wt % (based on the weight of the potash core).

51. The fertilizer granule of any one of claims 1 to 50, wherein the controlled release layer has a larger coating weight than the extended release layer.

52. The fertilizer granule of any one of claims 1 to 51, wherein the copolymer making the water-swellable copolymeric nanoparticles comprised in the controlled release layer comprises crosslinkable repeat units.

53. The fertilizer granule of any one of claims 1 to 52, wherein the copolymer making the water-swellable copolymeric nanoparticles comprised in the controlled release layer has a glass transition temperature between about 18° C. and about 25° C.

54. The fertilizer granule of any one of claims 1 to 53, wherein the copolymer making the water-swellable copolymeric nanoparticles comprised in the extended controlled layer is of formula (I) as defined in any one of claims 31 to 49.

55. The fertilizer granule of any one of claims 1 to 54, wherein the controlled release layer is free from the water-soluble organic acid or the water-soluble organic carboxylate salt.

56. The fertilizer granule of any one of claims 1 to 55, wherein the anticaking layer has a coating weight between about 1 wt % and about 10 wt %, preferably between about 2 wt % and about 5 wt % (based on the weight of the potash core).

57. The fertilizer granule of any one of claims 1 to 56, wherein the copolymer making the water-insoluble copolymeric nanoparticles has a glass transition temperature between about 35° C. and about 55° C.

58. The fertilizer granule of any one of claims 1 to 57, wherein the copolymer making the water-insoluble copolymeric nanoparticles optionally comprises, preferably does comprise, repeat units comprising a plant hormone or a phosphorus solubilizer covalently or ionically attached as a pendant group.

59. The fertilizer granule of claim 58, wherein the plant hormone or phosphorus solubilizer is:
a residue of an organic acid that is a plant hormone or a phosphorus solubilizer or
an organic carboxylate anion of an organic acid that is a plant hormone or a phosphorus solubilizer.

60. The fertilizer granule of claim 58 or 59, wherein the plant hormone or the phosphorus solubilizer is ionically attached as a pendant group to the copolymer making the water-insoluble copolymeric nanoparticles, and is an organic carboxylate anion of an organic acid that is a plant hormone or a phosphorus solubilizer.

61. The fertilizer granule of claim 58 or 59, wherein the plant hormone or the phosphorus solubilizer is covalently attached as a pendant group to the copolymer making the water-insoluble copolymeric nanoparticles and is a residue of an organic acid that is a plant hormone or a phosphorus solubilizer.

62. The fertilizer granule of any one of claims 59 to 61, wherein the organic acid that is a plant hormone or a phosphorus solubilizer is as defined in any one of claims 14 to 23.

63. The fertilizer granule of any one of claims 59 to 62, wherein the organic acid that is a plant hormone or a phosphorus solubilizer is gibberellic acid, indole-3-acetic acid, 1-naphthalene acetic acid, 2-naphthalene acetic acid, 4-nitrobenzoic acid, 4-chlorophenyloxyacetic acid, or salicylic acid.

64. The fertilizer granule of any one of claims 58 to 63, wherein the copolymer making the water-insoluble copolymeric nanoparticles is of formula (II):

(II)

wherein:
Y1 represents styrene repeat units;
Y2 represents alkyl acrylate or alkyl methacrylate repeat units;
Y3 represents said repeat units comprising said plant hormone or said phosphorus solubilizer covalently or ionically attached as a pendant group;
a and b represents the weight percent of repeat units Y1 and Y2, respectively, based on the total weight of the copolymer, and vary between about 10 wt % to about 95 wt %; and
c represents the weight percent of repeat units Y3, based on the total weight of the copolymer, and vary between 0 wt % to about 30 wt %.

65. The fertilizer granule of claim 64, wherein the alkyl group of the alkyl acrylate repeat units and the alkyl methacrylate repeat units are butyl.

66. The fertilizer granule of claim 64 or 65, wherein Y2 represents alkyl acrylate, preferably butyl acrylate.

67. The fertilizer granule of any one of claims 64 to 66, wherein a is about 20 wt % or more, about 25 wt % or more, about 30 wt % or more, about 35 wt % or more, about 39 wt % or more, or about 40 wt % or more; and/or about 65 wt % or less, about 60 wt % or less, about 55 wt % or less, about 50 wt % or less, about 46 wt % or less, or about 45 wt % or less.

68. The fertilizer granule of any one of claims 64 to 67, wherein, when c is 0 wt %, a is about 50 wt %.

69. The fertilizer granule of any one of claims 64 to 68, wherein, when c is greater than 0 wt %, a is between about 35 wt % and about 50 wt % and more preferably between about 39 wt % and about 46 wt %.

70. The fertilizer granule of any one of claims 64 to 59, wherein b is about 30 wt % or more, about 35 wt % or more, about 40 wt % or more, about 44 wt % or more, or about 45 wt % or more; and/or about 80 wt % or less, about 70 wt % or less, about 65 wt % or less, about 60 wt % or less, about 55 wt % or less, about 50 wt % or less, or about 49 wt % or less.

71. The fertilizer granule of any one of claims 64 to 70, wherein, when c is 0 wt %, b is about 50 wt %.

72. The fertilizer granule of any one of claims 64 to 71, wherein, when c is greater than 0 wt %, b is between about 40 wt % and about 50 wt %, and preferably between about 44 wt % and about 49 wt %.

73. The fertilizer granule of any one of claims 64 to 73, wherein c is about 0 wt % or more, about 1 wt % or more, about 2 wt % or more, about 3 wt % or more, about 4 wt % or more, or about 5 wt % or more; and/or about 30 wt % or less, about 25 wt % or less, about 20 wt % or less, about 17 wt % or less, about 15 wt % or less, about 12 wt % or less, or about 10 wt % or less.

74. The fertilizer granule of any one of claims 61 to 73, wherein c is 0 wt %.

75. The fertilizer granule of any one of claims 61 to 73, wherein c is greater than 0 wt %.

76. The fertilizer granule of any one of claims 61 to 75, wherein Y3 represents repeat units of formula (III):

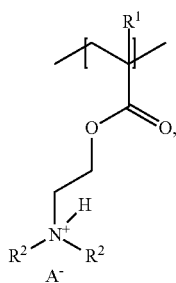

(III)

wherein:
$R^1$ is a hydrogen atom or methyl;
$R^2$ is the same or different $C_{1-6}$ alkyl; and
$A^-$ is a carboxylate anion of an organic acid that is a plant hormone or a phosphorus solubilizer.

77. The fertilizer granule of claim 76, wherein $R^1$ is methyl.

78. The fertilizer granule of claim 76 or 77, wherein both $R^2$ groups are methyl.

79. The fertilizer granule of any one of claims 76 to 78, wherein Y3 is a repeat unit obtained by polymerizing the following monomers:

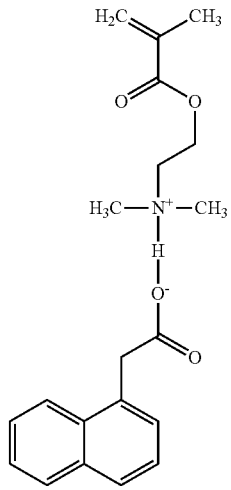

[2-(methacryloyloxy)ethyl]dimethyl-
ammonium 1-naphthaleneacetate
salt,

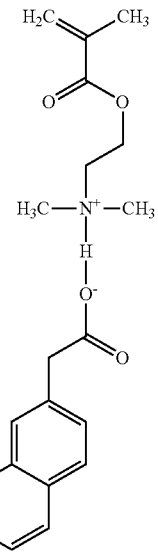

[2-(methacryloyloxy)ethyl]dimethyl-
ammonium 1-naphthaleneacetate
salt,

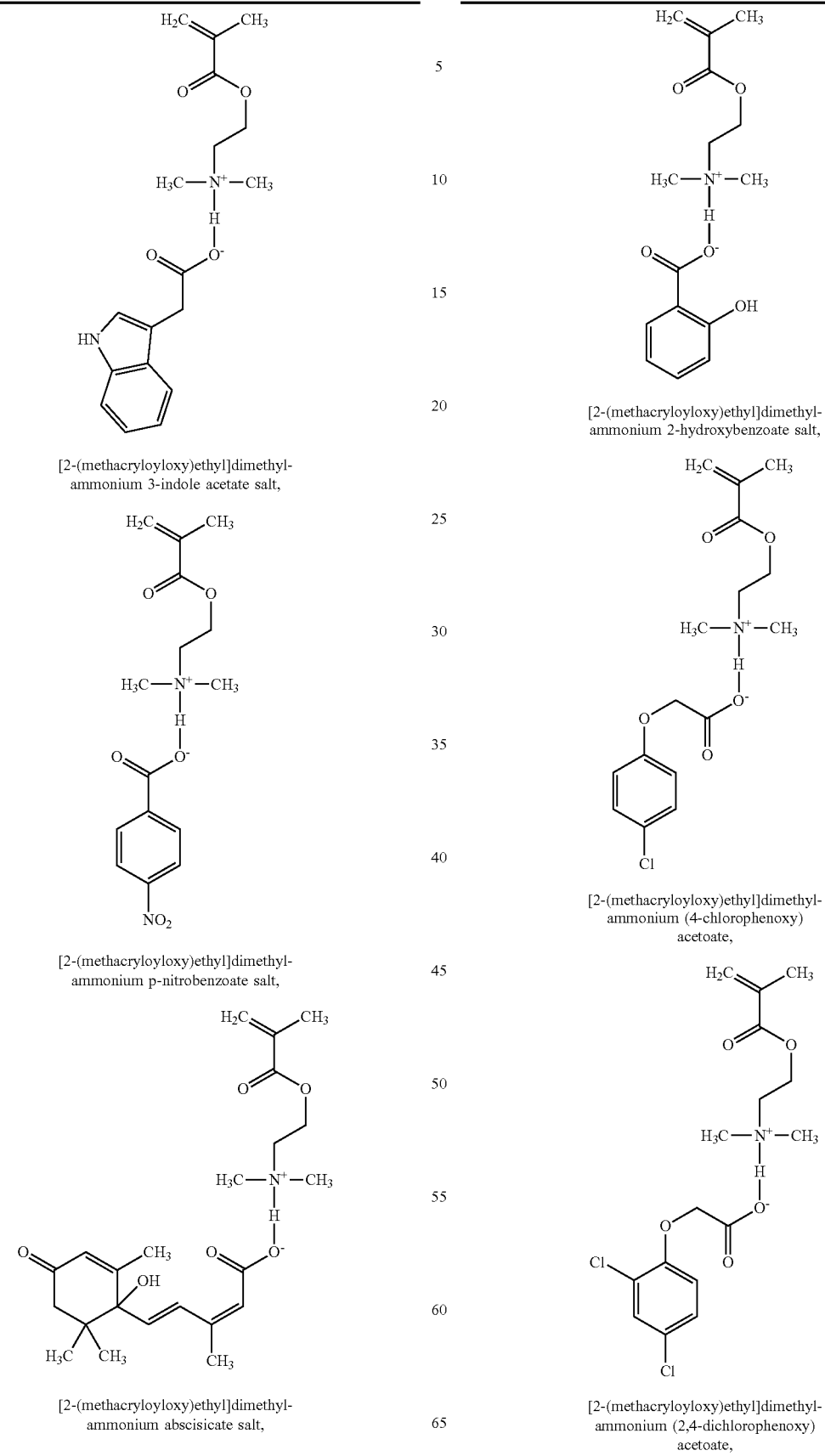

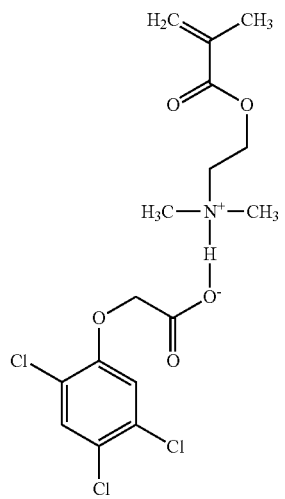
[2-(methacryloyloxy)ethyl]dimethyl-
ammonium (2,4,5-trichlorophenoxy)
acetoate,
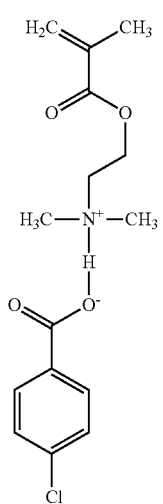
N-[2-(methacryloyloxy)ethyl]-4-
chlorobenzoate,
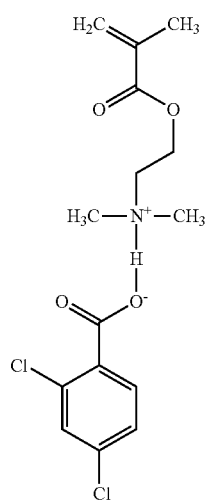
N-[2-(methacryloyloxy)ethyl]-2,4-
dichlorobenzoate,
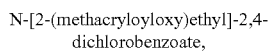
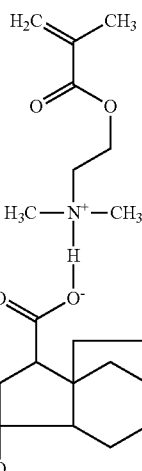
N-[2-(methacryloyloxy)ethyl]-2,4,5-
trichlorobenzoate,
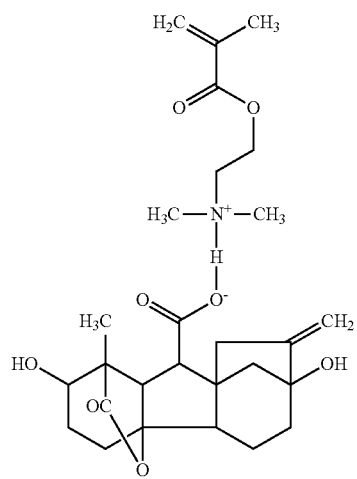
[2-(methacryloyloxy)ethyl]dimethyl-
ammonium Gibberellate salt (GA3),

[2-(methacryloyloxy)ethyl]dimethyl-
ammonium Gibberellate salt (GA4),
or

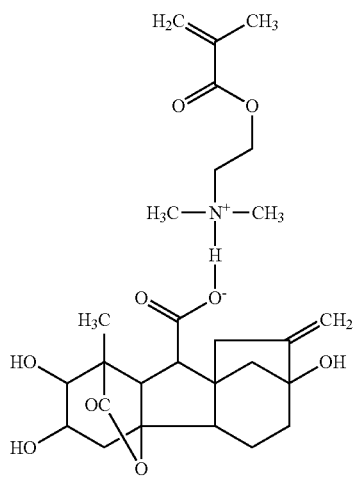

[2-(methacryloyloxy)ethyl]dimethyl-
ammonium Gibberellate salt
(GA13).

80. The fertilizer granule of any one of claims 64 to 79, wherein the copolymers of formula (II) has the following ideal chemical structure:

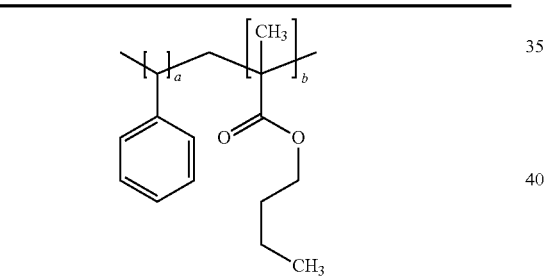

POLY-004,
preferably wherein a is about 50 wt % and
b is about 50 wt %,

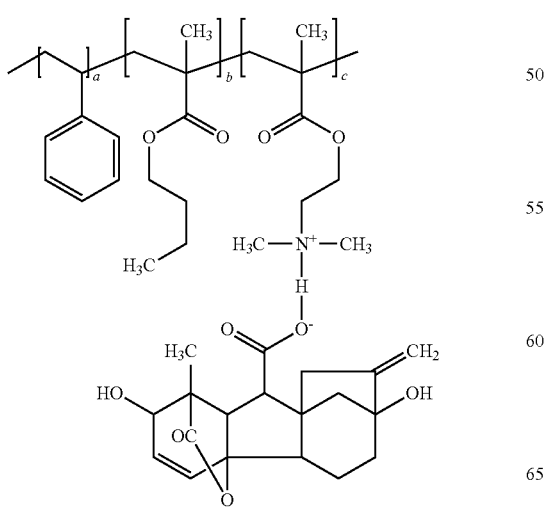

POLY-005/POLY-006,
preferably wherein a is about 44 wt %,
b is about 47 wt %, and c is about 9 wt %,
or wherein a is about 39 wt %,
b is about 44 wt %, and c is about 17 wt %,
more preferably wherein a is about 44 wt %,
b is about 47 wt %, and c is about 9 wt %,

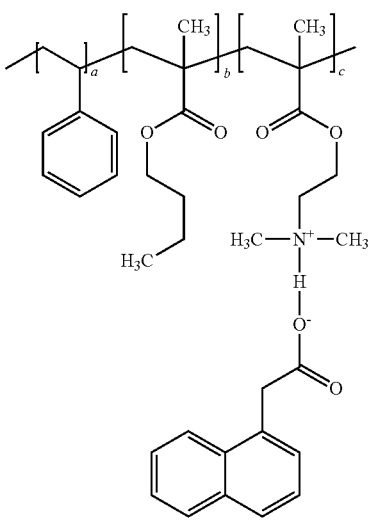

POLY-007/POLY-008,
preferably wherein a is about 46 wt %,
b is about 48 wt %, and c is about 6 wt %,
or wherein a is about 41 wt %,
b is about 47 wt %, and c is about 12 wt %,
more preferably wherein a is about 46 wt %,
b is about 48 wt %, and c is about 6 wt %,

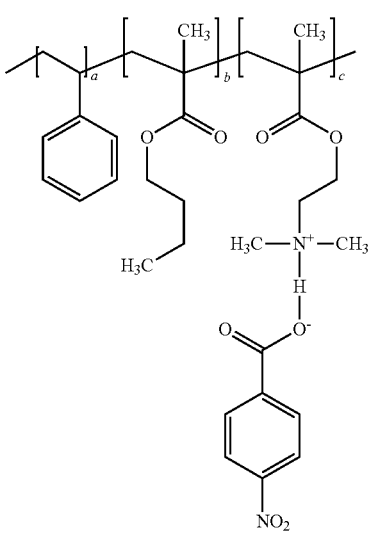

POLY-009,
preferably wherein a is about 46 wt %,
b is about 48 wt %, and c is about 6 wt %, -continued

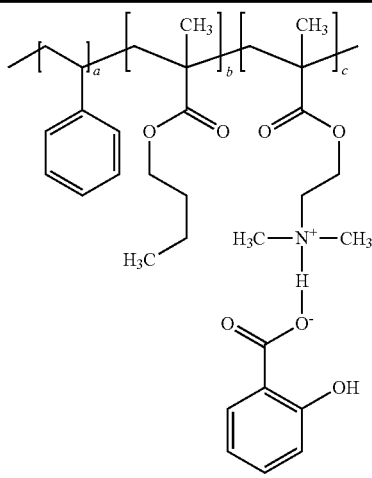

POLY-010,
preferably wherein a is about 46 wt %,
b is about 49 wt %, and c is about 5 wt %, or

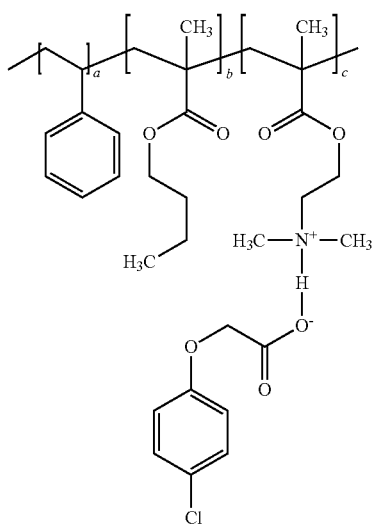

POLY-011,
preferably wherein a is about 46 wt %,
b is about 48 wt %, and c is about 6 wt %.

81. The fertilizer granule of any one of claims 64 to 75, wherein Y3 represents repeat units of formula (IV):

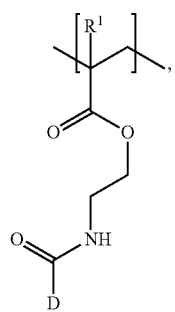

(IV)

wherein:

R$^1$ is a hydrogen atom or methyl;

D-C(=O)— is a residue of an organic acid that is a plant hormone or a phosphorus solubilizer.

82. The fertilizer granule of any one of claims 64 to 75 and 81, wherein the copolymer of formula (II) has the following ideal chemical structures:

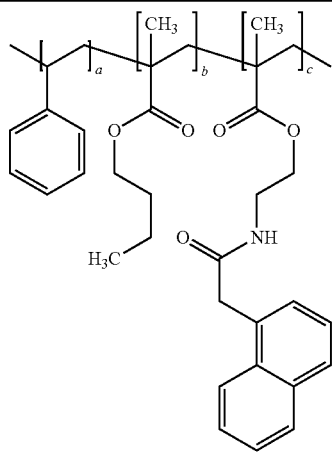

POLY-012,
preferably wherein a is about 47 wt %,
b is about 50 wt %, and c is about 3 wt %,

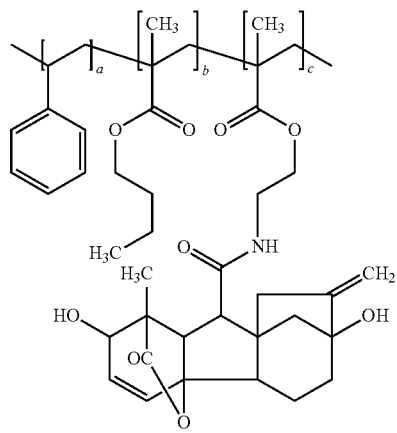

POLY-013,
preferably wherein a is about 47 wt %,
b is about 50 wt %, and c is about 3 wt %,

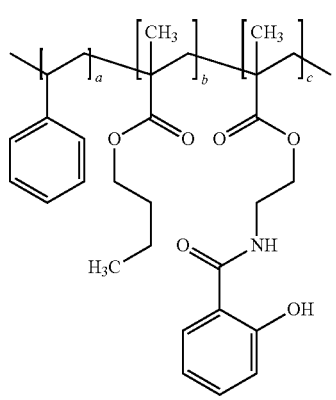

-continued

POLY-014,
preferably wherein a is about 47 wt %,
b is about 50 wt %, and c is about 3 wt %, or

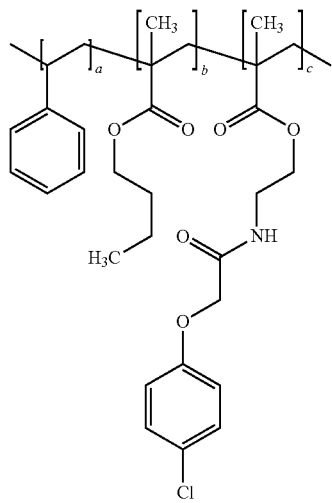

POLY-015,
preferably wherein a is about 47 wt %,
b is about 50 wt %, and c is about 3 wt %.

BRIEF DESCRIPTION OF THE DRAWINGS

In the appended drawings:

FIG. 19 b) shows the cumulative potassium release as a function of the days since application for the fertilizers of Examples 16-20 having an extended release layer (104) with a coating weight of b) 0 to 2 wt %;

FIG. 19 c) shows the cumulative potassium release as a function of the days since application for the fertilizers of Examples 16-20 having an extended release layer (104) with a coating weight of 2 to 5 wt %;

DETAILED DESCRIPTION OF THE INVENTION

Turning now to the invention in more details, there is provided a smart release potash fertilizer granule comprising:

a potash core;

an extended release layer covering the potash core, wherein the extended release layer comprises water-swellable copolymeric nanoparticles and at least one water-soluble organic acid or water-soluble organic carboxylate salt;

a controlled release layer covering the extended release layer, wherein the controlled release layer comprises water-swellable copolymeric nanoparticles; and an anticaking layer covering the controlled release layer, wherein the anticaking layer comprises water-insoluble copolymeric nanoparticles.

Figure 1:
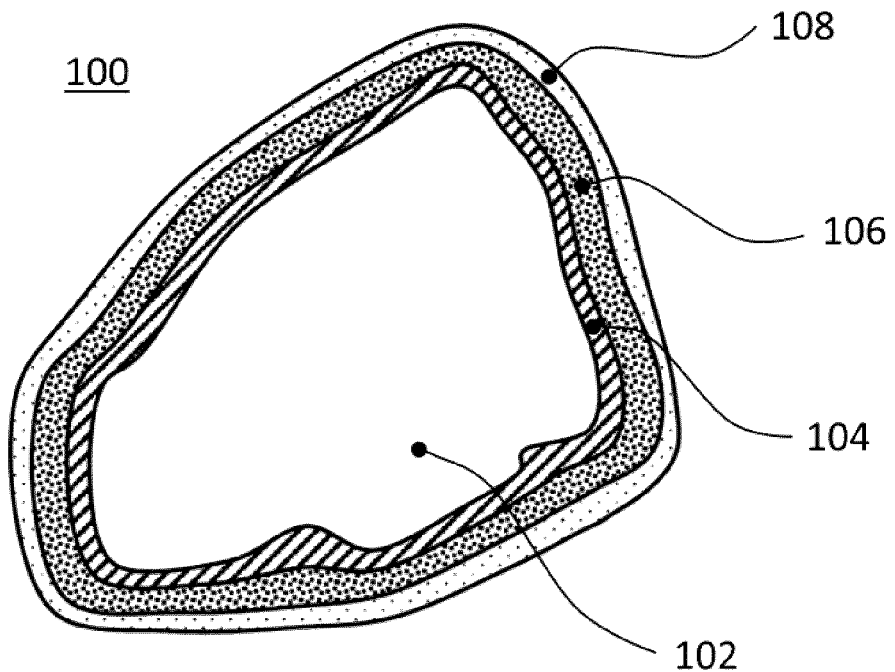
FIG. 1 is a cross-sectional scheme of a smart release potash fertilizer granule according to an embodiment of the invention.

FIG. 1 shows a cross-sectional scheme of the smart release potash fertilizer granule (100) according to an of the invention with a conventional irregularly shaped potash granule with sharp edges as the potash core (102). The potash core (102) is covered with the polymeric extended release layer (104), which is in turn covered by the polymeric controlled release layer (106), which is finally covered with the polymeric anticaking layer (108).

Figure 2:
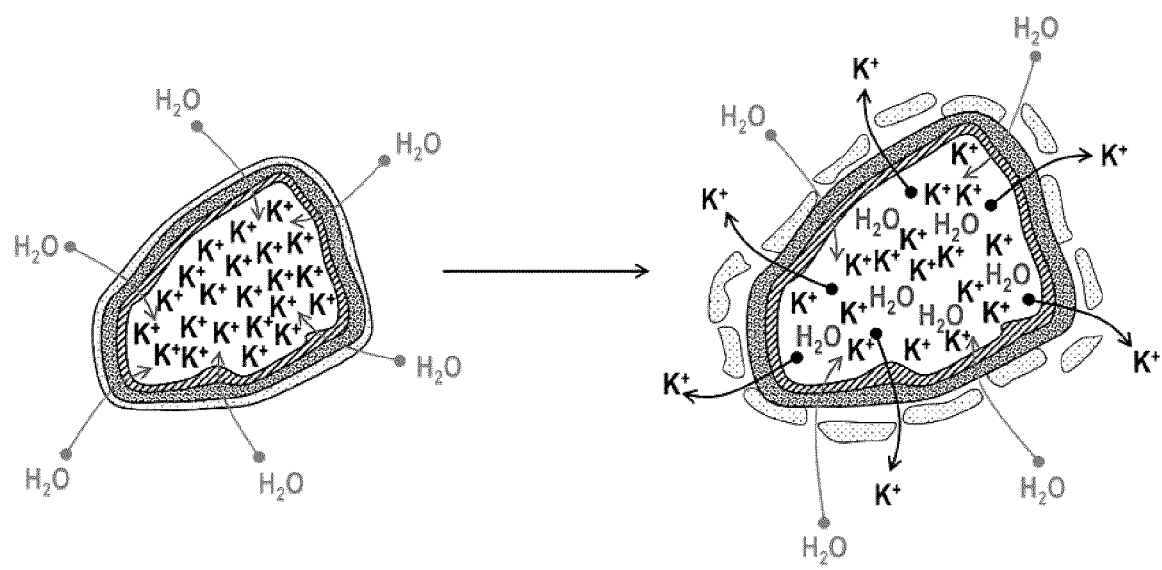
FIG. 2 shows the potassium release mechanism of the smart release potash fertilizer granule according to an embodiment of the invention.

When the smart release potash fertilizer granules are used (in fields, planting containers, etc.), water molecules from the surrounding environment (i.e. soil or another growing medium) will diffuse inward through the anticaking layer (108), then through the controlled release layer (106) and finally through the extended release layer (104). When coming into with the controlled release layer (106) and the extended release layer (104), the water will cause the water-swellable nanoparticles in these layers to swell, while the anticaking layer (108), which contains water-insoluble nanoparticles, will not swell. As a result, the anticaking layer (108) will become under pressure and eventually crack and detach from the granule. Once the anticaking layer (108) is cracked/detached, the water intake will increase. Water will reach the potash core where it will dissolve the potash. The resulting potash aqueous solution (comprising cations) will diffuse outward through the extended release layer (104) and the controlled release layer (106) to finally reach and fertilize the surrounding environment. This release mechanism is shown in FIG. 2.

One of the purposes of the anticaking layer is to prevent the smart release potash fertilizer granules from sticking to each other, especially in the presence of humidity and at temperatures above 30° C., for example during storage and transport. It will be clear from the above that another purpose of the anticaking layer is to delay water intake and potassium release. Indeed, these will be delayed until the anticaking layer cracks/detaches from the granule. Yet another purpose of the anticaking layer is to release a plant hormone or phosphorus solubilizer in the surrounding environment. Indeed, in embodiments in which the water-insoluble nanoparticles of the anticaking layer are made of a copolymer comprising repeat units having a plant hormone or phosphorus solubilizer covalently or ionically attached as a pendant group, this plant hormone or phosphorus solubilizer will be released in the environment.

It has been explained above that one of the purposes of the controlled release layer and extended release layer is to swell to crack/detach the anticaking layer. Another purpose of these layers is to control the potassium release rate and the timing of potassium release. For example, when the controlled release layer is thicker, the potassium release rate is slower. When the controlled release layer is thinner, the potassium release rate is faster. More specifically, for a thinner controlled release layer, the potassium release rate can initially (for example in the first 10 days) be much faster and can eventually slow, while remaining faster than the potassium release rate observed when the controlled release layer is thicker. See e.g. Examples 16-19.

Furthermore, for a given total thickness of the controlled release and extended release layers, changing the relative thickness of these layers may decrease or increase the potassium release rate. See e.g. Examples 16-25.

First, up to a certain point, increasing the thickness of the extended release layer while decreasing the thickness of the controlled release layer tends to slow the potassium release rate, especially the initial potassium release rate (for example in the first 10 days). It is believed that this effect may be due to the increasing amount of organic acid (contained in the extended release layer) in the granules because such organic acid slows potassium release—see below for more details.

Then, a point is reached where the potassium release rate is at a minimum (for example less than 10% of potassium released in 40 days).

From that point on, further increasing the thickness of the extended release layer while decreasing the thickness of the controlled release tends to increase the potassium release rate, especially the late potassium release rate (for example after 10 or 20 days).

Therefore, the relative thicknesses of the controlled release and extended release layers can be adjusted so the smart release potash fertilizer granules provide:

an overall slow potassium release rate;
a faster initial potassium release rate followed by a slower potassium release rate; or
a slower initial potassium release rate followed by a faster potassium release rate, depending on the nutrient needs of the crop/plant being fertilized. Hence, the smart release potash fertilizer granules may reduce or even eliminate the need to apply potassium fertilizers several times and/or in different quantities during the growth periods of the plants to be fertilized.

More specifically, the present inventors surprisingly discovered that, compared to granules comprising only a controlled release layer (comprising water-swellable copolymeric nanoparticles, but without organic acids or organic carboxylate anions), the inclusion of an extended release layer (comprising both water-swellable copolymeric nanoparticles and organic acids or organic carboxylate anions) slows potassium release. This effect can clearly be seen on FIG. 19 b), which shows the potassium release for granules with a constant total coating weight for the controlled+extended release layers of 10 wt % but with varying relative thicknesses for the extended and controlled release layers. Further, a comparison of FIGS. 18 and 19b) reveals that a granule with a controlled release layer with a coating weight of 9% and an extended release layer with a coating weight of 1 wt % releases potassium more slowly than a granule with a controlled release layer with a coating weight of 15 wt %. The relevant data are copied in the table below.

| Extended release layer coating weight | 0 wt % | 1 wt % | 2 wt % | 0 wt % |
|---|---|---|---|---|
| Controlled release layer coating weight | 10 wt % | 9 wt % | 8 wt % | 15 wt % |
| Total coating weight: controlled + extended release layers | 10 wt % | 10 wt % | 10 wt % | 15 wt % |
| Potassium release after 20 days | about 53% | about 11% | about 4% | about 17% |

Hence, the presence of the extended release layer allows to very significantly slow the potassium release with thinner overall coatings. Therefore, it is possible to coat irregularly shaped commercial potash granules with thinner polymeric coatings without increasing potassium release. This allows lower production costs and shorter decomposition times for the polymeric shells left in the field after complete potassium release.

Further, as noted above, when the relative thickness of the extended release layer further increases compared to the thickness of the controlled release layer (for a constant total coating weight of the controlled+extended release layers), the potassium release rate increases. This can be seen from FIG. 20, relevant data from which are copied in the table below.

| Extended release layer coating weight | 0 wt % | 5 wt % |
|---|---|---|
| Controlled release layer coating weight | 10 wt % | 5 wt % |
| Total coating weight: controlled + extended release layers | 10 wt % | 10 wt % |
| Potassium release after 40 days | about 54% | about 72% |

When a faster potassium release rate is desired, one could, of course, simply reduce the total coating weight of the controlled+extended release layers. However, the above noted effect means that this total coating weight can be further reduced, which again allows lower production costs and shorter decomposition times for the polymeric shells left in the field after complete potassium release.

As noted above, the smart release potash fertilizer granule comprises one or more plant hormones and/or or phosphorus solubilizers. These plant hormones and phosphorus solubilizers are comprised in the extended release layer. They may also be covalently or ionically attached to the copolymer forming the water-insoluble copolymeric nanoparticles of the anticaking layer.

These plant hormones and phosphorus solubilizers have two purposes. First, once delivered to the surrounding environment they act according to their nature, i.e. either as plant hormones, for example plant growth hormones (PGH) that stimulate plant growth and plant immune hormones (PIH) that stimulate resistance to biotic and abiotic stressors such as insects, or as phosphorus solubilizers that will increase nutrient use efficiency. Secondly, when these plant hormones and/or phosphorus solubilizers are organic acids or organic carboxylate anions and are located in the extended release layer, they are capable of forming a salt with potassium cations released from the potash core, and thus reduce the diffusion speed of potassium salt through the controlled release layer to the environment (probably because of increased steric hindrance). See Examples 30-35.

The present inventors also discovered that the release time of K to the soil is longer when the pKa of the organic acid was lower.

The location of the plant hormones and phosphorus solubilizers allows to time their release to surrounding environment. For example, plant hormones or phosphorus solubilizers covalently or ionically attached to the copolymer forming the water-insoluble copolymeric nanoparticles of the anticaking layer quickly come into contact with water, since the anticaking layer is at the surface of the smart release potash fertilizer granule. Therefore, they will tend to be released quickly. The plant hormones and phosphorus solubilizers comprised in the extended release layer are deeper in the granule and therefore will be released later at a time determined by the thickness/nature of the layers on the granules.

Herein, "covered" or "covering" as in "an extended release layer covering the potash core" means that the totality of the surface of the substrate (the potash core in this example) is covered by the layer (the extended release layer in this example).

Herein, "nanoparticles" are particles with an average particle size between about 40 nm and about 200 nm. Preferably, the nanoparticles have an average particle size of about 40 nm, about 50 nm, about 60 nm, about 70 nm, about 75 nm, or about 80 nm or more and/or an average particle size of about 200 nm, about 180 nm, about 160 nm, about 150 nm, about 140 nm, about 130 nm, about 125 nm, about 120 nm, about 115 nm, or about 110 nm or less. In preferred embodiments, the nanoparticles have an average particle size between about 75 nm and about 110 nm. The average particle size being measured in a dilute water solution using a particle size analyzer, for example a Brookhaven® NanoBrook® 173Plus.

Herein, "copolymeric nanoparticles" are nanoparticles made of a copolymer.

Herein, "water-swellable" nanoparticles are nanoparticles that, in the presence of water, absorb said water and swell, i.e. increase in volume.

Herein, "water-insoluble" nanoparticles are nanoparticles that do not significantly dissolve in water nor significantly swell in the presence of water.

Herein, the thickness of the extended release layer, controlled release layer, and anticaking layer is expressed as a coating weight calculated as follows:

$$\text{coating weight of a layer (wt \%)} = \frac{\text{weigth of the layer}}{\text{weight of the potash core}} * 100.$$

Potash Core

Herein, "potash" has its regular meaning in the art in fertilizers, that is: one or more water-soluble potassium salt, oxide and hydroxide, most often a mixture of such salts, oxide and/or hydroxide, conventionally used in potash fertilizers. Thus, a potash core is a core comprising one or more such water-soluble potassium salt, oxide and hydroxide.

Non-limiting examples of water-soluble potassium salts, oxide and hydroxide include those commonly found in conventional potash fertilizers, such as potassium carbonate ($K_2CO_3$), potassium bicarbonate ($KHCO_3$), potassium chloride (KCl), potassium sulfate ($K_2SO_4$), potassium magnesium sulfate ($K_2Mg(SO_4)_2$), potassium nitrate (KNOB), potassium sodium nitrate ($KNa(NO_3)_2$), potassium orthophosphate ($KH_2PO_4$), potassium polyphosphate ($K_4P_2O_7$), potassium metaphosphate ($KPO_3$), potassium oxide ($K_2O$), and potassium hydroxide (KOH). Preferred water-soluble potassium salts, oxide and hydroxide include potassium chloride, potassium nitrate, potassium oxide, and potassium sulfate, preferably two or more of these in admixture together. In preferred embodiments, the potash core comprises one or more of potassium chloride, potassium nitrate, potassium oxide, or potassium sulfate. In most preferred embodiments, the potash core mainly comprises potassium chloride (for example it comprises from about 50% to about 100% of KCl) and, optionally, one or more other water-soluble potassium salts, oxide and hydroxide such as potassium nitrate, potassium oxide, or potassium sulfate.

In preferred embodiments, the potash core has a NPK rating of 0-0-35 or more (i.e. 0-0-40, 0-0-45, . . . ), preferably of about 0-0-61 or more.

In embodiments, the potash core is a conventional (uncoated) potash granule commercially sold for use as a fertilizer.

The potash core can be of any shape. In embodiments, the potash core is of the shape of a conventional (uncoated) potash granule commercially sold for use as a fertilizer. For example, the potash core can be an irregularly shaped potash granule with sharp edges, such as those conventionally produced using compaction granulation. An example of such an irregularly shaped potash granule is shown as the potash core (102) in FIG. 1.

The potash core can be of any size. In embodiments, the potash core is of the size of a conventional (uncoated) potash granule commercially sold for use as a fertilizer. In embodiments, the potash core ranges from about 0.8 mm to about 5.0 mm in size, preferably from about 1.5 mm to about 4.0 mm in size.

Extended Release Layer

The extended release layer comprises water-swellable copolymeric nanoparticles and at least one water-soluble organic acid or water-soluble organic carboxylate salt.

In preferred embodiments, the extended release layer comprises an organic carboxylate salt since salts typically have higher water solubility than free acids. Preferably, the organic carboxylate salt is an alkaline carboxylate salt or alkaline earth carboxylate salt, and most preferably a sodium, potassium, or calcium carboxylate salt.

In preferred embodiments, the organic acid or organic carboxylate salt is a phosphorus solubilizer or a plant hormone. In more preferred embodiments, the organic acid or organic carboxylate salt is a phosphorus solubilizer. In alternative more preferred embodiments, the organic acid or organic carboxylate salt is a plant hormone.

Phosphorus solubilizers increase nutrient use efficiency. Phosphorus solubilizers are compounds, preferably organic acids and their salts, that help solubilize phosphorus immobilized in the soil due to complexation with aluminum and ferric cations or adsorption. Indeed, phosphorus (also in the form of phosphate) is found in water-soluble forms, adsorbed on solid particles and in water-insoluble forms, the latter being due to reaction of phosphate with $Al^{3+}$ and $Fe^{3+}$ in the soil to form $AlPO_4$ and $FePO_4$. Using a phosphorus solubilizer, such as organic acids and their salts, it is possible to increase the amount of water-soluble phosphate in the soil due to the formation of $Al^{3+}$ and $Fe^{3+}$ with the organic acid anion ($A^-$). For example, lauric acid dissolves more selectively $AlPO_4$, citric acid dissolves more selectively to $FePO_4$, and gluconic acid dissolves both Al and Fe phosphate salts. Preferred phosphorus solubilizers include citric acid, lauric acid, alkyl sulfuric acid, wherein the alkyl group is preferably a linear or branched alkyl chain with 4 to 24 carbon atoms (preferably lauryl sulfuric acid), oxalic acid, and gluconic acid as well as their salts. Preferred such salts include for example alkali salts, such as sodium and potassium salts. More preferred phosphorus solubilizers include citric acid, gluconic acid, and oxalic acid as well as their salts and alkyl sulfuric acid salts. Most preferred phosphate solubilizers include alkyl sulfuric acid salts, such as sodium alkyl sulfate and potassium alkyl sulfate.

Plant hormones are well-known to the skilled person and include, among others, plant growth hormones (PGH) that stimulate plant growth and plant immune hormones (PIH) that stimulate resistance to biotic and abiotic stressors. Of note, some organic acids present both PGH and PIH activity. Non-limiting examples of plant hormones include:
  abscisic acid (PGH);
  auxins (PGH and in some cases also PIH), including:
    native auxins such as indole-3-acetic acid, 4-chloroindole-3-acetic acid, 2-phenylacetic acid, indole-3-butanoic acid, and indole-3-propanoic acid, and
    synthetic auxins such as 1-naphthaleneacetic acid, 2,4,5-trichlorophenoxyacetic acid, 2,4-dichlorophenoxyacetic acid, 4-chlorophenoxyacetic acid, 2-methoxy-3,6-dichlorobenzoic acid, 4-nitrobenzoic acid, 2-hydroxybenzoic acid, 4-chlorobenzoic acid, 2,4-dichlorobenzoic acid, 2,4,5,-trichlorobenzoic acid, and 4-amino-3,5,6-trichloropicolinic acid;
  gibberellins, which are a group of more than 125 well-known closely related tetracyclic diterpene acids (PGH and in some cases also PIH);
Gibberellins are derived from the ent-gibberellane skeleton and have either 19 or 20 carbons. The 19-carbon gibberellins, such as gibberellic acid (GA3), have lost carbon 20 and, in place, possess a five-member lactone bridge that links carbons 4 and 10. Gibberellins named GA1 through GAn in order of discovery. Non-liming examples of gibberellins include GA1, gibberellic acid (GA3), GA4, GA5, GA6, GA7, GA13, and preferably gibberellic acid.

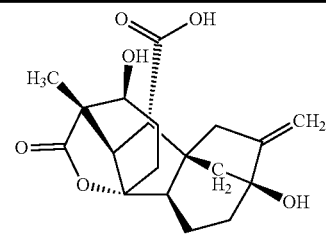

gibberellin A1 (GA1)

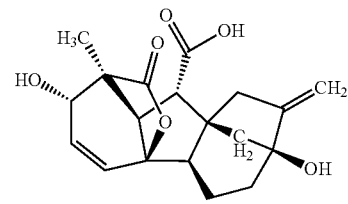 [SMILES: C=C1C[C@]23C[C@@]1(O)CC[C@H]2[C@@]12C=C[C@H](O)[C@@](C)(C(=O)O1)[C@H]2[C@@H]3C(=O)O]

gibberellic acid (GA3)

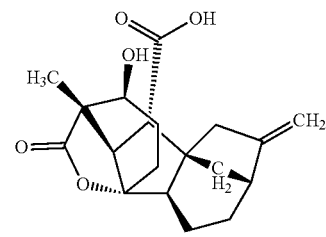 [SMILES: C=C1C[C@]23C[C@H]1CC[C@H]2[C@@]12CC[C@H](O)[C@@](C)(C(=O)O1)[C@H]2[C@@H]3C(=O)O]

gibberellin A4 (GA4)

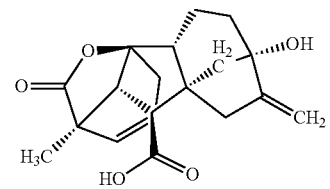 [SMILES: C=C1C[C@]23C[C@@]1(O)CC[C@H]2[C@@]12CC=C[C@@](C)(C(=O)O1)[C@H]2[C@@H]3C(=O)O]

gibberellin A5 (GA5)

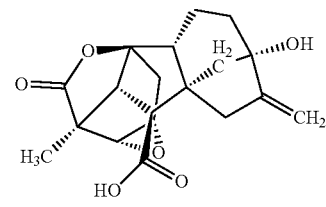 [SMILES: C=C1C[C@]23C[C@@]1(O)CC[C@H]2[C@@]12C[C@@H]4O[C@@H]4[C@@](C)(C(=O)O1)[C@H]2[C@@H]3C(=O)O]

gibberellin A6 (GA6)

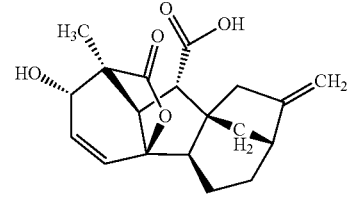 [SMILES: C=C1C[C@]23C[C@H]1CC[C@H]2[C@@]12C=C[C@H](O)[C@@](C)(C(=O)O1)[C@H]2[C@@H]3C(=O)O]

gibberellin A7 (GA7)

-continued

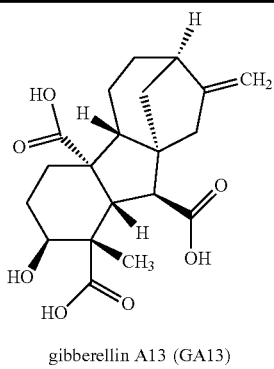

gibberellin A13 (GA13)

gluconic acid (PGH),
salicylic acid (PGH and PIH);
jasmonic acid (PGH and PIH);
oxalic acid (PGH);
citric acid (PGH); and
pipecolic acid (PIH),
as well as salts thereof.

In preferred embodiments, the organic acid or organic carboxylate salt is:
1-naphthalene acetic acid, 2,4,5-trichlorobenzoic acid, 2,4,5-trichlorophenoxyacetic acid, 2,4-dichlorobenzoic acid, 2,4-dichlorophenoxyacetic acid, 2-hydroxybenzoic acid, 4-chlorobenzoic acid, 4-chlorophenoxyacetic acid, 4-nitrobenzoic acid, abscisic acid, citric acid, gibberellic acid, gibberellin A13, gibberellin A3, gibberellin A4, gluconic acid, indole-3-acetic acid, indole-3-butanoic acid, oxalic acid, or salicylic acid, or a salt thereof;
preferably 1-naphthalene acetic acid, 4-chlorophenoxyacetic acid, abscisic acid, citric acid, gibberellic acid, gibberellin A3, gluconic acid, indole-3-acetic acid, indole-3-butanoic acid, oxalic acid, or salicylic acid, or a salt thereof;
more preferably 1-naphthalene acetic acid, 4-chlorophenoxyacetic acid, 4-nitrobenzoic acid, gibberellic acid, gibberellin A3, gluconic acid, indole-3-acetic acid, oxalic acid, salicylic acid, or citric acid, or a salt thereof; and
most preferably 1-naphthalene acetic acid or gibberellic acid, or a salt thereof.

In embodiments, the extended release layer comprises about 30 wt % or more, about 35 wt % or more, about 40 wt % or more, about 45 wt % or more, or about 50 wt % or more; and/or about 70 wt % or less, about 65 wt % or less, about 60 wt % or less, about 55 wt % or less, or about 50 wt % or less of the organic acid or organic carboxylate (in total), based on the weight of the extended release layer. In preferred embodiments, the extended release layer comprises about 50 wt % of the organic acid or organic carboxylate (in total), based on the weight of the extended release layer.

In embodiments, the extended release layer comprises about 30 wt % or more, about 35 wt % or more, about 40 wt % or more, about 45 wt % or more, or about 50 wt % or more; and/or about 70 wt % or less, about 65 wt % or less, about 60 wt % or less, about 55 wt % or less, or about 50 wt % or less of the water-swellable copolymeric nanoparticles, based on the weight of the extended release layer. In preferred embodiments, the extended release layer comprises about 50 wt % of the water-swellable copolymeric nanoparticles based on the weight of the extended release layer.

The extended release layer can be produced on the potash core by applying a suspension of the water-swellable copolymeric nanoparticles in an aqueous solution of the organic acid or organic carboxylate salt, followed by drying. This can be carried out for example by spray coating the suspension on the potash core in a fluidized bed. In embodiments, the temperature for the coating and drying steps is between about 25 and about 50° C.

In embodiments, the extended release layer has a coating weight between about 0.5 wt % and about 10 wt % preferably between about 1 wt % and about 5 wt %, and more preferably between about 1.0 wt % and about 3.0 wt % (based on the weight of the potash core).

As noted above, the extended release layer comprises water-swellable copolymeric nanoparticles. In embodiments, the copolymer making these water-swellable copolymeric nanoparticles comprises crosslinkable repeat units, i.e. at units that can undergo crosslinking with or without a crosslinking agent, upon drying of the extended release layer.

The embodiments, the glass transition temperature of the copolymer, before crosslinking if any, ranges between about 18 and about 25° C.

In preferred embodiments, the copolymer making the water-swellable copolymeric nanoparticles of the extended release layer is of formula (I):

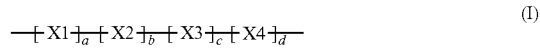

wherein:
X1 represents styrene repeat units;
X2 represents alkyl acrylate or alkyl methacrylate repeat units;
X3 represents alkoxy dialkyl vinylsilane, dialkoxy alkyl vinylsilane, or trialkoxy vinylsilane repeat units;
X4 represents acrylic acid, methacrylic acid, acrylamide, methacrylamide, vinyl phosphoric acid, or N,N-dimethylaminoethyl methacrylamide repeat units; and
a, b, c and d represents the weight percent of repeat units X1, X2, X3, and X4, respectively, based on the total weight of the copolymer, and each vary between about 0.5 wt % and about 50 wt %,
wherein the X3 repeat units are optionally crosslinked with each other within the nanoparticles.

The above formula should be understood to represent copolymers in which all X2 repeat units are the same or in which X2 represents two or more alkyl acrylate and/or alkyl methacrylate repeat units. In preferred embodiments, all X2 repeat units are the same.

Similarly, the above formula should be understood to represent copolymers in which all X3 repeat units are the same or in which X3 represents two or more alkoxy dialkyl vinylsilane, dialkoxy alkyl vinylsilane, and/or trialkoxy vinylsilane repeat units. In preferred embodiments, all X3 repeat units are the same.

Similarly, the above formula should be understood to represent copolymers in which all X4 repeat units are the same or in which X3 represents two or more acrylic acid, methacrylic acid, acrylamide, methacrylamide, vinyl phosphoric acid, and/or N,N-dimethylaminoethyl methacrylamide repeat units. In preferred embodiments, all X4 repeat units are the same.

The alkyl group of the alkyl acrylate repeat units, alkyl methacrylate repeat units, alkoxy dialkyl vinylsilane repeat units, and dialkoxy alkyl vinylsilane repeat units can be linear or branched. In preferred embodiments, these alkyl groups comprise between 1 and 6 carbon atoms.

The alkoxy groups of the alkoxy dialkyl vinylsilane repeat units, dialkoxy alkyl vinylsilane repeat units, and trialkoxy vinylsilane repeat units can be linear or branched. In preferred embodiments, these alkoxy groups comprise between 1 and 6 carbon atoms.

As noted above, the X3 repeat units are optionally crosslinked with each other within the nanoparticles. Indeed, when producing the granules of the invention, the X3 repeat units can undergo self-crosslinking upon heating at a temperature between 40 and 50° C. In preferred embodiments, for example those in which the extended release layer was produced in such conditions, some of the X3 repeat units are crosslinked with each other within the nanoparticles. In embodiments, up to about 3% of the X3 repeat unit are crosslinked. More extensive crosslinking could yield an undesirably brittle extended release layer. Crosslinking allows to modify the potassium release rate as desired. Indeed, increased crosslinking decreases the swelling speed of the nanoparticles, which decrease the potassium release rate, and allow using a thinner extended release layer. In other embodiments, the X3 repeat units are not crosslinked with each other.

In preferred embodiments, the alkyl group of the alkyl acrylate or alkyl methacrylate repeat unit is butyl.

In preferred embodiments, X2 represents alkyl acrylate, preferably butyl acrylate.

In preferred embodiments, the alkoxy group of the alkoxy dialkyl vinylsilane, dialkoxy alkyl vinylsilane, or trialkoxy vinylsilane repeat units is ethoxy.

In preferred embodiments, X3 represents trialkoxy vinylsilane, preferably triethoxy vinylsilane repeat units.

In preferred embodiments, X4 represents acrylic acid, acrylamide, or vinyl phosphoric acid repeat units.

In preferred embodiments, a is about 25 wt % or more, about 35 wt % or more, about 40 wt % or more, or about 45 wt % or more; and/or about 75 wt % or less, about 65 wt % or less, about 60 wt % or less, about 55 wt % or less, or about 50 wt % or less. In more preferred embodiments, a is about 48 wt %.

In preferred embodiments, b is about 25 wt % or more, about 35 wt % or more, about 40 wt % or more, or about 45 wt % or more; and/or about 75 wt % or less, about 65 wt % or less, about 60 wt % or less, about 55 wt % or less, or about 50 wt % or less. In more preferred embodiments, b is about 48 wt %.

In preferred embodiments, c is about 0.5 wt % or more, about 1 wt % or more, about 1.5 wt % or more, about 2 wt % or more, about 2.5 wt % or more; and/or about 15 wt % or less, about 10 wt % or less, about 7.5 wt % or less, about 5 wt % or less, about 4 wt % or less, or about 3.5 wt % or less. In more preferred embodiments, c is about 3 wt %.

In preferred embodiments, d is about 0.5 wt % or more, about 0.6 wt % or more, about 0.7 wt % or more, about 0.8 wt % or more, about 0.9 wt % or more; and/or about 10 wt % or less, about 5 wt % or less, about 3 wt % or less, about 2 wt % or less, or about 1.5 wt % or less. In more preferred embodiments, d is about 1 wt %.

In most preferred embodiments, the copolymer making the water-swellable copolymeric nanoparticles of the extended release layer has the following ideal chemical structure:

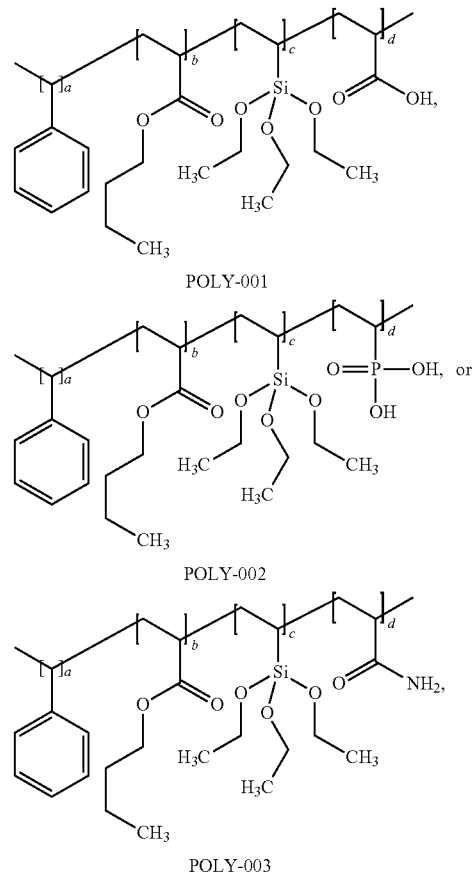

POLY-001

POLY-002

POLY-003 preferably wherein a, b, c and d are about 48 wt %, about 48 wt %, about 3 wt % and about 1 wt %, respectively, based on the total weight of the copolymer.

The extended release layer may comprise a mixture of the above copolymeric nanoparticles.

The copolymeric nanoparticles may comprise a mixture of the above copolymers.

Copolymeric nanoparticles comprising crosslinkable trialkoxy vinylsilane repeat units, such as triethoxysilyl repeat units, can be synthesized by free radical emulsion copolymerization in an aqueous solution containing anionic and non-ionic surfactants, such as sodium n-dodecyl benzene sulfonate and n-octanol. A pH controlling agent, such as sodium bicarbonate might also be used in the copolymerization to provide a stable polymeric nanoparticle suspension with nanoparticles having a particle size in the 40 to 200 nm range.

Controlled Release Layer

As noted above, the controlled release layer covers the extended release layer.

The controlled release layer can be produced on the extended release layer by applying a suspension of the water-swellable copolymeric nanoparticles in an aqueous solvent, following by drying. This can be carried out for example by spray coating in a fluidized bed. In embodiments, the temperature for the coating and drying steps is from about 25° C. to below about 50° C.

In embodiments, the controlled release layer has a coating weight between about 2 wt % and about 20 wt % preferably between about 4 wt % and about 15 wt %, and more preferably between about 5 wt % and about 10 wt % (based on the weight of the potash core). In preferred embodiments, the controlled release layer is thicker (has a larger coating weight) than the extended release layer.

As noted above, like the extended release layer, the controlled release layer comprises water-swellable copolymeric nanoparticles.

In embodiments, the copolymer making the water-swellable copolymeric nanoparticles of the controlled release layer comprise crosslinkable repeat units, that can undergo crosslinking, with or without crosslinking agents, upon drying of the extended release layer.

The embodiments, the glass transition temperature of this copolymer, before crosslinking if any, ranges between about 18 and about 25° C.

In preferred embodiments, the copolymer making the water-swellable copolymeric nanoparticles of the controlled release layer is of formula (I) as defined above, including all preferred embodiments thereof. Thus, in most preferred embodiments, this copolymer is POLY-001, POLY-002 and POLY-003.

In embodiments, the water-swellable copolymeric nanoparticles in the controlled release layer are the same as the water-swellable copolymeric nanoparticles as in the extended release layer.

The copolymeric nanoparticles may comprise a mixture of the above copolymers.

The controlled release layer may comprise a mixture of the above copolymeric nanoparticles.

In preferred embodiments, contrary to the extended release layer, the controlled release layer is free from the above water-soluble organic acid or organic carboxylate salt.

Anticaking Layer

The anticaking layer comprises water-insoluble copolymeric nanoparticles.

The anticaking layer can be produced on the controlled release layer by applying a suspension of the water-insoluble copolymeric nanoparticles in an aqueous solvent, followed by drying. This can be carried out for example by spray coating in a fluidized bed. In embodiments, the temperature for the coating and drying steps is between about 30° C. and about 70° C., preferably between about 35° C. and about 65° C.

In embodiments, the anticaking layer has a coating weight between about 1 wt % and about 10 wt %, preferably between about 2 wt % and about 5 wt % (based on the weight of the potash core).

As noted above, the anticaking layer comprises water-insoluble copolymeric nanoparticles. In embodiments, the copolymer making the water-insoluble copolymeric nanoparticles comprises repeat units having a plant hormone or a phosphorus solubilizer covalently or ionically attached as a pendant group.

The embodiments, the glass transition temperature of the copolymer ranges between about 35° C. and about 55° C.

In preferred embodiments, the copolymer making the water-insoluble copolymeric nanoparticles is of formula (II):

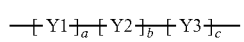

(II)

wherein:
Y1 represents styrene repeat units;
Y2 represents alkyl acrylate or alkyl methacrylate repeat units;
Y3 represents repeat units comprising, as a pendant group, an ionically or covalently attached plant hormone or phosphorus solubilizer;
a and b represents the weight percent of repeat units Y1 and Y2, respectively, based on the total weight of the copolymer, and each vary between about 10 wt % to about 95 wt %; and
c represents the weight percent of repeat units Y3, based on the total weight of the copolymer, and vary between 0 wt % to about 30 wt %.

The above formula should be understood to represent copolymers in which all Y2 repeat units are the same or in which Y2 represents two or more alkyl acrylate and/or alkyl methacrylate repeat units. In preferred embodiments, all Y2 repeat units are the same.

Similarly, the above formula should be understood to represent copolymers in which all Y3 repeat units are the same or in which Y3 represents two or more different repeat units comprising, as a pendant group, ionically or covalently attached plant hormones and/or phosphorus solubilizers. In preferred embodiments, all Y3 repeat units are the same.

The alkyl groups of the alkyl acrylate repeat units and the alkyl methacrylate repeat units can be linear or branched. In preferred embodiments, these alkyl groups comprise between 1 and 6 carbon atoms, preferably butyl.

In preferred embodiments, Y2 represents alkyl acrylate, preferably butyl acrylate.

In embodiments, the plant hormone or phosphorus solubilizer that is covalently or ionically attached as a pendant group to the copolymer making the water-insoluble copolymeric nanoparticles, for example the copolymer of formula (II), is:
a) a residue of an organic acid that is a plant hormone or a phosphorus solubilizer or
b) a carboxylate anion (RCOO⁻) of an organic acid (RCOOH) that is a plant hormone or a phosphorus solubilizer. When it is covalently attached, the plant hormone or phosphorus solubilizer is preferably a residue of an organic acid (that is a plant hormone or phosphorus solubilizer). When it is ionically attached, the plant hormone or phosphorus solubilizer is preferably a carboxylate anion of an organic acid (that is a plant hormone or phosphorus solubilizer). Preferably, these organic acids (in a) and b)) that are a plant hormone or a phosphorus solubilizer are as defined above with respect to the extended release layer, including preferred embodiments thereof.

In preferred embodiments, the pendant group is ionically attached to repeat units Y3. In more preferred embodiments, Y3 represents repeat units of formula (III):

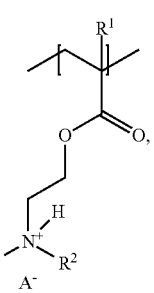

(III)

wherein:
- R¹ is a hydrogen atom or methyl;
- R² is the same or different $C_{1-6}$ alkyl; and
- A⁻ is a carboxylate anion of an organic acid that is a plant hormone or a phosphorus solubilizer as defined above, including preferred embodiments thereof.

In preferred embodiments, R¹ is methyl.

In preferred embodiments, both R² groups are methyl.

As can be seen in the above, in formula (III), the pendant group is A⁻ is a carboxylate anion of an organic acid that is a plant hormone or a phosphorus solubilizer, preferably a plant hormone. Preferably, these organic acids that are a plant hormone or a phosphorus solubilizer are as defined above with respect to the extended release layer, including preferred embodiments thereof.

In preferred embodiment, Y3 is a repeat unit obtained by polymerizing the following monomers.

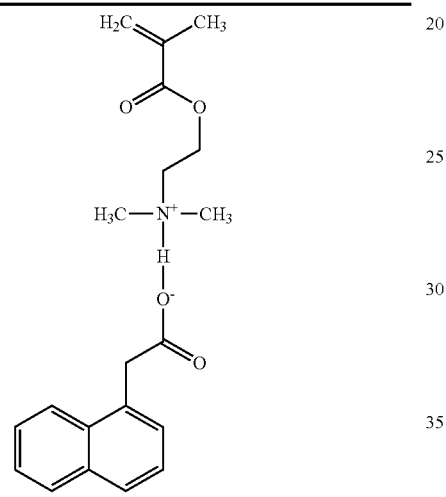

[2-(methacryloyloxy)ethyl]dimethyl-
ammonium 1-naphthaleneacetate
salt

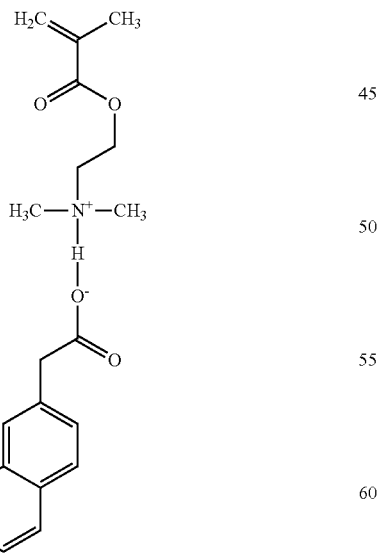

[2-(methacryloyloxy)ethyl]dimethyl-
ammonium 1-naphthaleneacetate
salt

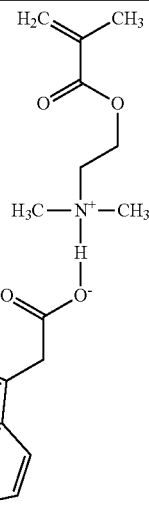

[2-(methacryloyloxy)ethyl]dimethyl-
ammonium 3-indole acetate salt

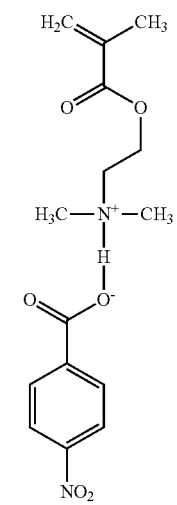

[2-(methacryloyloxy)ethyl]dimethyl-
ammonium p-nitrobenzoate salt

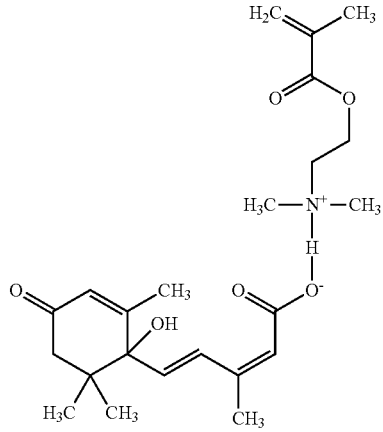

[2-(methacryloyloxy)ethyl]dimethyl-
ammonium abscisicate salt

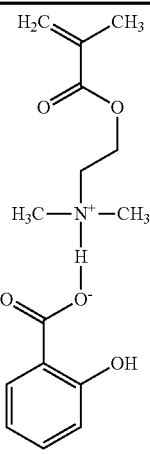
[2-(methacryloyloxy)ethyl]dimethyl-
ammonium 2-hydroxybenzoate salt
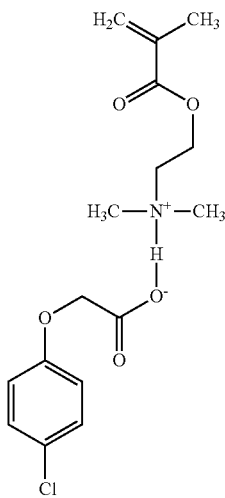
[2-(methacryloyloxy)ethyl]dimethyl-
ammonium (4-chlorophenoxy)
acetoate
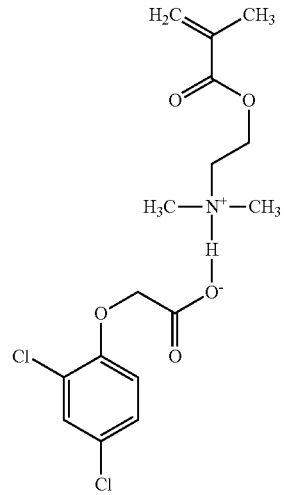
[2-(methacryloyloxy)ethyl]dimethyl-
ammonium (2,4-dichlorophenoxy)
acetoate
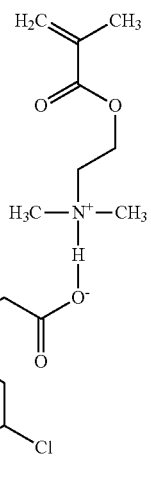
[2-(methacryloyloxy)ethyl]dimethyl-
ammonium (2,4,5-trichlorophenoxy)
acetoate
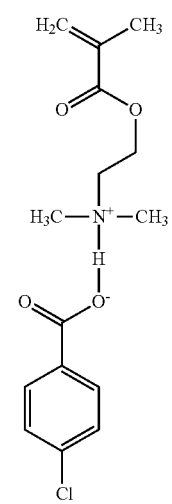
N-[2-(methacryloyloxy)ethyl]-4-
chlorobenzoate
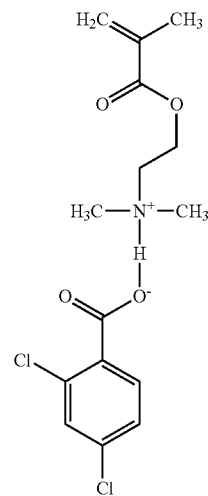

N-[2-(methacryloyloxy)ethyl]-2,4-dichlorobenzoate

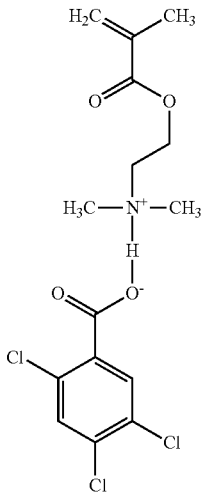

N-[2-(methacryloyloxy)ethyl]-2,4,5-trichlorobenzoate

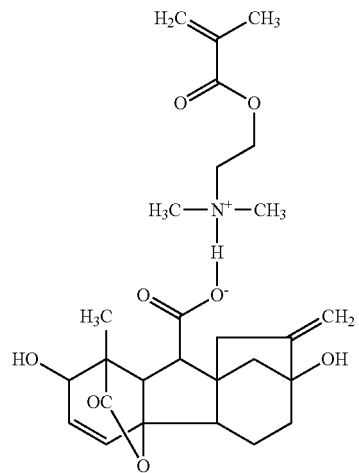

[2-(methacryloyloxy)ethyl]dimethyl-ammonium Gibberellate salt (GA3)

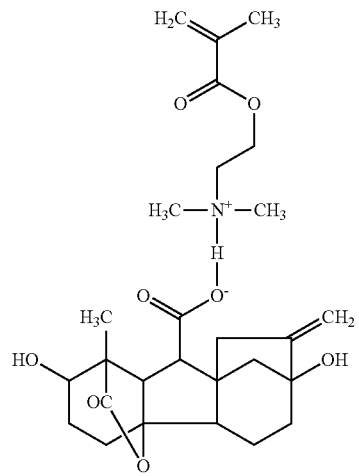

[2-(methacryloyloxy)ethyl]dimethyl-ammonium Gibberellate salt (GA4)

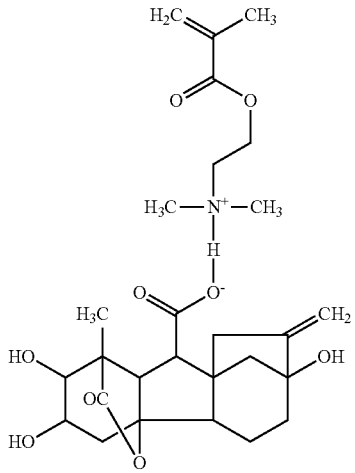

[2-(methacryloyloxy)ethyl]dimethyl-ammonium Gibberellate salt (GA13)

Of note, the structure of the Y3 repeat units obtained by polymerizing the above monomers can easily be deduced from the structure of the monomers as follows:

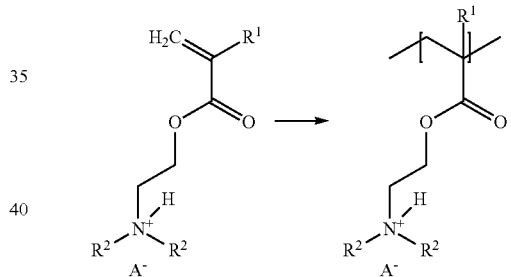

In preferred embodiments, a is about 20 wt % or more, about 25 wt % or more, about 30 wt % or more, about 35 wt % or more, about 39 wt % or more, or about 40 wt % or more; and/or about 65 wt % or less, about 60 wt % or less, about 55 wt % or less, about 50 wt % or less, about 46 wt % or less, or about 45 wt % or less. In embodiments in which c is 0 wt %, a is preferably about 50 wt %. In embodiments in which c is greater than 0 wt %, a is preferably between about 35 wt % and about 50 wt % and more preferably between about 39 wt % and about 46 wt %.

In preferred embodiments, b is about 30 wt % or more, about 35 wt % or more, about 40 wt % or more, about 44 wt % or more, or about 45 wt % or more; and/or about 80 wt % or less, about 70 wt % or less, about 65 wt % or less, about 60 wt % or less, about 55 wt % or less, about 50 wt % or less, or about 49 wt % or less. In embodiments when c is 0 wt %, b is preferably about 50 wt %. In embodiments when c is greater than 0 wt %, b is preferably between about 40 wt % and about 50 wt % and more preferably between about 44 wt % and about 49 wt %.

In preferred embodiments, c is about 0 wt % or more, about 1 wt % or more, about 2 wt % or more, about 3 wt % or more, about 4 wt % or more, or about 5 wt % or more;

and/or about 30 wt % or less, about 25 wt % or less, about 20 wt % or less, about 17 wt % or less, about 15 wt % or less, about 12 wt % or less, or about 10 wt % or less. In embodiments, c is 0 wt %. In other embodiments, c is greater than 0 wt %.

Preferred copolymers of formula (II) have the following ideal chemical structures:

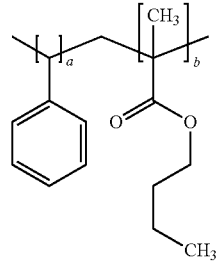

POLY-004,
preferably wherein a is about 50 wt % and
b is about 50 wt %,

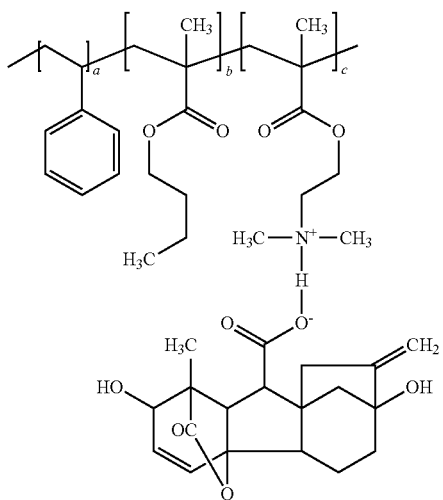

POLY-005/POLY-006,
preferably wherein a is about 44 wt %,
b is about 47 wt %, and c is about 9 wt %,
or wherein a is about 39 wt %,
b is about 44 wt %, and c is about 17 wt %,
more preferably wherein a is about 44 wt %,
b is about 47 wt %, and c is about 9 wt %,

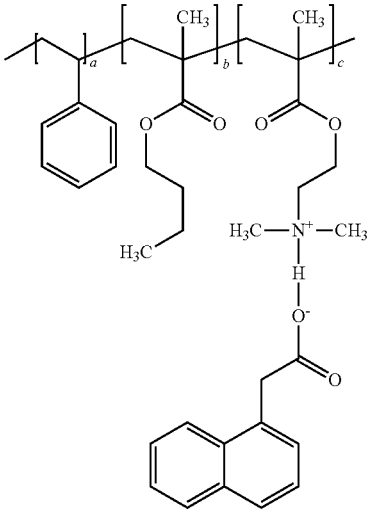

POLY-007/POLY-008,
preferably wherein a is about 46 wt %,
b is about 48 wt %, and c is about 6 wt %,
or wherein a is about 41 wt %,
b is about 47 wt %, and c is about 12 wt %,
more preferably wherein a is about 46 wt %,
b is about 48 wt %, and c is about 6 wt %,

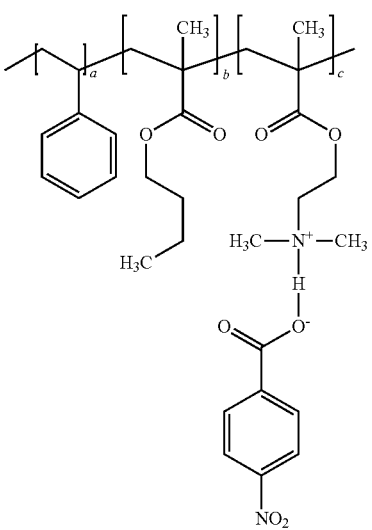

POLY-009,
preferably wherein a is about 46 wt %,
b is about 48 wt %, and c is about 6 wt %, -continued

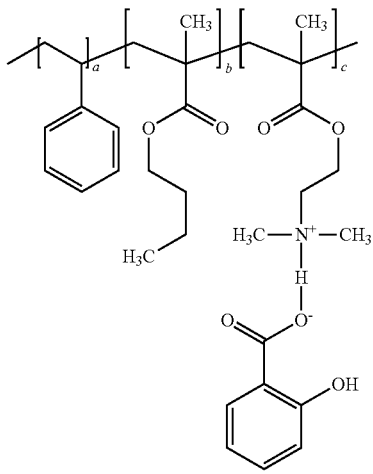

POLY-010,
preferably wherein a is about 46 wt %,
b is about 49 wt %, and c is about 5 wt %, or

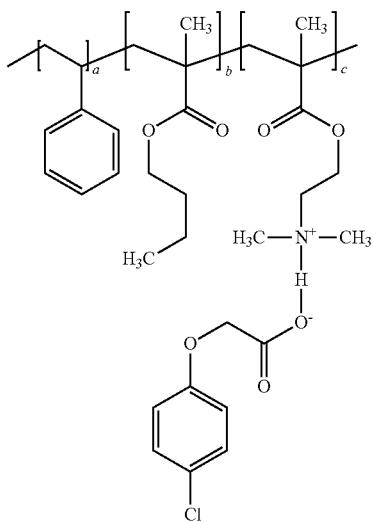

POLY-011,
preferably wherein a is about 46 wt %,
b is about 48 wt %, and c is about 6 wt %.

In embodiments, the pendant group is covalently attached to repeat units Y3. In more preferred embodiments, Y3 represents repeat units of formula (IV):

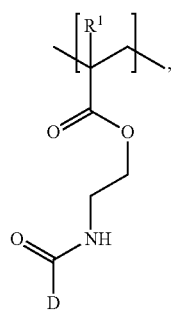

(IV)

wherein:

$R^1$ is a hydrogen atom or methyl;

D-C(=O)— is a residue of an organic acid (D-COOH) that is a plant hormone or a phosphorus solubilizer.

As can be seen in the above, in formula (IV), the pendant group D-C(=O)— is a residue of an organic acid that is a plant hormone or a phosphorus solubilizer, preferably a plant hormone. Preferably, this organic acid that is a plant hormone or a phosphorus solubilizer are as defined above with respect to the extended release layer, including preferred embodiments thereof.

In preferred embodiments, the organic acid that is a plant hormone or a phosphorus solubilizer is gibberellic acid, indole-3-acetic acid, 1-naphthalene acetic acid, 2-naphthalene acetic acid, 4-nitrobenzoic acid, 4-chlorophenyloxyacetic acid, or salicylic acid.

In preferred embodiments, the repeat unit Y3 of formula (IV) is obtained by polymerization of the following monomer of formula (VI), which can be synthesized by the reacting the monomer of formula (V) with the organic acid in an oxygen atmosphere at temperature around 40° C. in presence of 1,4-dioxolane without catalyst.

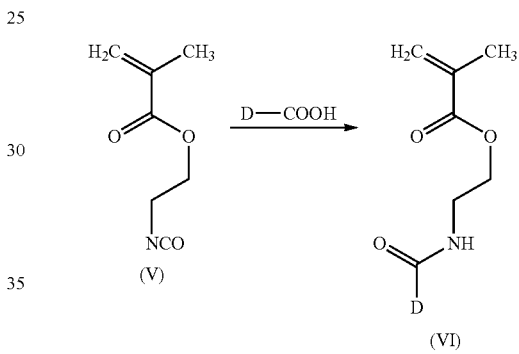

wherein D-COOH is the organic acid that is a plant hormone or a phosphorus solubilizer.

Preferred copolymers of formula (IV) have the following ideal chemical structures:

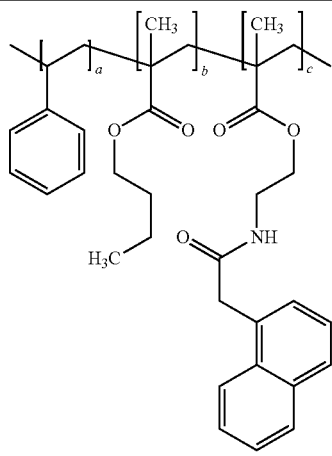

POLY-012,
preferably wherein a is about 47 wt %,
b is about 50 wt %, and c is about 3 wt %,

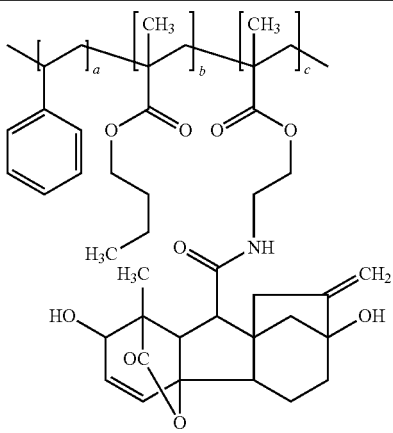

POLY-013,
preferably wherein a is about 47 wt %,
b is about 50 wt %, and c is about 3 wt %,

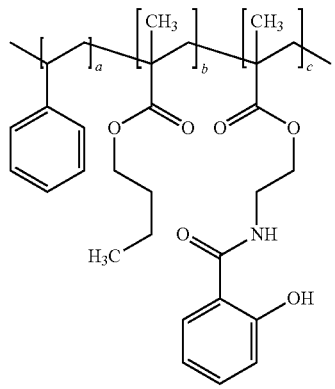

POLY-014,
preferably wherein a is about 47 wt %,
b is about 50 wt %, and c is about 3 wt %, or

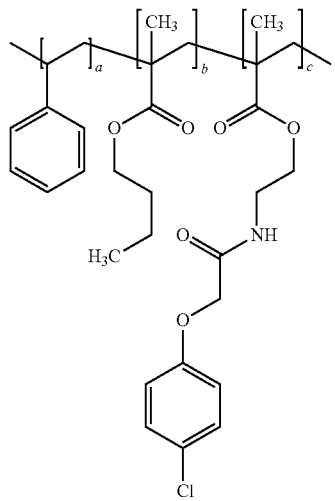

POLY-015,
preferably wherein a is about 47 wt %,
b is about 50 wt %, and c is about 3 wt %.

The anticaking layer may comprise a mixture of the above water-insoluble copolymeric nanoparticles.

The water-insoluble copolymeric nanoparticles may comprise a mixture of the above copolymers.

The copolymer for the water-insoluble copolymeric nanoparticles for the anticaking layer can be synthesized, for example, by free radical emulsion copolymerization in an aqueous solution containing anionic and non-ionic surfactants, such as sodium n-dodecyl benzene sulfonate and n-octanol. A pH controlling agent, such as sodium bicarbonate can also be used in the copolymerization to provide a stable polymeric nanoparticle suspension.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

Similarly, herein a general chemical structure, such as Formulas I to III, with various substituents (Y1, X1, $R^1$, etc.) and various radicals (alkyl, halogen atom, etc.) enumerated for these substituents is intended to serve as a shorthand method of referring individually to each and every molecule obtained by the combination of any of the radicals for any of the substituents. Each individual molecule is incorporated into the specification as if it were individually recited herein. Further, all subsets of molecules within the general chemical structures are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

For clarity, an organic acid can be represented as RCOOH, in which R is an organic group.

An organic carboxylate salt can be represented as $RCOO^-M^+$, i.e. a carboxylate anion ($RCOO^-$) with a cation ($M^+$), in which R is an organic group. Furthermore, still using this nomenclature, an alkaline carboxylate salt can be represented as $RCOO^-M^+$, in which R is an organic group and $M^+$ is an alkaline metal cation, for example sodium ($Na^+$) or potassium ($K^+$), and an alkaline earth carboxylate salt can be represented as $RCOO^-M^+$, in which R is an organic group and $M^+$ is an alkaline earth metal cation, for example calcium ($CA^{2+}$).

Since a salt is often conceptualized as the result of an acid-base reaction:

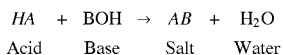

$$HA + BOH \rightarrow AB + H_2O$$
Acid  Base  Salt  Water wherein A is an anion and B is a cation,
it is often said for simplicity that a given anion (A⁻) is "the carboxylate anion of a given corresponding acid" (HA). This means that the anion (A⁻) corresponds to the following underlined part of the acid H<u>A</u>. For example, the carboxylate anion of acetic acid ($CH_3COOH$) is ($CH_3COO^-$).

Herein, a "residue of an organic acid" is a group obtained by reacting an organic acid in order to covalently attach it. For example, an organic acid R—COOH can be reacted with a —NCO group to attach the organic acid as follows: —N—C(=O)—R, wherein R—O(=O)— is the residue of the organic acid.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Herein, the terms "alkyl" and its derivatives (such as alkoxy) have their ordinary meaning in the art.

For more certainty, herein:

| Term | Definition |
|------|------------|
| alkyl | monovalent saturated aliphatic hydrocarbon radical of general formula $C_nH_{2n+1}$ |
| alkyloxy or alkoxy | monovalent radical of formula -O-alkyl |

It is to be noted that, unless otherwise specified, the hydrocarbon chains of the above groups can be linear or branched. Further, unless otherwise specified, these groups can contain between 1 and 18 carbon atoms, more specifically between 1 and 12 carbon atoms, between 1 and 6 carbon atoms, between 1 and 3 carbon atoms, or contain 1 or 2, preferably 1, or preferably 2 carbon atoms.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.
Materials
The following chemicals were used as received without further purification.
CTA Citric acid, available from Sigma-Aldrich, Canada
CPA Chlorophenoxyacetic acid, available from Sigma-Aldrich, Canada
GBA Gibberellic acid, available from Sigma-Aldrich, Canada
GNA Gluconic acid, available from Sigma-Aldrich, Canada
IAA Indole-3-acetic acid, available from Sigma-Aldrich, Canada
NAA 1-Naphthalene acetic acid, available from Sigma-Aldrich, Canada
SAA Salicylic acid, available from Sigma-Aldrich, Canada
BZQ 1,4-benzoquinone, available from Sigma-Aldrich, Canada
DDL Dibutyltin dilaurate, available from Sigma-Aldrich, Canada
DMA 2-(N,N-dimethylamino)ethyl methacrylate, available from Sigma-Aldrich, Canada
DMF N,N-dimethylformamide, available from Sigma-Aldrich, Canada
DXL 1,4-dioxolane, available from Sigma-Aldrich, Canada
ICM 2-isocyanatoethyl methacrylate, available from Korea Showa Chemicals, Seoul, Korea.
NBA p-Nitrobenzoic acid, available from Sigma-Aldrich, Canada
Potash Irregularly shaped potash granules—potassium chloride 00:00:61, available from Phu My Fertilizers, Vietnam
Syntheses and Characterization of Copolymeric Nanoparticles Copolymeric nanoparticles were synthesized in a 500 Kg oil heated double wall glass-lined reactor equipped with a water condenser, mechanical stirrer, dropping funnel, thermometer and nitrogen or air inlet.

The products were characterized with a Perkin Elmer® Spectrum Two® FTIR spectrometer.

The particle size of the copolymeric nanoparticles was measured in a dilute water solution using a Brookhaven® NanoBrook® 173Plus particle size analyzer.

The molecular weight of the copolymers was measured using a Waters® size exclusion chromatography column using N,N-dimethylformamide as an eluent and using polystyrene standards.

Example 1—Water-Swellable Copolymeric Nanoparticles POLY-001

The synthesis of copolymeric nanoparticles POLY-001 (as an aqueous suspension) was done by mixing a prepolymer solution, which comprised 236 Kg of deionized water, 39.6 Kg of styrene, 39.6 Kg of n-butylacrylate, 0.82 Kg of acrylic acid, 2.48 Kg of triethoxy vinylsilane, 0.82 Kg of ammonium bicarbonate and 0.82 Kg n-octanol in a 1,000-liter stainless steel tank with a high shear mixer. In a separate smaller tank, a solution of ammonium persulfate free radical initiator was prepared by dissolving 0.42 Kg of ammonium persulfate into 10 Kg deionized water.

One hundred and sixty kilograms of the prepolymer solution were loaded in the reactor. The temperature was slowly raised to 80° C. and the remaining prepolymer solution was added to the reactor using a dosing pump at a rate 32.0 Kg per hour. Simultaneously, the ammonium persulfate solution was also added to the reactor using a dosing pump at a rate of 2.00 Kg per hour.

After both solutions were completely added into the reactor, the polymerization was continued at 80° C. under nitrogen atmosphere and constant stirring for additional 15 hours. Reaction samples were removed from the reactor after 16, 20 and 24 hours to measure the solid weight for monitoring the completeness of the polymerization. After the polymerization was completed, deionized water was added to the reactor to adjust the solid weight to 25%, thus producing a suspension that could directly be used (with optional further dilution as desired) to produce smart release potash fertilizers.

Copolymer POLY-001 was:

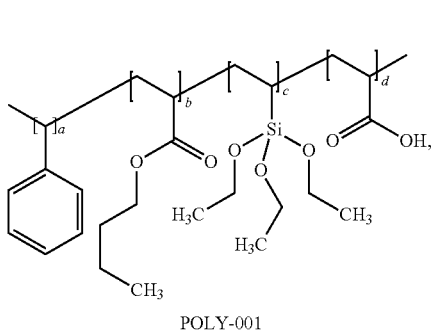

POLY-001 with a, b, c and d being 48 wt %, 48 wt %, 3 wt % and 1 wt %, respectively.

The glass transition temperature, particle size, and polydispersity of POLY-001 were measured to be 20° C., 92.0 nm and 0.020, respectively.

Figure 3:
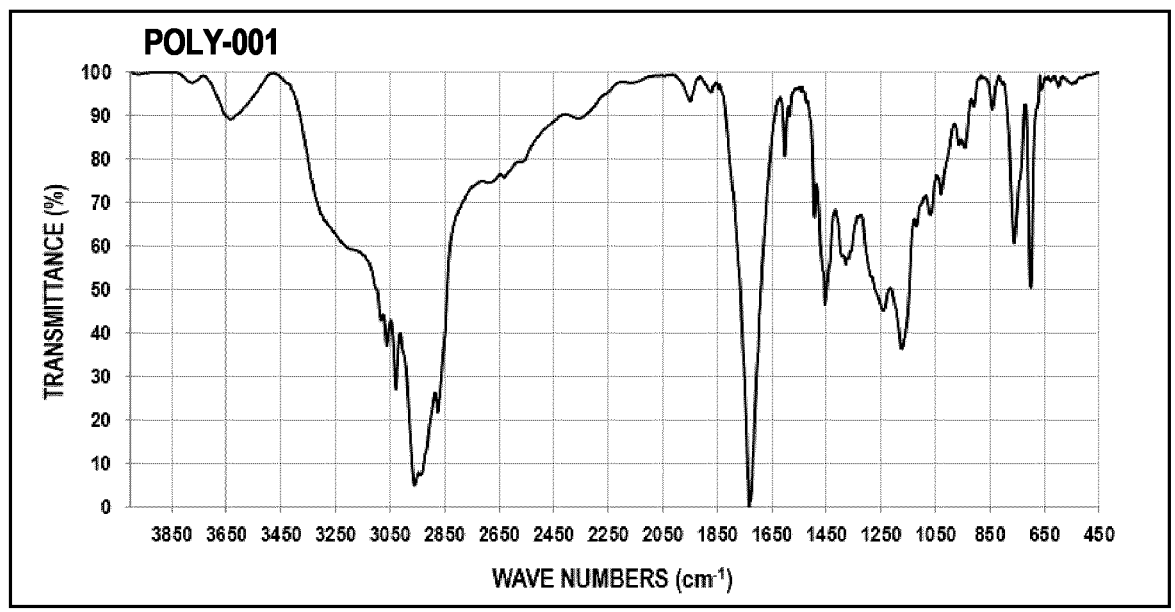
FIG. 3 is the FTIR spectrum of copolymeric nanoparticles POLY-001 in a KBr pellet.

FIG. 3 shows the FTIR spectrum of copolymeric nanoparticles POLY-001 in a KBr pellet.

Example 2—Water-Swellable Copolymeric Nanoparticles POLY-002

The synthesis of copolymeric nanoparticles POLY-002 (as an aqueous suspension) was done similarly to the synthesis of POLY-001 with the exception that 0.82 Kg of vinylphosphonic acid was used instead of acrylic acid.

Copolymer POLY-002 was:

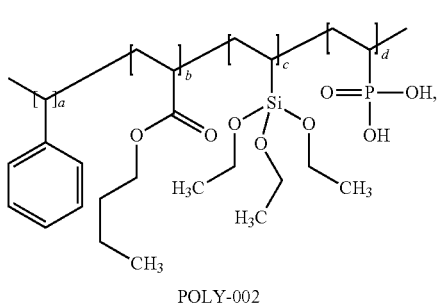

POLY-002 with a, b, c and d being 48 wt %, 48 wt %, 3 wt % and 1 wt %, respectively.

The glass transition temperature, particle size, and polydispersity of POLY-001 were measured to be 20° C., 91.3 nm and 0.005, respectively.

Figure 4:
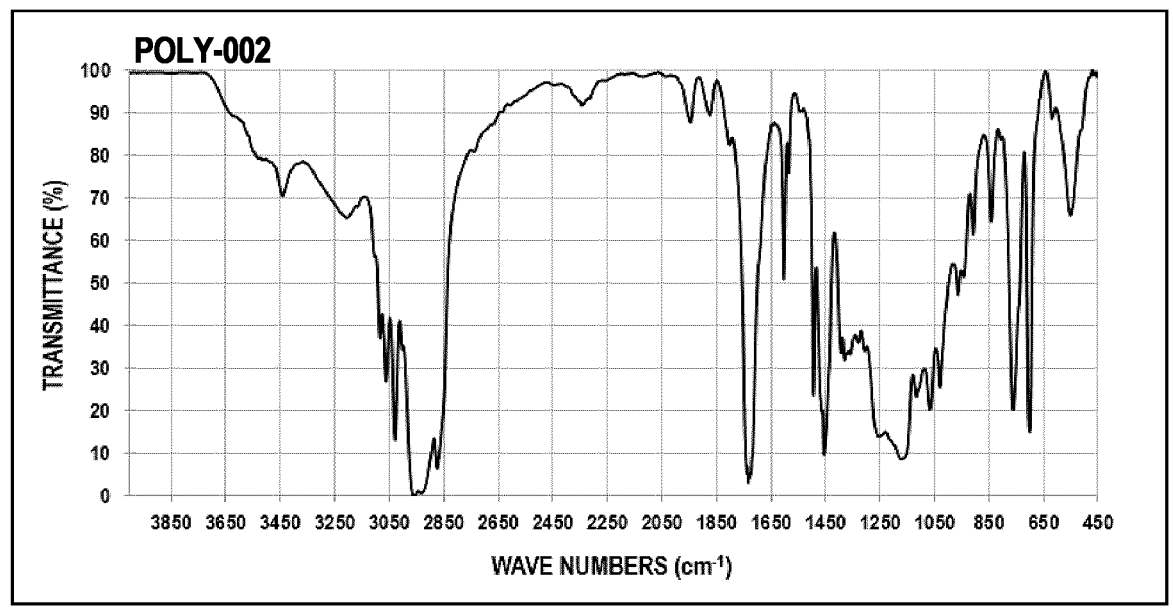
FIG. 4 is the FTIR spectrum of copolymeric nanoparticles POLY-002 in a KBr pellet.

FIG. 4 shows the FTIR spectrum of copolymeric nanoparticles POLY-002 in a KBr pellet.

Example 3—Water-Swellable Copolymeric Nanoparticles POLY-003

The synthesis of copolymeric nanoparticles POLY-003 (as an aqueous suspension) was done similarly to the synthesis of POLY-001 with the exception that 0.82 Kg of acrylamide was used instead of acrylic acid.

Copolymer POLY-003 was:

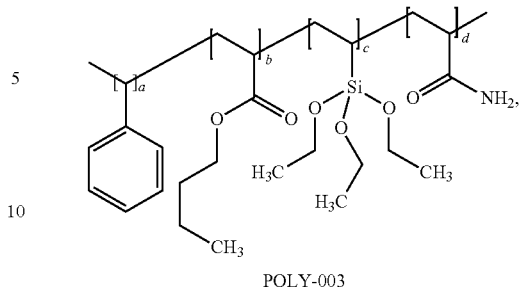

POLY-003 with a, b, c and d being 48 wt %, 48 wt %, 3 wt % and 1 wt %, respectively.

The glass transition temperature, molecular weight, particle size, and polydispersity of POLY-001 were measured to be 21° C., 112 kDa, 67.0 nm, and 0.003, respectively.

Figure 5:
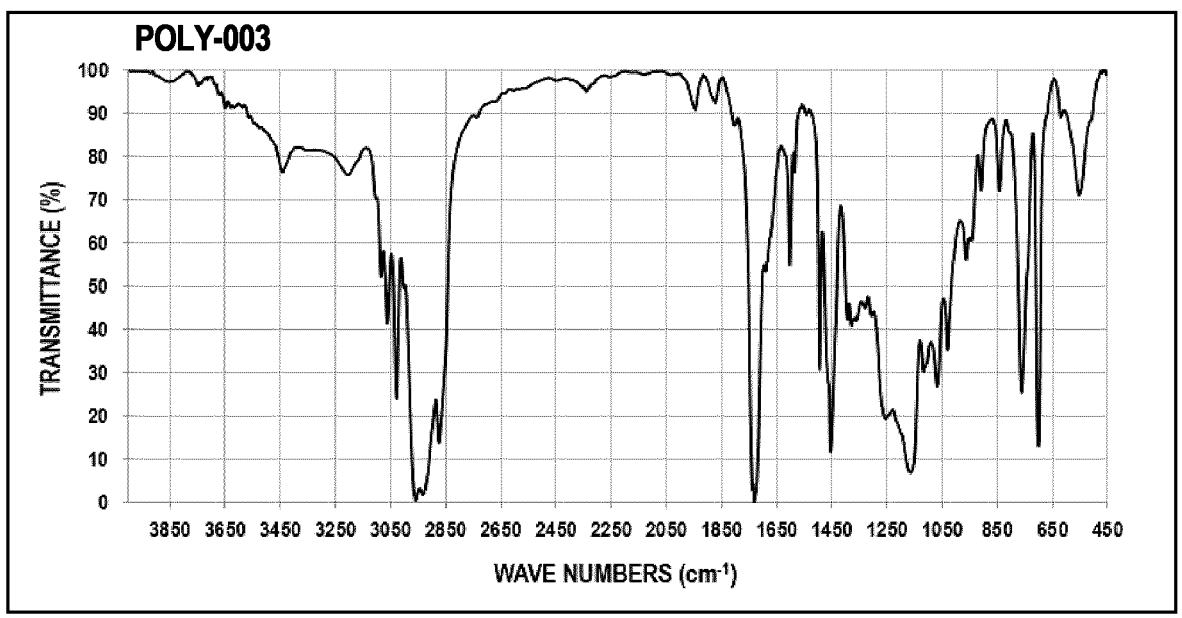
FIG. 5 is the FTIR spectrum of copolymeric nanoparticles POLY-003 in a KBr pellet.

FIG. 5 shows the FTIR spectrum of copolymeric nanoparticles POLY-003 in a KBr pellet.

Example 4—Water-Insoluble Copolymeric Nanoparticles POLY-004

The synthesis of copolymeric nanoparticles POLY-004 (as an aqueous suspension) was done by mixing a prepolymer solution, which comprised 236 Kg of deionized water, 50.0 Kg of styrene, 50.0 Kg of butyl methacrylate, 0.82 Kg of ammonium bicarbonate and 0.82 Kg n-octanol in a 1,000-liter stainless steel tank with a high shear mixer. In a separate smaller tank, a solution of ammonium persulfate free radical initiator was prepared by dissolving 0.42 Kg of ammonium persulfate into 10 Kg deionized water.

One hundred and sixty kilograms of the prepolymer solution were loaded in the reactor. The temperature was slowly raised to 80° C. and the remaining prepolymer solution was added to the reactor using a dosing pump at a rate 32.0 Kg per hour. Simultaneously, the ammonium persulfate solution was also added to the reactor using a dosing pump at a rate of 2.00 Kg per hour.

After both solutions were completely added into the reactor, the polymerization was continued at 80° C. under nitrogen atmosphere and constant stirring for additional 15 hours. Reaction samples were removed from the reactor after 16, 20 and 24 hours to measure the solid weight for monitoring the completeness of the polymerization. After the polymerization was completed, deionized water was added to the reactor to adjust the solid weight to 25%, thus producing a suspension that could directly be used (with optional further dilution as desired) to produce smart release potash fertilizers.

Copolymer POLY-004 was:

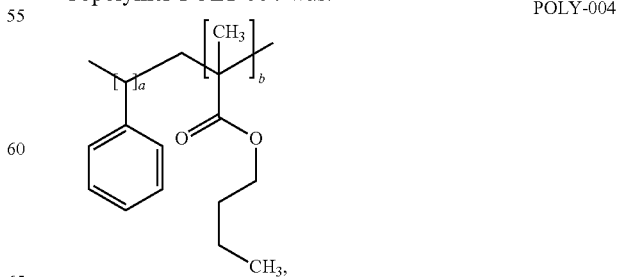

POLY-004 with a being 50 wt % and b being 50 wt %.

The particle size and polydispersity of POLY-004 were measured to be 79 nm and 0.023, respectively.

Figure 6:
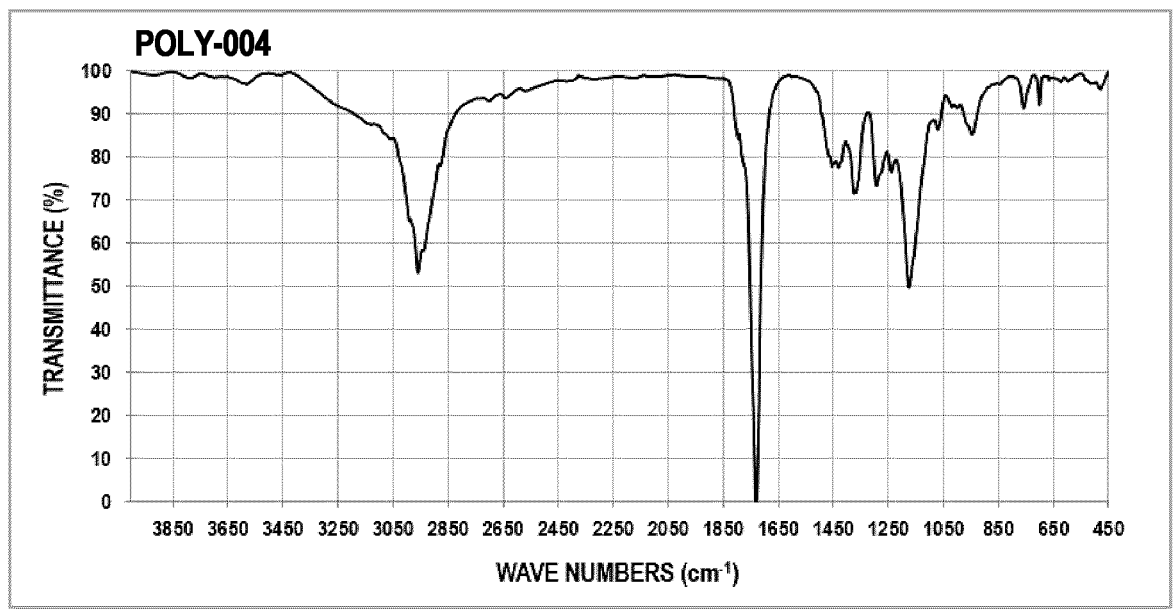
FIG. 6 is the FTIR spectrum of copolymeric nanoparticles POLY-004 in a KBr pellet.

FIG. 6 shows the FTIR spectrum of copolymeric nanoparticles POLY-004 in a KBr pellet.

Example 5—Water-Insoluble Copolymeric Nanoparticles POLY-005

The synthesis of copolymeric nanoparticles POLY-005 (as an aqueous suspension) was done by mixing a prepolymer solution, which comprised 236 Kg of deionized water, 47.0 Kg of styrene, 50.0 Kg of butyl methacrylate, 3.00 Kg of N,N-dimethylamino ethylmethacrylate, 0.82 Kg of ammonium bicarbonate and 0.82 Kg n-octanol in a 1,000-liter stainless steel tank with a high shear mixer. In a separate smaller tank, a solution of ammonium persulfate free radical initiator was prepared by dissolving 0.42 Kg of ammonium persulfate into 10 Kg deionized water.

One hundred and sixty kilograms of the prepolymer solution were loaded in the reactor. The temperature was slowly raised to 80° C. and the remaining prepolymer solution was added to the reactor using a dosing pump at a rate 32.0 Kg per hour. Simultaneously, the ammonium persulfate solution was also added to the reactor using a dosing pump at a rate of 2.00 Kg per hour.

After both solutions were completely added to the reactor, the polymerization was continued at 80° C. under nitrogen atmosphere and constant stirring for additional 15 hours. Reaction samples were removed from the reactor after 16, 20 and 24 hours to measure the solid weight for monitoring the completeness of the polymerization.

The particle size of the copolymeric nanoparticles was measured to be 1,250 nm with a polydispersity of 0.120.

Then, 6.60 Kg of gibberellic acid were slowly added to the reactor and the stirring continued in the same conditions for an additional 3 hours.

Copolymer POLY-005 was:

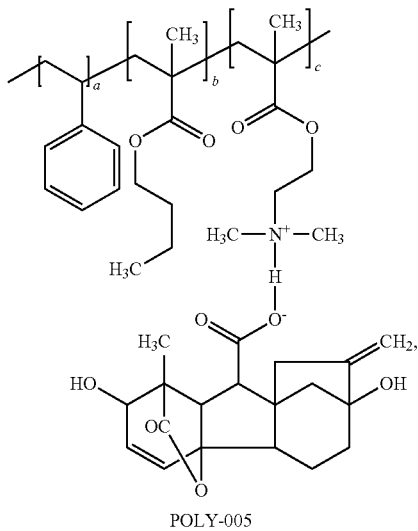

POLY-005 with a being 44 wt %, b being 47 wt % and c being 9 wt %.

The particle size and polydispersity were measured to be 109 nm and 0.078, respectively.

Deionized water was added to the reactor to adjust the solid weight to 25%, thus producing a suspension that could directly be used (with optional further dilution as desired) to produce smart release potash fertilizers.

Figure 7:
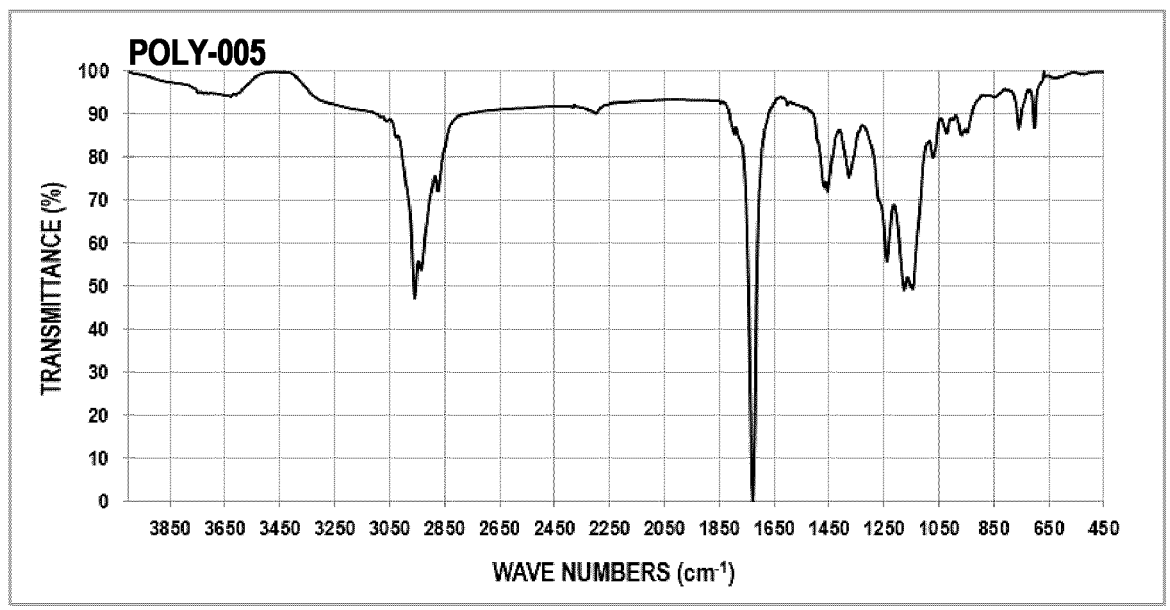
FIG. 7 is the FTIR spectrum of copolymeric nanoparticles POLY-005 in in a KBr pellet.

FIG. 7 shows the FTIR spectrum of copolymeric nanoparticles POLY-005 in a KBr pellet.

Example 6—Water-Insoluble Copolymeric Nanoparticles POLY-006

The synthesis of copolymeric nanoparticles POLY-006 (as an aqueous suspension) was performed in the same manner as in Example 5 with the exception that the monomers were 44.0 Kg of styrene, 50.0 Kg of butyl methacrylate and 6.00 Kg of 2-(dimethylamino)ethyl methacrylate. After 24 hours of polymerization, 13.2 Kg of gibberellic acid were slowly added to the reactor. The reaction was continued, stirring, in the same conditions for an additional 3 hours. Then, the reactor was cooled to room temperature and deionized water was added to dilute the product to 25% solid weight, thus producing a suspension that could directly be used (with optional further dilution as desired) to produce smart release potash fertilizers.

Copolymer POLY-006 was:

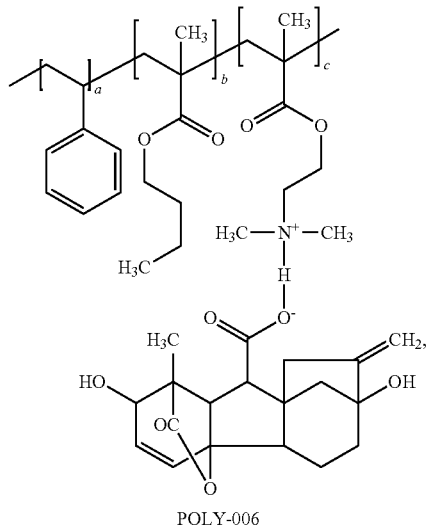

POLY-006 with a being 39 wt %, b being 44 wt % and c being 17 wt %.

Figure 8:
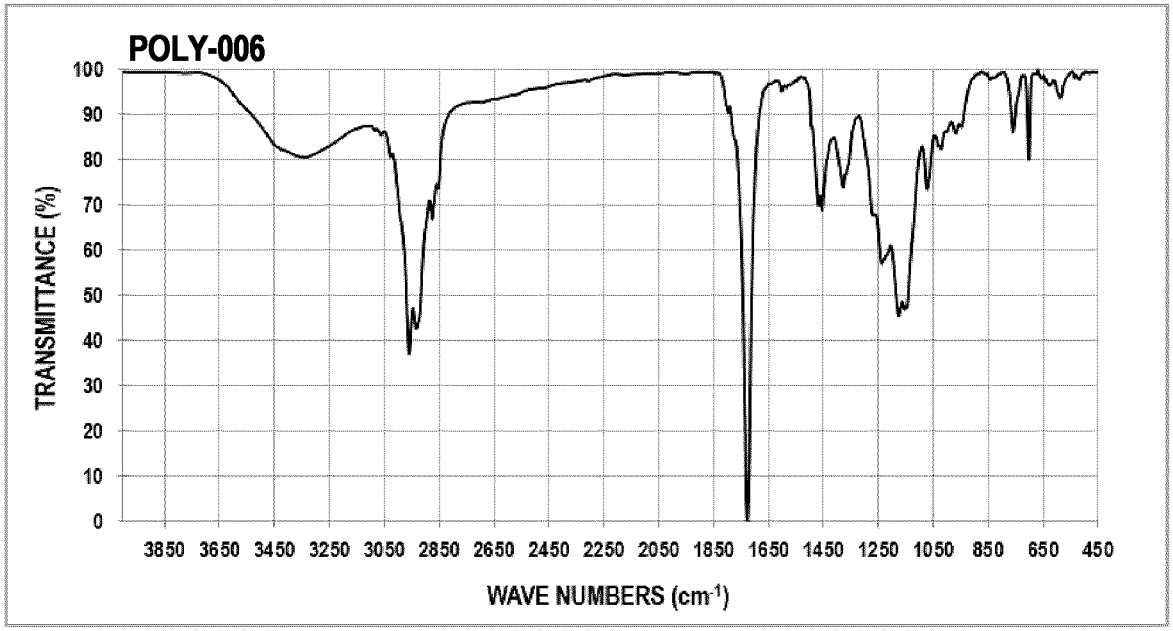
FIG. 8 is the FTIR spectrum of copolymeric nanoparticles POLY-006 in in a KBr pellet.

FIG. 8 shows the FTIR spectrum of copolymeric nanoparticles POLY-006 in a KBr pellet.

Example 7—Water-Insoluble Copolymeric Nanoparticles POLY-007

The synthesis of copolymeric nanoparticles POLY-007 (as an aqueous suspension) was performed in the same manner as in Example 5 with the exception that the monomers were 47.0 Kg of styrene, 50.0 Kg of butyl methacrylate and 3.00 Kg of 2-(dimethylamino)ethyl methacrylate. After 24 hours of polymerization, 3.55 Kg of 1-naphthalene acetic acid were slowly added to the reactor. The reaction was continued, stirring, in the same conditions, for an additional 3 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-007 was:

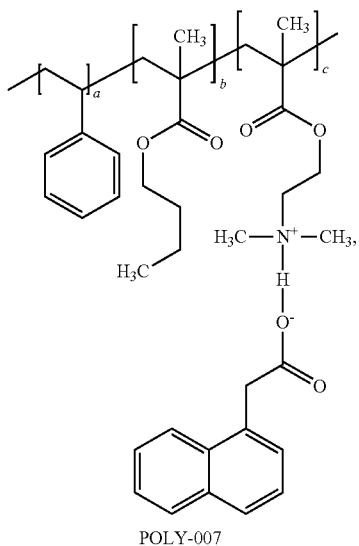

POLY-007 with a being 46 wt %, b being 48 wt % and c being 6 wt %.

The particle size and polydispersity of POLY-007 were measured to be 76 nm and 0.03, respectively.

Figure 9:
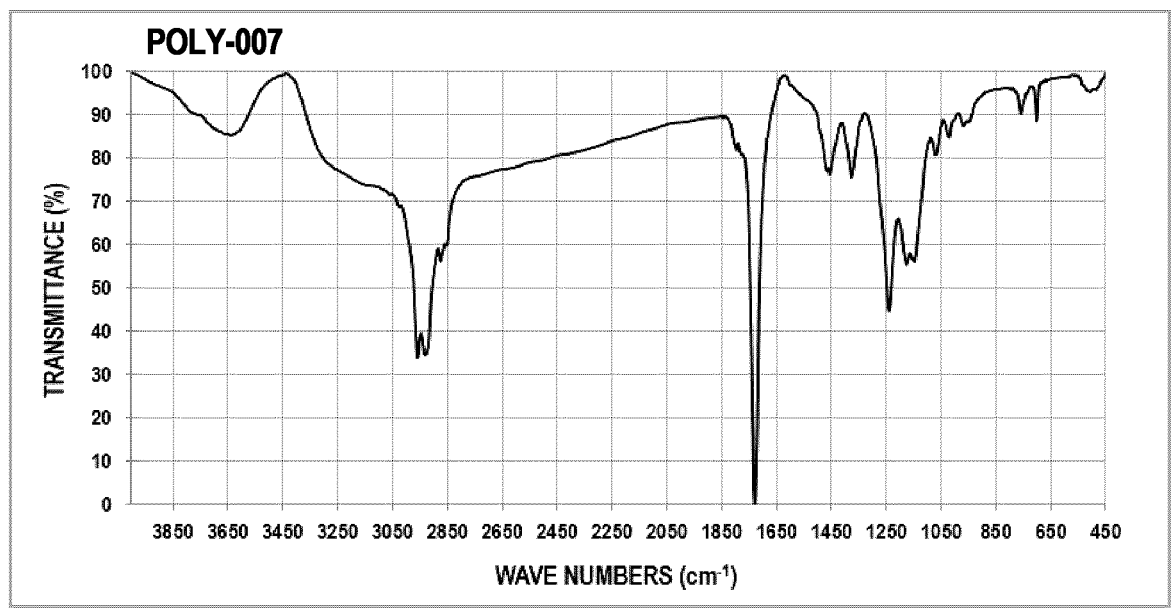
FIG. 9 is the FTIR spectrum of copolymeric nanoparticles POLY-007 in in a KBr pellet.

FIG. 9 shows the FTIR spectrum of POLY-007 in a KBr pellet.

Copolymer POLY-008 was:

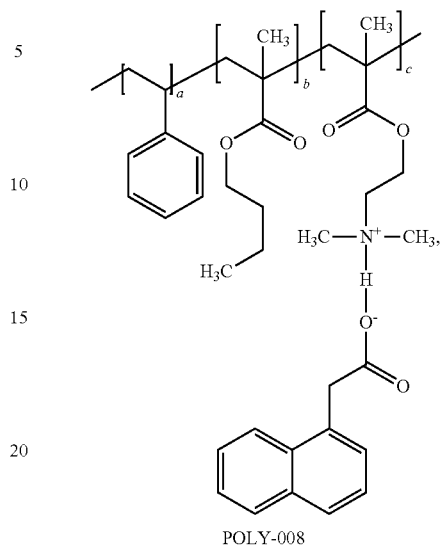

POLY-008 with a being 41 wt %, b being 47 wt % and c being 12 wt %.

Figure 10:
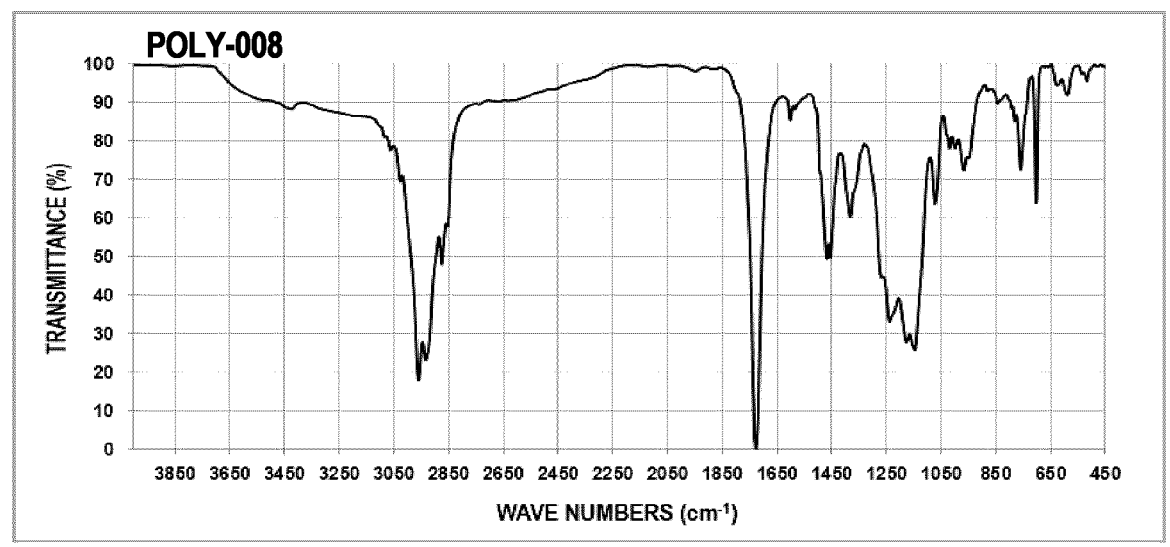
FIG. 10 is the FTIR spectrum of copolymeric nanoparticles POLY-008 in in a KBr pellet.

FIG. 10 shows the FTIR spectrum of POLY-008 in a KBr pellet.

Example 8—Water-Insoluble Copolymeric Nanoparticles POLY-008

The synthesis of copolymeric nanoparticles POLY-008 (as an aqueous suspension) was performed in the same manner as in Example 5 with the exception that the monomers were 44.0 Kg of styrene, 50.0 Kg of butyl methacrylate and 6.00 Kg of 2-(dimethylamino)ethyl methacrylate. After 24 hours of polymerization, 7.10 Kg of 1-naphthalene acetic acid were slowly added into the reactor. The reaction was continued, stirring, in the same conditions, for an additional 3 hours. Then, the reactor was cooled to room temperature and deionized water was added to dilute to 25% solid weight, thus producing a suspension that could directly be used (with optional further dilution as desired) to produce smart release potash fertilizers.

Example 9—Water-Insoluble Copolymeric Nanoparticles POLY-009

The synthesis of copolymeric nanoparticles POLY-009 was performed in the same manner as in Example 5 with the exception that the monomers were 47.0 Kg of styrene, 50.0 Kg of butyl methacrylate and 3.00 Kg of 2-(dimethylamino) ethyl methacrylate. After 24 hours of polymerization, 3.20 Kg of 4-nitrobenzoic acid were slowly added into the reactor. The reaction was continued, stirring, in the same conditions, for an additional 3 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-009 was:

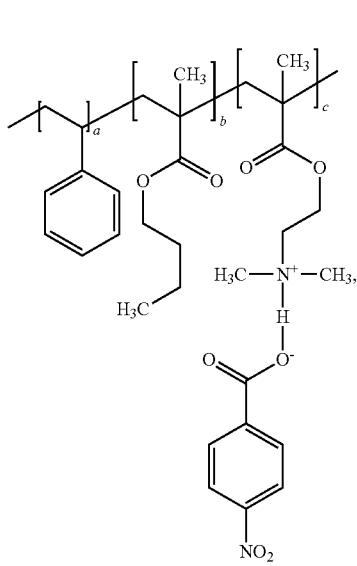

POLY-009 with a being 46 wt %, b being 48 wt % and c being 6 wt %.

The particle size and polydispersity of POLY-009 were measured to be 109 nm and 0.021, respectively.

Figure 11:
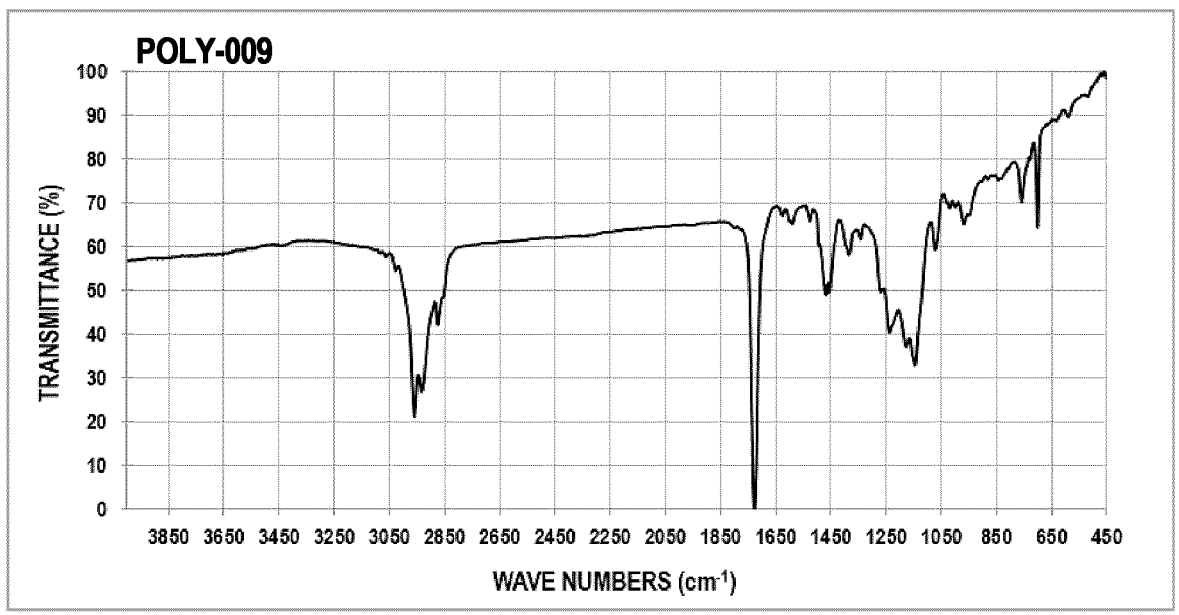
FIG. 11 is the FTIR spectrum of copolymeric nanoparticles POLY-009 in a KBr pellet.

FIG. 11 shows the FTIR spectrum of POLY-009 in a KBr pellet.

Example 10—Water-Insoluble Copolymeric Nanoparticles POLY-010

The synthesis of copolymeric nanoparticles POLY-010 (as an aqueous suspension) was performed in the same manner as in Example 5 with the exception the monomers were 47.0 Kg of styrene, 50.0 Kg of butyl methacrylate and 3.00 Kg of 2-(dimethylamino)ethyl methacrylate. After 24 hours of polymerization, 2.64 Kg of salicylic acid were slowly added to the reactor. The reaction was continued, stirring, in the same conditions for an additional 3 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-010 was:

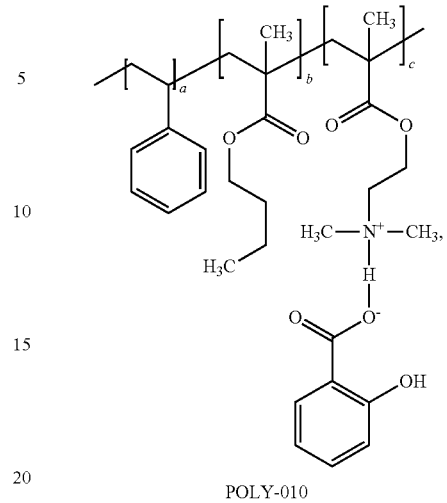

POLY-010 with a being 46 wt %, b being 49 wt % and c being 5 wt %.

The particle size and polydispersity of POLY-010 were measured to be 94 nm and 0.04, respectively.

Figure 12:
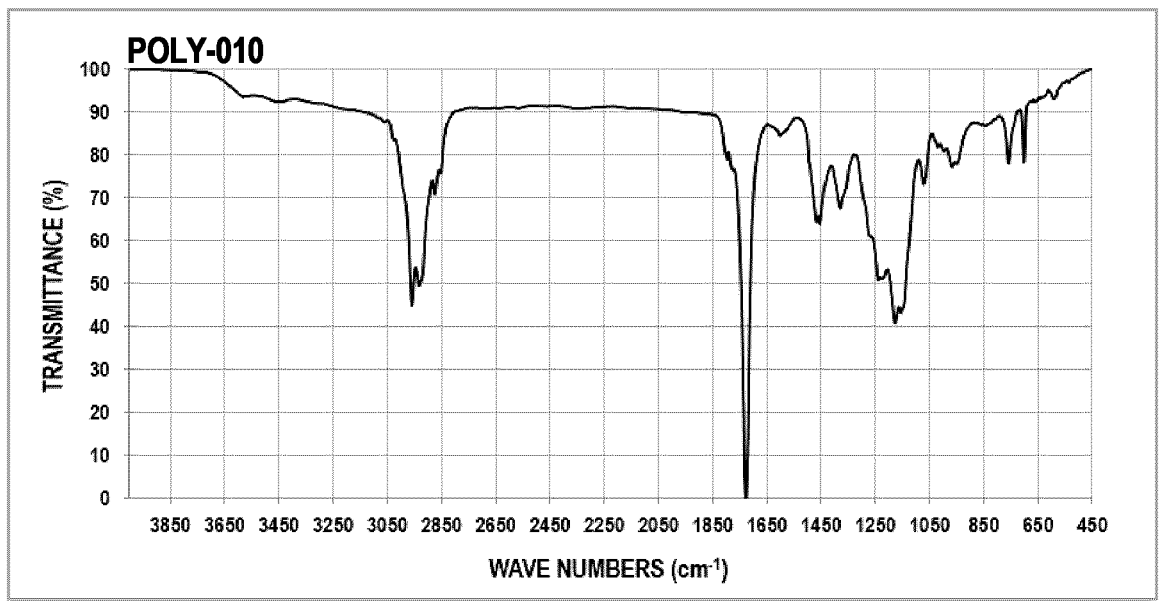
FIG. 12 is the FTIR spectrum of copolymeric nanoparticles POLY-010 in a KBr pellet.

FIG. 12 shows the FTIR spectrum of POLY-010 in KBr pellet.

Example 11—Water-Insoluble Copolymeric Nanoparticles POLY-011

The synthesis of POLY-011 (as an aqueous suspension) was performed in the same manner as in Example 5 with the exception that the monomers were 47.0 Kg of styrene, 50.0 Kg of butyl methacrylate and 3.00 Kg of 2-(dimethylamino) ethyl methacrylate. After 24 hours of polymerization, 3.56 Kg of 4-chlorophenyloxy acetic acid were slowly added to the reactor. The reaction was continued, stirring, in the same conditions for an additional 3 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-011 was:

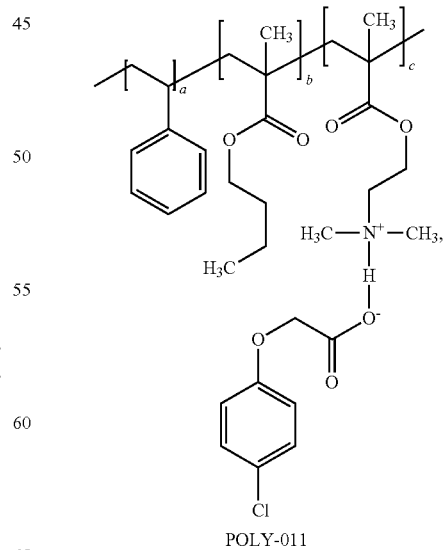

POLY-011 with a being 46 wt %, b being 48 wt % and c being 6 wt %.

The particle size and polydispersity were measured to be 91 nm and 0.035, respectively.

Figure 13:
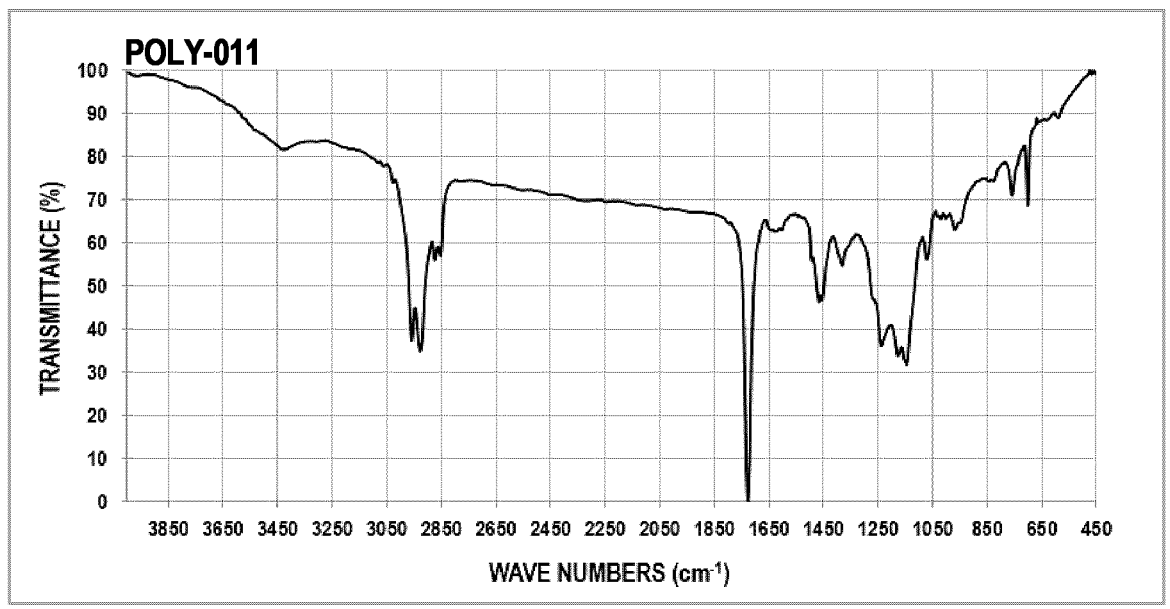
FIG. 13 is the FTIR spectrum of copolymeric nanoparticles POLY-011 in a KBr pellet.

FIG. 13 shows the FTIR spectrum of POLY-011 in a KBr pellet.

Example 12—Water-Insoluble Copolymeric Nanoparticles POLY-012

The synthesis of POLY-012 (as an aqueous suspension) was performed in the same manner as in Example 4 with the exception that the monomers were 47.0 Kg of styrene, 50.0 Kg of butyl methacrylate and 3.00 Kg of 2-(1-naphthalene acetamido)-ethyl methacrylate. The reaction was continued, stirring, for 24 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-012 was:

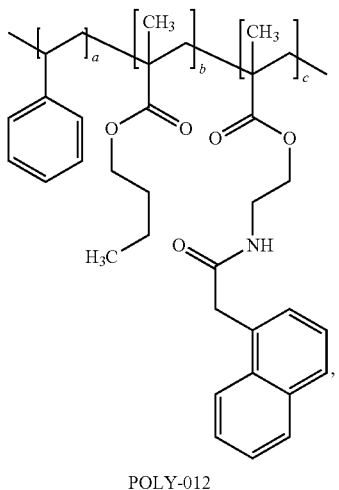

POLY-012 with a being 47 wt %, b being 50 wt % and c being 3 wt %.

The particle size and polydispersity were measured to be 76 nm and 0.015, respectively.

Figure 14:
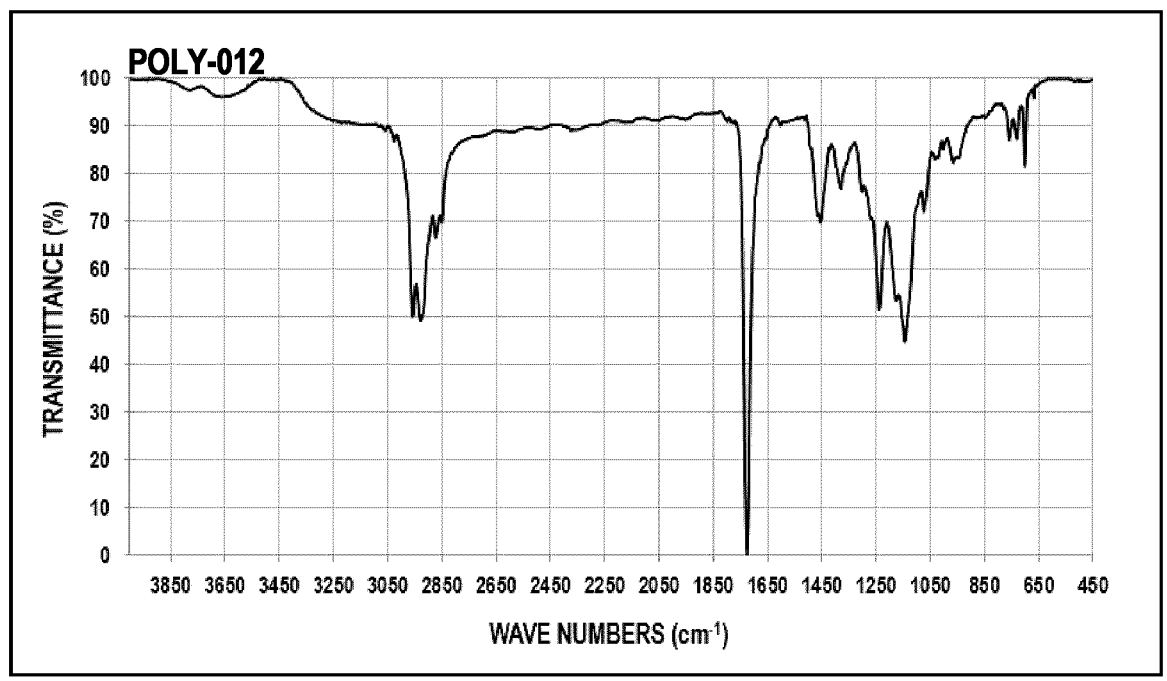
FIG. 14 is the FTIR spectrum of copolymeric nanoparticles POLY-012 in a KBr pellet.

FIG. 14 shows the FTIR spectrum of POLY-012 in a KBr pellet.

Example 13—Water-Insoluble Copolymeric Nanoparticles POLY-013

The synthesis of POLY-013 (as an aqueous suspension) was performed in the same manner as in Example 4 with the exception that the monomers were 47.0 Kg of styrene, 50.0 Kg of butyl methacrylate and 3.00 Kg of 2-(gibberellido)-ethyl methacrylate. The reaction was continued stirring for 24 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-013 was:

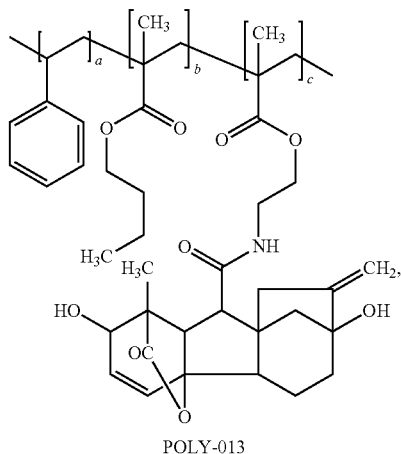

POLY-013 with a being 47 wt % and b being 50 wt % and c being 3 wt %.

The particle size and polydispersity were measured to be 107 nm and 0.007, respectively.

Figure 15:
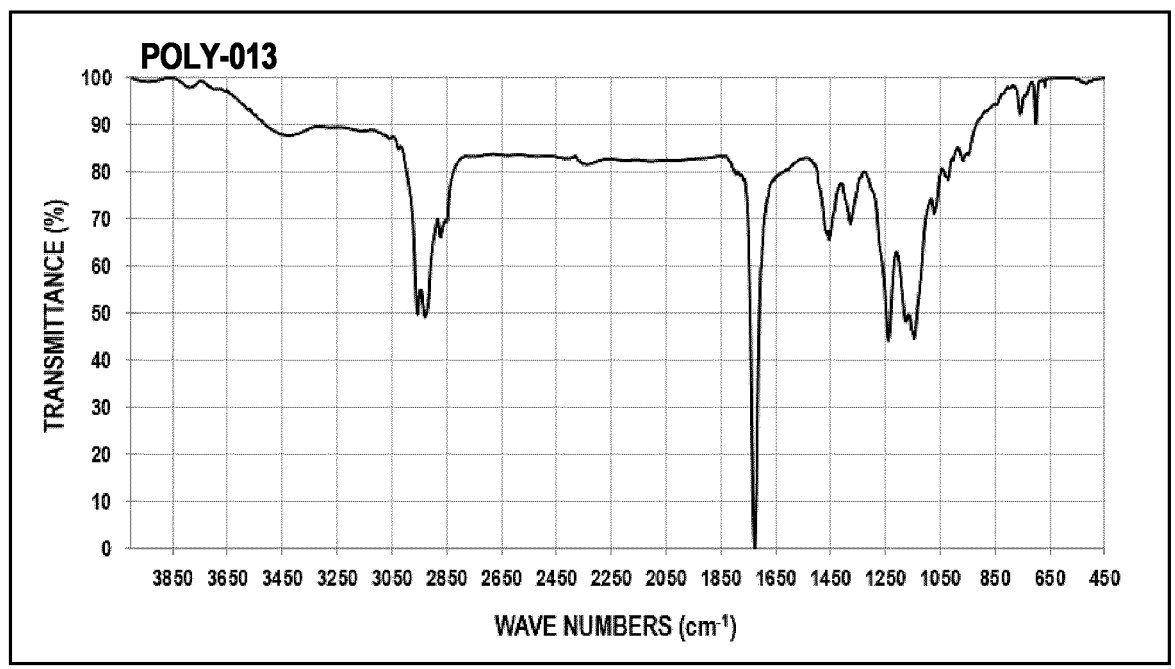
FIG. 15 is the FTIR spectrum of copolymeric nanoparticles POLY-013 in a KBr pellet.

FIG. 15 shows the FTIR spectrum of POLY-013 in a KBr pellet.

Example 14—Water-Insoluble Copolymeric Nanoparticles POLY-014

The synthesis of POLY-014 (as an aqueous suspension) was performed in the same manner as in Example 4 with the exception that the monomers were 47.0 Kg of styrene, 50.0 Kg of butyl methacrylate and 3.00 Kg of 2-(2-hydroxyphe-nylamido)-ethyl methacrylate. The reaction was continued, stirring, for 24 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-014 was:

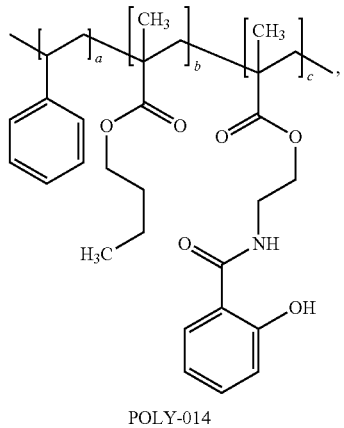

POLY-014 with a being 47 wt %, b being 50 wt % and c being 3 wt %.

The particle size and polydispersity were measured to be 107 nm and 0.007, respectively.

Figure 16:
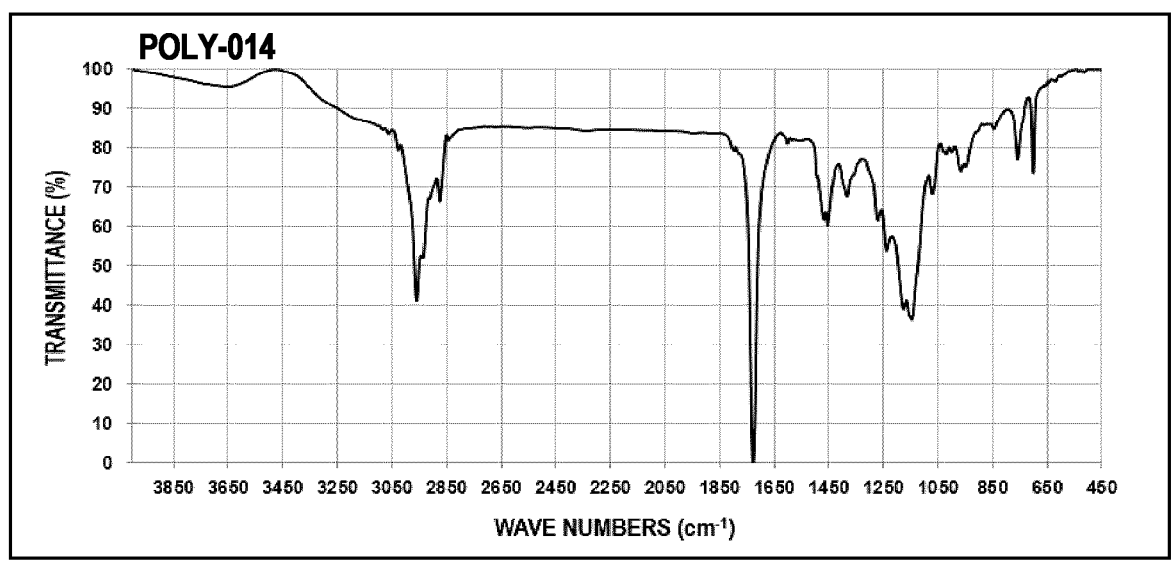
FIG. 16 is the FTIR spectrum of copolymeric nanoparticles POLY-014 in a KBr pellet.

FIG. 16 shows the FTIR spectrum of POLY-014 in a KBr pellet.

Example 15—Water-Insoluble Copolymeric Nanoparticles POLY-015

The synthesis of POLY-015 (as an aqueous suspension) was performed in the same manner as in Example 4 with the exception that the monomers were 47.0 Kg of styrene, 50.0 Kg of butyl methacrylate and 3.00 Kg of 2-(4-chlorophenylamido)-ethyl methacrylate. The reaction was continued, stirring, for 24 hours. Then, the reactor was cooled to room temperature and deionized water was added to dilute to 25% solid weight, thus producing a suspension that could directly be used (with optional further dilution as desired) to produce smart release potash fertilizers.

Copolymer POLY-005 was:

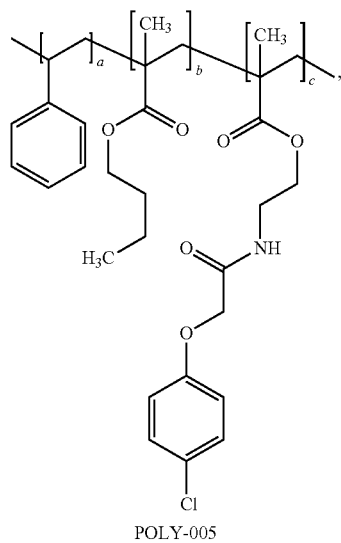

POLY-005 with a being 47 wt %, b being 50 wt % and c being 3 wt %.

The particle size and polydispersity were measured to be 80 nm and 0.018, respectively.

Figure 17:
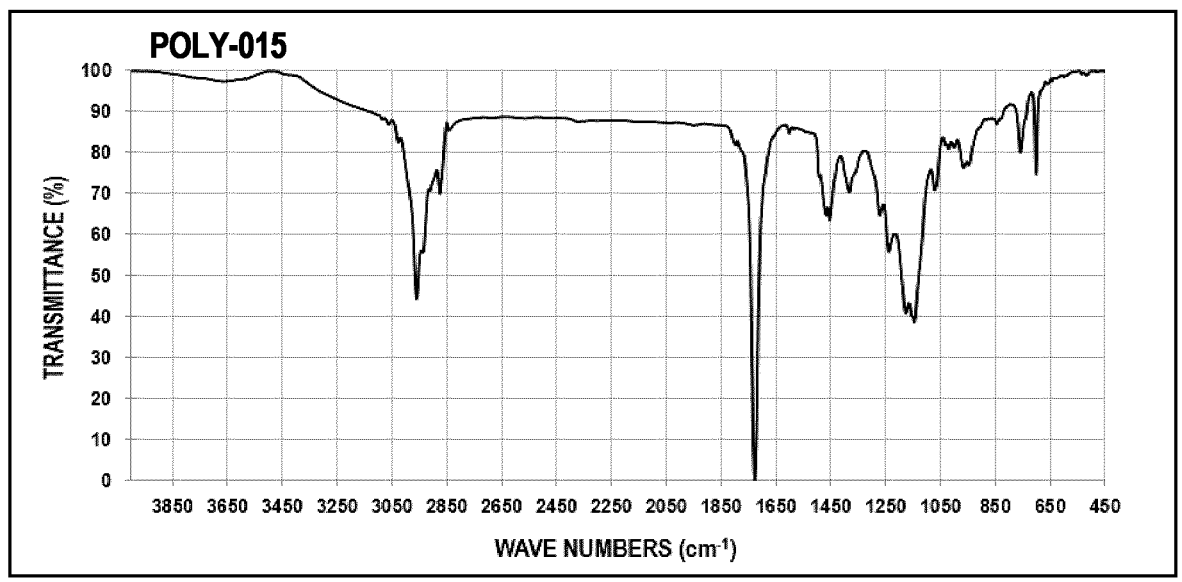
FIG. 17 is the FTIR spectrum of copolymeric nanoparticles POLY-015 in a KBr pellet.

FIG. 17 shows the FTIR spectrum of POLY-015 in a KBr pellet.

Production of Smart Release Potash Fertilizers

Irregularly shaped potash granules (potassium chloride 00:00:61, available from Phu My Fertilizers, Vietnam) were sieved to remove granules less than 2.0 mm in size. Then, the sieved potash granules (10 Kg) were loaded into a home-built Wurster fluidized bed. The bed temperature was set at 32±2° C. with 20% relative humidity using a hot air stream at a speed of 300 to 400 m³ per hour. The potash granules were agitated using this hot air stream. First, the granules were agitated for 5 minutes to dry them.

Coating the Granules with an Extended Release Layer (104)

An aqueous solution containing 5% solid weight of copolymeric nanoparticles together with an organic acid was sprayed from the bottom of the fluidized bed at the rate of 60 grams per minute. The mists were carried by the hot air stream and deposited the copolymeric nanoparticles and organic acid onto the surface of the potash granules (which were floating in the hot air stream of the fluidized bed). This process was continued until the desired coating thickness was reached.

Then, the spraying was stopped, and the granules were agitated by the hot air stream of the fluidized bed in the same conditions for an additional 10 minutes to dry the granules before the next layer (controlled release layer (106)) was applied.

Coating the Granule with a Controlled Release Layer (106)

The coating of the controlled release layer (106) on top of the extended release layer (104) was done in the same manner with the exception that an aqueous solution contained only copolymeric nanoparticles (25% solid weight) was sprayed. This process was continued until the desired coating thickness was reached.

Then, the spraying was stopped and the granules were agitated by the hot air stream of the fluidized bed in the same conditions for an additional 10 minutes to dry the granules before the next layer (anticaking layer (108)) was applied.

Coating the Anticaking Layer (108)

The coating of the anticaking layer (108) on top of the controlled release layer (106) was done in the same manner with the exception that temperature of the fluid bed was raised to 45° C.

After the desired thickness was reached, the spraying was stopped, and the granules were agitated by the hot air stream of the fluidized bed in the same conditions for an additional 20 minutes to completely remove the water.

For comparison purpose, the total weight of the copolymers in the extended release layer and controlled release layer was kept at 10 wt % based on the weight of the potash core.

Characterization of the Smart Release Potash Fertilizers
Determination the Cumulative Potassium Release To measure the potassium release in water, 4 g of coated smart release potash fertilizer granules were immersed in 400 mL water in a glass bottle. The glass bottle was placed in an oven at 30° C. At specific times, 5 mL of solution were collected for the determination of potassium concentration. The sample solution was pumped into an atomic absorption spectrometer (Perkin Elmer® AAnalyst 200) to record the potassium atomic absorption.

A set of five standard KCl solutions with known concentrations were prepared and their potassium atomic absorption were measured. A calibration curve of the potassium atomic absorption vs the potassium concentration was plotted. To determine an unknown potassium concentration in an aqueous sample, the potassium absorption of the sample was compared with the calibration curve, which allowed to determine its potassium concentration. If the potassium absorption was not in the working range of the calibration curve, the sample solution was diluted in HCl 1% before AAS analysis.

The cumulative potassium release (%) was calculated using the following equation:

$$\% \text{ Cumulative release of potassium} = M_{release}/M_{total\ release} \times 100$$

wherein $M_{release}$ is the weight of potassium released in the aqueous solution at a specific time and $M_{total\ release}$ is the maximum weight of potassium released in the aqueous solution by the fertilizer. To obtain the $M_{total\ release}$ value, the coated fertilizer granules were ground to a fine powder, which was dissolved in water, and the potassium concentration of the resulting solution was determined as described above.

Determination of the Organic Acid Cumulative Release 24 g coated fertilizer granules were immersed in 200 mL water in a glass bottle that was stored in an oven at 30° C. After specific periods of time, a 5 mL sample solution was collected for UV-vis spectroscopy analysis using a Jasco® V-670 absorption spectrometer. The absorption intensity at a particular wavelength was compared with a calibration curve to calculated the organic acid concentration released. The percentage of organic acid release was calculated using the following equation:

% Cumulative Release of Organic Acid=$M_{release}/M_{total\ release} \times 100$ wherein $M_{release}$ is the weight of analyte released in the aqueous solution at a specific time and $M_{total\ release}$ is the maximum weight of analyte released in the aqueous solution. To determine $M_{total\ release}$, the fertilizer granules were ground into a fine powder and then dissolved in water, which allowed obtaining the maximum amount of water-soluble analytes ($m_{absolute-release}$) using the UV-vis absorption spectroscopy method described above.

Gibberellic Acid (GA3) Concentration Measurements

A solution of 4,000 ppm GA3 was prepared by dissolving 0.04 g of GA3 in 100 mL ethanol. For UV-Vis absorption analysis, the GA3 solution 4000 ppm was diluted with ethanol and a HCl solution 3.75M in a 25 mL volume flask to obtain standard GA3 solutions with specific concentrations (see the following table). Composition of standard GA3 solutions for UV-vis spectroscopy calibration

|  | Standard GA3 concentration (ppm) | | | | |
| --- | --- | --- | --- | --- | --- |
|  | 200 | 400 | 600 | 800 | 1000 |
| Volume of GA3 solution 4,000 ppm (mL) | 1.25 | 2.5 | 3.75 | 5 | 6.25 |
| Volume of ethanol (mL) | 1 | 1 | 1 | 1 | 1 |
| Volume of HCl solution 3.75M (mL) | 22.75 | 21.5 | 20.25 | 19 | 17.75 |

Indole-3-Acetic Acid, 4-Chlorophenoxyacetic Acid and 1-Naphthalene Acetic Acid Concentration Measurements Calibration curves of these organic acids were prepared by analyzing the UV-vis absorption spectra of solutions of known concentrations of the organic acids in ethanol. To determine the organic acid concentration in an aqueous sample, a 5 mL aqueous solution sample was diluted in ethanol two-fold for UV-vis spectroscopy. The absorption intensities at particular wavelengths were used to calculate the organic acid concentrations using the calibration curves.

For sample analysis, a 5 mL aqueous solution was mixed with 1 mL ethanol and 19 mL of a HCl solution 3.75M in a 25 mL volume flask. The resulting solution was analyzed with UV-vis spectroscopy. The absorption intensity at 254 nm was compared with the calibration curve to determine the organic acid concentration.

Salicylic Acid (SA) Concentration Measurements 0.1 g of SA was dissolved in 5 mL NaOH solution 1M, which was then diluted in water to obtain 100 mL SA solution 1000 ppm. The SA solution 1000 ppm was mixed with a $FeCl_3$ solution 0.02M in a 25 mL volume flask to produce standard SA solutions for the calibration curve (see the following table). Composition of standard SA solutions for UV-vis spectroscopy calibration are shown in the table below.

|  | Standard SA concentration (ppm) | | | | |
| --- | --- | --- | --- | --- | --- |
|  | 0 | 20 | 40 | 60 | 80 |
| Volume of SA solution 1000 ppm (mL) | 0 | 0.5 | 1 | 1.5 | 2 |
| Volume of $FeCl_3$ solution 0.02M (mL) | 25 | 24.5 | 24 | 23.5 | 23 |

In the concentration measurement, a 5 mL sample solution was diluted in 20Ml of a $FeCl_3$ solution 0.02M to obtain a violet solution. The absorption intensity at 529 nm was compared to the calibration curve to determine the SA concentration in the sample solution.

Examples 16-19—Cumulative Potassium Release vs Thickness of the Controlled Release Layer (106)

Smart potash fertilizer granules without extended release layer were produced to study the potassium release as a function of the controlled release layer. Smart potash fertilizer granules were thus produced by coating potash granules with:
an aqueous suspension of POLY-001 copolymeric nanoparticles to form a controlled release layer (106) with a coating weight of 7 wt % (Example 16), 10 wt % (Example 17), 13 wt % (Example 18) or 15 wt % (Example 19), the wt % being based on the weight of the potash core, and
an aqueous suspension of POLY-007 copolymeric nanoparticles to form an anti-caking layer (108) with a coating weight of 3 wt %, based on the weight of the potash core.

Figure 18:
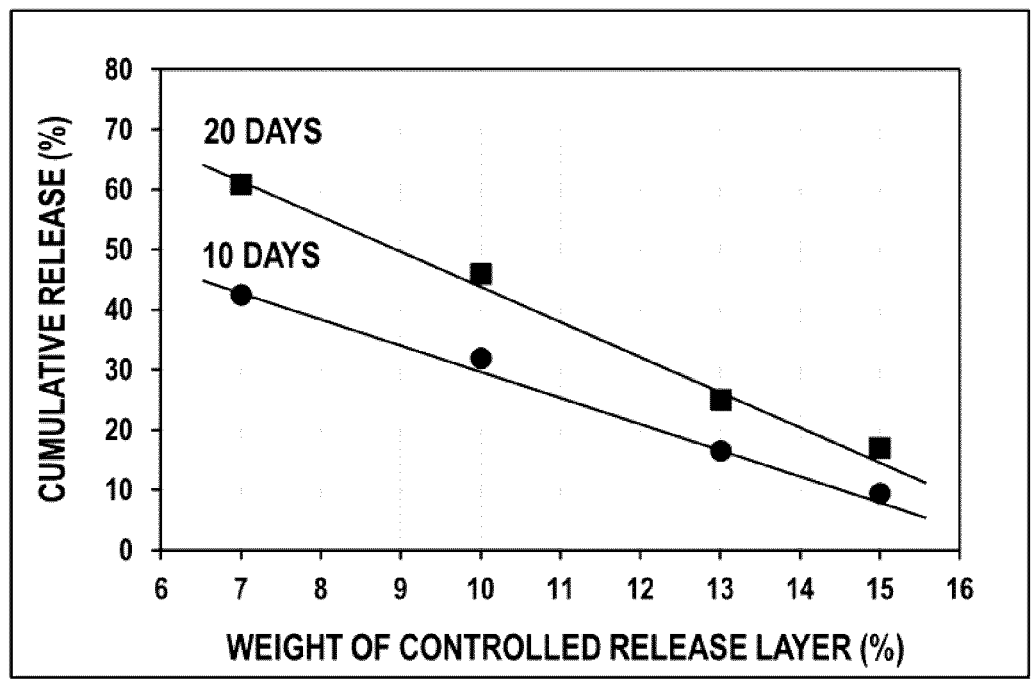
FIG. 18 shows the cumulative potassium release after 10 and 20 days as a function of the coating weight of the controlled release layer (106) for the fertilizers of Examples 16-19.
Figure 19:
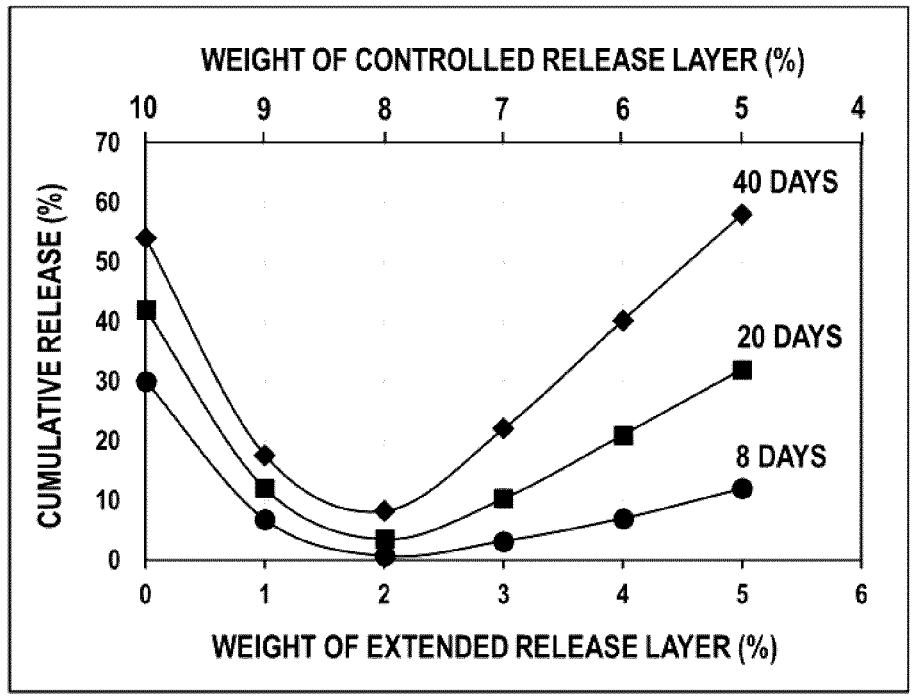
FIG. 19 a) shows the cumulative potassium release after 10, 20 and 40 days as a function of the coating weight of the extended release layer (104) for the fertilizers of Examples 20-24.
Figure 19:
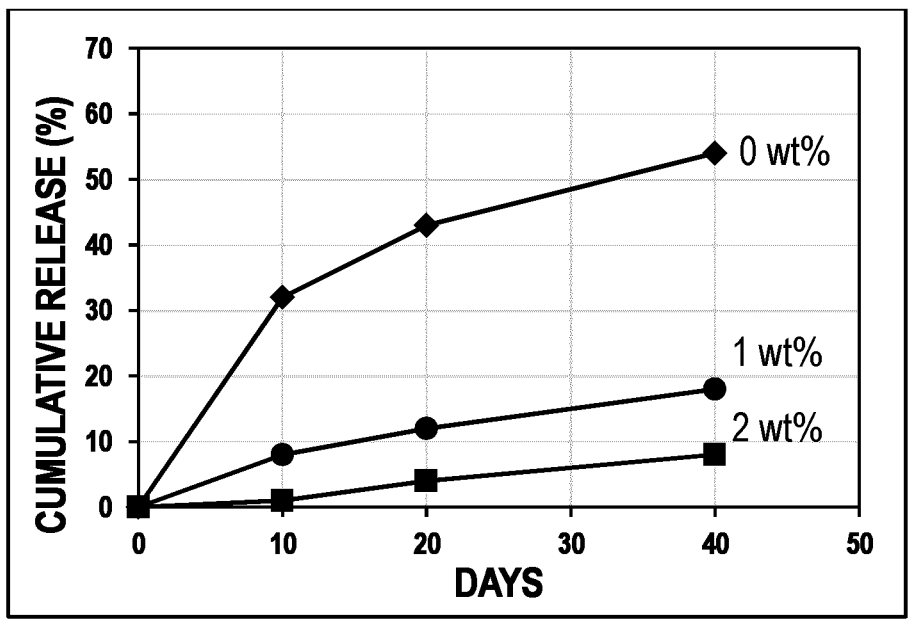
Figure 19:
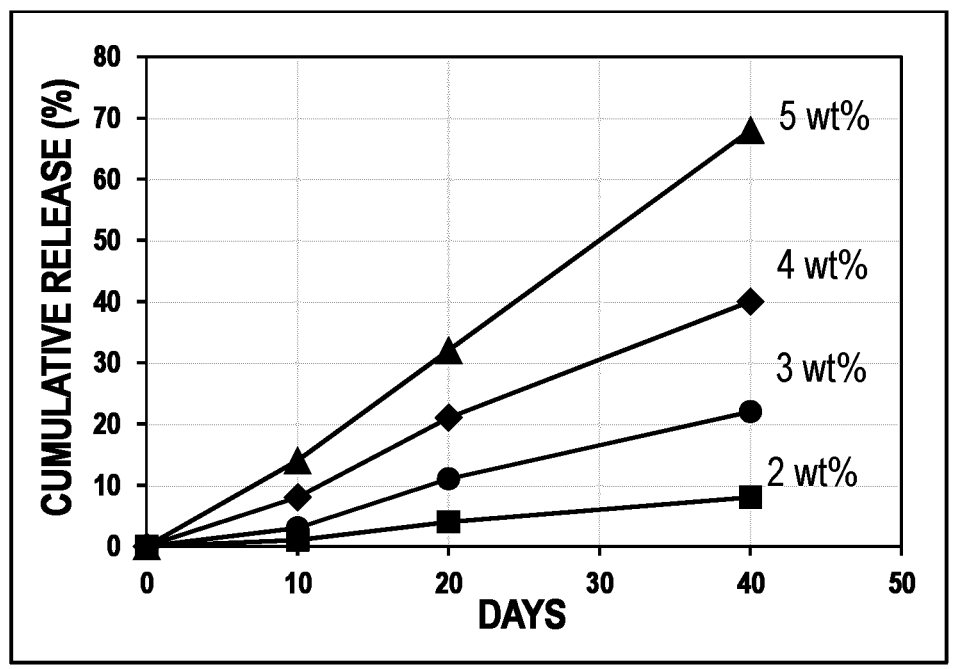

FIG. 18 shows the cumulative potassium release after 10 and 20 days for the fertilizers with different weight percent, i.e. different thickness, of the controlled release layer (106). The cumulative potassium release was linearly related to the coating weight of controlled release layer (106).

Examples 20-24—Cumulative Potassium Release Vs Thickness of Extended Release Layer (104)

Smart release potash fertilizers were produced by coating potash granules:
with an aqueous suspension comprising 2.5% solid weight of POLY-001 and 2.5% solid weight of gibberelic acid at 32° C. to form an extended release layer (104) with a coating weight of 0 (Example 13), 1 (Example 20), 2 (Example 21), 3 (Example 22), 4 (Example 23), or 5 (Example 24) wt %, based on the weight of the potash core,
then, with an aqueous suspension comprising 25% of POLY-001 to form a controlled release layer (106), and
finally, with an aqueous suspension comprising 25% solid weight of POLY-007 to form an anti-caking layer (108) with a coating weight of 3 wt %, based on the weight of the potash core.

The coating weight of controlled release layer (106) was adjusted so that the total coating weight of the extended release layer (104) and controlled release layer (106) was 10 wt %, based on the weight of the potash core.

FIG. 19a) shows the cumulative potassium release after 10, 20 and 40 days as a function of the coating weight of the extended release layer (104) for the above smart release potash fertilizers.

The cumulative potassium release decreased with increasing coating weight of the extended release layer (104) until it reached a minimum at around 2 and 3 wt %, based on the weight of the potash core. Then, the cumulative potassium release increased with increasing coating weight of the extended release layer (104) (i.e. decreasing coating weight of the controlled release layer (106)).

The same release data have been plotted in FIGS. 19b) and c). FIG. 19b) shows the cumulative potassium release as a function of the days for the above smart release potash fertilizers having an extended release layer (104) with a coating weight of from 0 to 2 wt %. FIG. 19c) shows the cumulative potassium release as a function of the days for the above smart release potash fertilizers having an extended release layer (104) with a coating weight of from 2 to 5 wt %. Two release regimes can be easily identified: one with thinner extended release layer (thus thicker controller release layer) in which release slows with time and another with thicker extended release layer (thus thinner controller release layer) in which release speeds with time.

Examples 25-29—Cumulative Potassium Release Vs Thickness of Extended Release Layer (104)

Smart release potash fertilizers were produced by coating potash granules:
with an aqueous suspension comprising 2.5% solid weight of POLY-001 and 2.5% solid weight of gluconic acid at 32° C. to obtain an extended release layer (104) with a coating weight of 1 wt % (Example 25), 2 wt % (Example 26), 3 wt % (Example 27), 4 wt % (Example 28), or 5 wt % (Example 29), the wt % being based on the weight of the potash core,
then with an aqueous suspension comprising 25% of POLY-001 to form a controlled release layer (106), and
finally, with an aqueous suspension comprising 25% solid weight of POLY-007 to form an anti-caking layer (108) with a coating weight of 3 wt %, based on the weight of the potash core.
The coating weight of controlled release layer (106) was adjusted so that the total coating weight of the extended release layer (104) and controlled release layer (106) was 10 wt %, based on the weight of the potash core.

Figure 20:
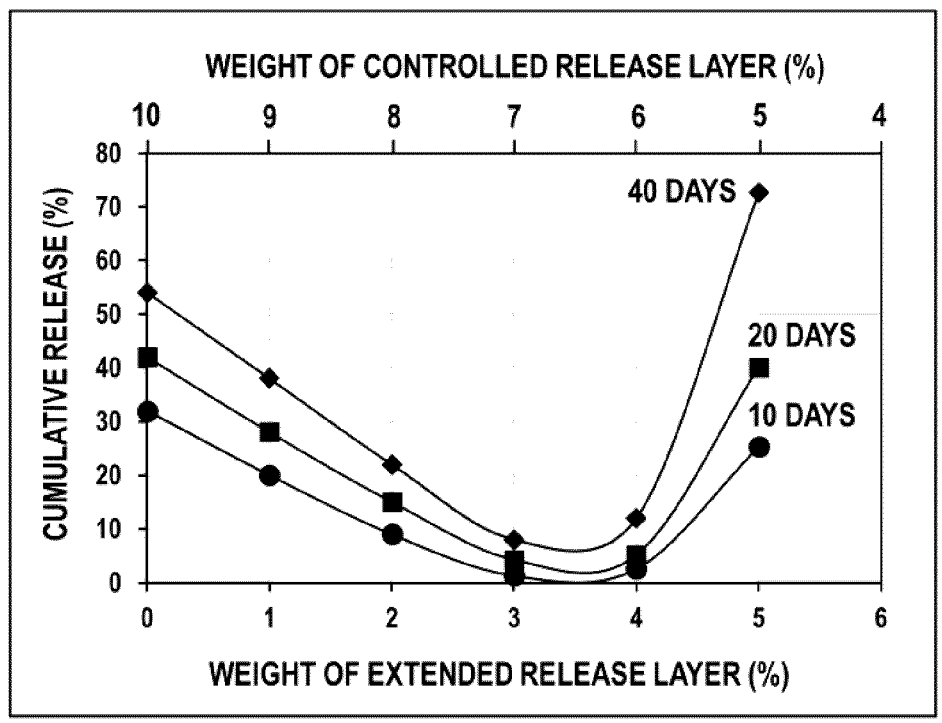
FIG. 20 shows the cumulative potassium release after 10, 20 and 40 days as a function of the coating weight of the extended release layer (104) for the fertilizers of Examples 25-29.

FIG. 20 shows the cumulative potassium release after 10, 20 and 40 days for the above smart release potash fertilizers.

The cumulative potassium release decreased with increasing coating weight of the extended release layer (104) until it reached a minimum at around 3 and 4 wt % (based on the weight of the potash core). Then, the cumulative potassium release increased with increasing coating weight of the extended release layer (104) (i.e. decreasing coating weight of the controlled release layer (106)).

Examples 30-35—Cumulative Potassium Release from Fertilizers with Various Organic Acids Smart release potash fertilizers were produced by coating potash granules:
with an aqueous suspension comprising copolymeric nanoparticles POLY-001 and different organic acids (in a 50:50 nanoparticles:acid weight ratio) to form an extended release layer (104) with a coating weight of 1 wt %, based on the weight of the potash core,
then, with an aqueous suspension comprising copolymeric nanoparticles POLY-001 to form a controlled release layer (106) with a coating weight of 9 wt %, based on the weight of the potash core, and
finally, with an aqueous suspension comprising copolymeric nanoparticles POLY-007 to form an anti-caking layer (108) with a coating weight of 3 wt %, based on the weight of the potash core.

The following table shows the cumulative potassium release from these smart release potash fertilizers after 10, 20 and 40 days, compared to a similar fertilizer without acid (Example 15). Cumulative potassium release was slower when the extended release layer (104) comprised an organic acid with a pKa smaller than 4.75.

Cumulative potassium release after 10, 20 and 40 days

| Examples | pKa | Organic Acid | Cumulative Release of Potassium (%) | | |
| --- | --- | --- | --- | --- | --- |
| | | | 10 Days | 20 Days | 40 Days |
| 15 | N/A | N/A | 32.2 | 46.0 | 100 |
| 30 | 2.97 | Salicylic Acid | 2.60 | 14.9 | 24.0 |
| 31 | 3.13; 4.76; 6.40 | Citric Acid | 1.10 | 1.50 | 2.60 |
| 32 | 3.56 | 4-Clorophenoxyacetic Acid | 3.40 | 8.40 | 15.4 |
| 21 | 3.60 | Gluconic Acid | 17.1 | 21.3 | 38.5 |
| 16 | 4.00 | Gibberellic Acid | 8.40 | 12.2 | 17.6 |
| 33 | 4.10 | Oxalic Acid | 8.65 | 9.90 | 14.2 |
| 34 | 4.23 | 1-Naphthalene Acetic Acid | 16.5 | 35.2 | 59.1 |
| 35 | 4.75 | Indole-3-Acetic Acid | 40.1 | 95.0 | N/A |

Examples 36-37—Cumulative Potassium Release from Fertilizers with Various Copolymeric Nanoparticles Smart release potash fertilizers were produced by coating potash granules:
with an aqueous suspension comprising 2.5% solid weight of gluconic acid and 2.5% solid weight of different copolymeric nanoparticles POLY-001 (Example 26), POLY-002 (Example 36), or POLY-003 (Example 37) to form an extended release layer (104) with a coating weight of 2 wt %, based on the weight of the potash core,
then, with an aqueous suspension comprising copolymeric nanoparticles POLY-001 to form a controlled release layer (106) with a coating weight of 8 wt %, based on the weight of the potash core, and
finally, with an aqueous suspension comprising copolymeric nanoparticles POLY-007 to form an anti-caking layer (108) with a coating weight of 3 wt %, based on the weight of the potash core.

The following table reports the cumulative potassium release from these smart release potash fertilizers after 10, 20 and 40 days. The smart release potash fertilizer with copolymeric nanoparticle POLY-002 provided the slowest cumulative potassium release of in water compared to POLY-001 and POLY-003.

Cumulative potassium release after 10, 20 and 40 days

| Examples | Copolymers | Cumulative Release of Potassium (%) | | |
|---|---|---|---|---|
| | | 10 Days | 20 Days | 40 Days |
| 26 | POLY-001 | 9.40 | 15.0 | 22.4 |
| 36 | POLY-002 | 9.20 | 12.5 | 17.4 |
| 37 | POLY-003 | 10.0 | 13.8 | 24.8 |

Examples 38-42—Acid Release from Fertilizers with Various Copolymeric Nanoparticles Smart release potash fertilizers were produced by coating potash granules:
  with an aqueous suspension comprising 2.5% solid weight of gluconic acid and 2.5% solid weight of POLY-001 to form an extended release layer (104) with a coating weight of 2 wt %, based on the weight of the potash core,
  then, with an aqueous suspension comprising copolymeric nanoparticles POLY-001 to form a controlled release layer (106) with a coating weight of 8 wt %, based on the weight of the potash core, and
  finally, with an aqueous suspension comprising copolymeric nanoparticles comprising POLY-005 (Example 38), POLY-007 (Example 39), POLY-009 (Example 40), POLY-010 (Example 42), or POLY-011 (Example 42) to form an anti-caking layer (108) with a coating weight of 3 wt %, based on the weight of the potash core.

The following table reports the number of days required for the cumulative anion (acid) release to reach 100%. The cumulative the release was strongly dependent on the pKa of the associated acids. The stronger the acids, the longer slower the anion release.

Number of days required to reach 100% cumulative anion release

| Example | Copolymers | Anion Pendant Group | pKa* | Days required |
|---|---|---|---|---|
| 38 | POLY-005 | Gibberelloate | 4.00 | 10 days |
| 39 | POLY-007 | 1-Naphthalene acetoate | 4.23 | 12 days |
| 40 | POLY-009 | 4-Nitrobenzoate | 3.44 | 20 days |
| 41 | POLY-010 | Salicyloate | 2.60 | 36 days |
| 42 | POLY-011 | 4-Chlorophenyloxy acetoate | 3.58 | 15 days |

*of associated acids

Examples 43-47—Growing Okra with Smart Release Potash Fertilizers

The smart release potash fertilizers were used to grow Okra. Okra was chosen because can be harvested after a growth period of only 60 to 70 days.

The experiments were done by weighting 2 Kg of clay loam soil (35% sand, 35% silt and 30% clay) into plastic pots for planting. The fertilizer mix used comprised:
  5 grams of Rynan® N0703 (containing 42% Nitrogen, available from Rynan® Smart Fertilizers, Travinh, Vietnam),
  3 grams of Rynan® P0703 (containing 20% Phosphorus, available from Rynan® Smart Fertilizers, Travinh, Vietnam), and
  4 grams of smart release potash fertilizers comprising different concentrations of gibberelloate and 1-naphthalene acetoate anions in anticaking layer (108).

The table below reports the harvesting results (65 days old okra). The average fruit yield of the okra grown using the smart release potash fertilizer coated with the anticaking layer comprising POLY-004 (control) was 95 grams per gram. It was used as 100% yield for comparison purpose.

Harvesting results of the Okra at 65 days old

| Examples | Copolymers | Anions | Concentration (ppm) | Plant height (cm) | Stem Diameter (cm) | Yields (%) |
|---|---|---|---|---|---|---|
| 43 | POLY-004 | Control | 0 | 123.5 | 2.22 | 100 |
| 44 | POLY-005 | Gibberelloate | 235 | 136.5 | 2.43 | 100-105 |
| 45 | POLY-006 | Gibberelloate | 470 | 143.0 | 2.48 | 100-108 |
| 46 | POLY-007 | 1-Naphthalene acetoate | 68 | 153.5 | 2.59 | 140-150 |
| 47 | POLY-008 | 1-Naphthalene acetoate | 136 | 166.5 | 2.61 | 175-180 |

The smart release potash fertilizers coated with an anticaking layer (108) comprising 1-naphthalene acetoate anion in POLY-007 and POLY-008 gave the highest fruit yields. While the smart release potash fertilizers comprising gibberelloate anion in POLY-005 and POLY-006 did not increase the fruit yields.

Figure 21:
FIG. 21 is a photograph of the Okra plants grown using the fertilizers of Examples 43-47 at 60 days old.

FIG. 21 is a photograph of the Okra plants at 60 days old. The Okra trees grown with smart release potash fertilizers coated with an anticaking layer (108) comprising 1-naphthalene acetoate anion were taller and had bigger stems.

Examples 48-49—Growing Sugarcane with Fertilizers of the Invention

The smart release potash fertilizers were used to grow sugarcane (variety K95-156). The experiments were done with the two fertilizer formulations described in the following table.

| Fertilizers Applied | Ex. 48 (comparative) | Ex. 49 |
|---|---|---|
| | Amount per Hectare (Kg) | |
| Rynan ® N0703 (N: 42%, available from Rynan Smart Fertilizers, Travinh, Vietnam) | 240 | 240 |
| P-Fertilizer Rynan ® P0703 (N: 16% and P: 42%, available from Rynan Smart Fertilizers, Travinh, Vietnam) | 243 | 243 |
| Conventional potash fertilizer ($K_2O$: 61%, available from PhuMy Fertilizers JSC., Vungtau, Vietnam) | 112 | 0 |
| Fertilizer of Example 16 ($K_2O$: 55%) | 0 | 60 |
| Fertilizer of Example 35 ($K_2O$: 55%) | 0 | 52 |

Figure 22:
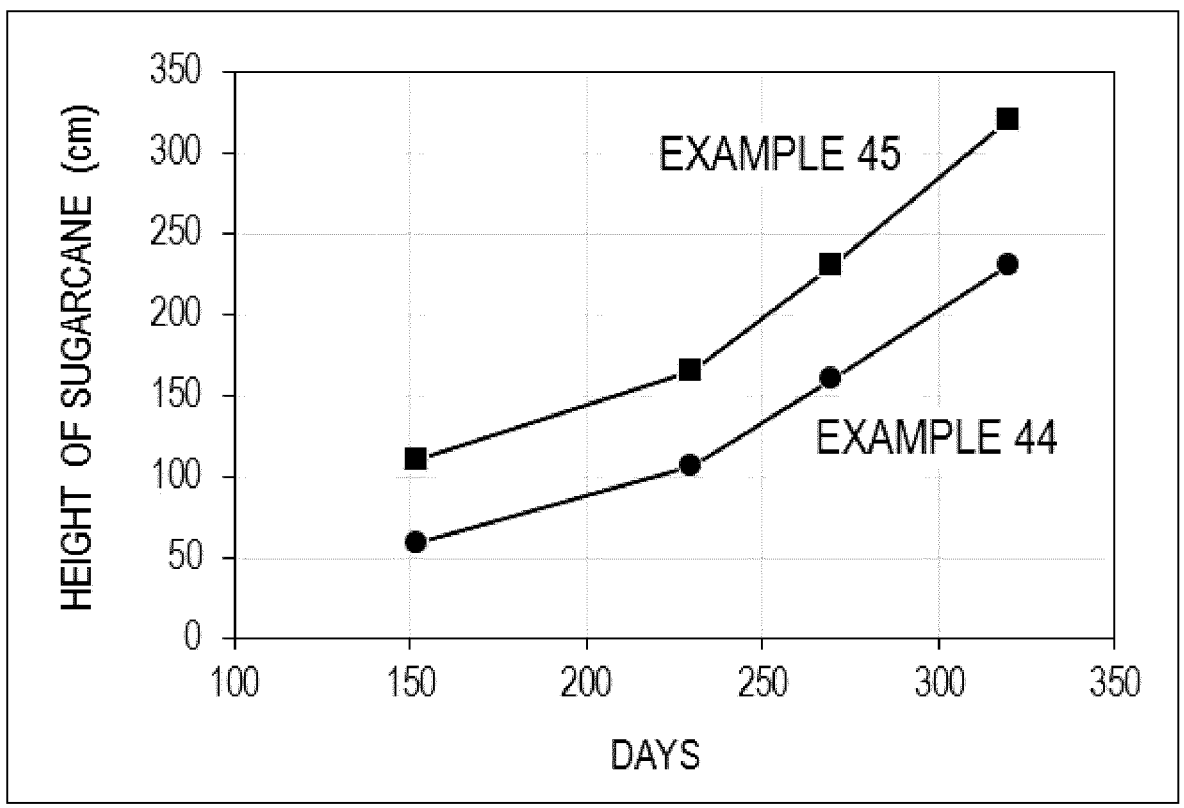
FIG. 22 shows the height of sugarcane grown using the fertilizers of Examples 48 and 49 measured on days 152, 230, 270 and 320 after planting.

FIG. 22 shows the height of the sugarcane grown using the fertilizers of Examples 44 (comparative) and 45 measured on day 152, 230, 270 and 320. Example 45 allows growing taller sugar cane.

Figure 23:
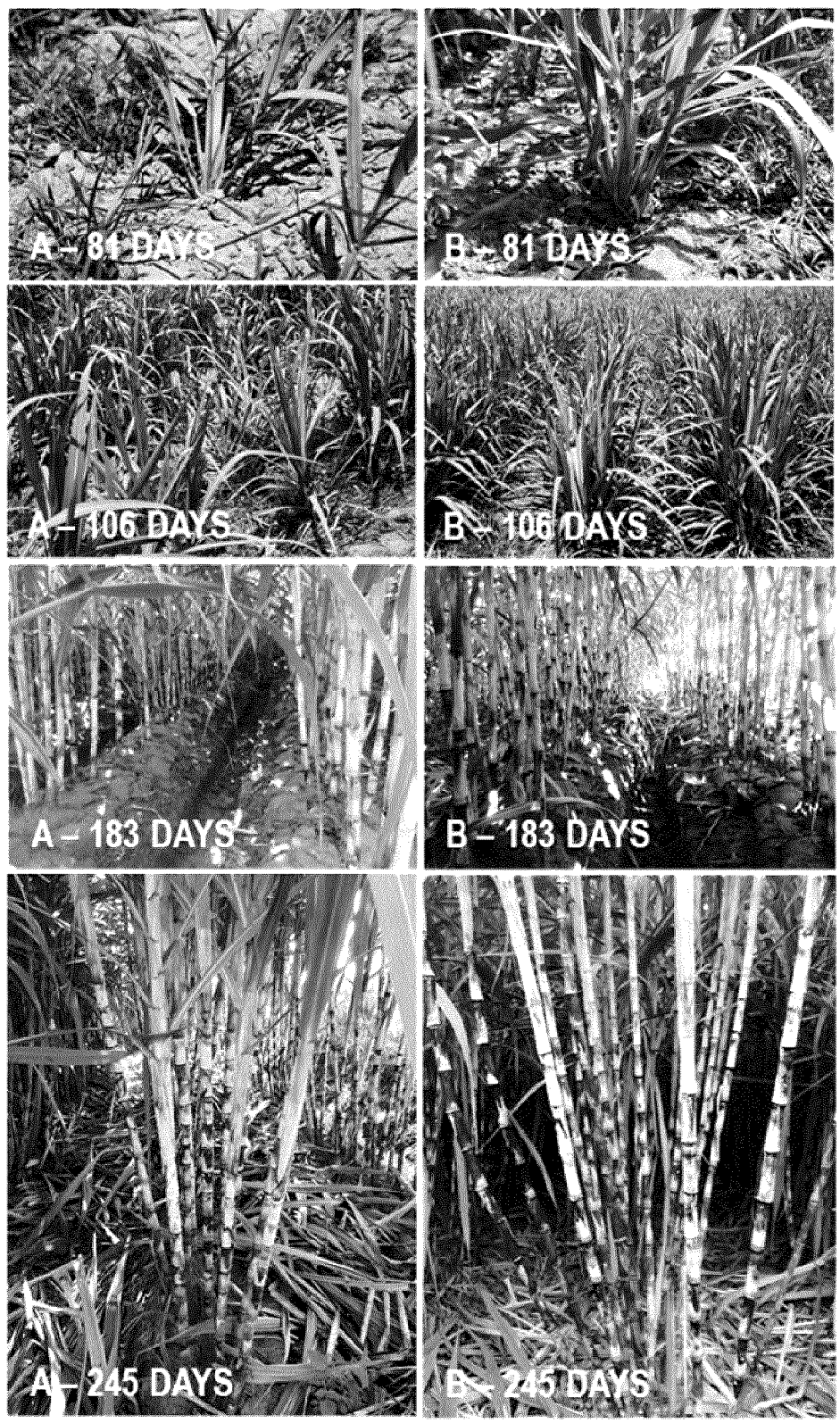
FIG. 23 is a series of photographs of sugarcane grown using the fertilizers of Examples 48 (A, left column) and 49 (B, right column) taken on days 81, 106, 183, and 245 after planting (from top to bottom)

FIG. 23 is a series of photographs of sugarcane grown using the fertilizers of Examples 44 (A, left column) and 45 (B, right column) taken on days 81, 106, 183, and 245 (from top to bottom).

Figure 24:
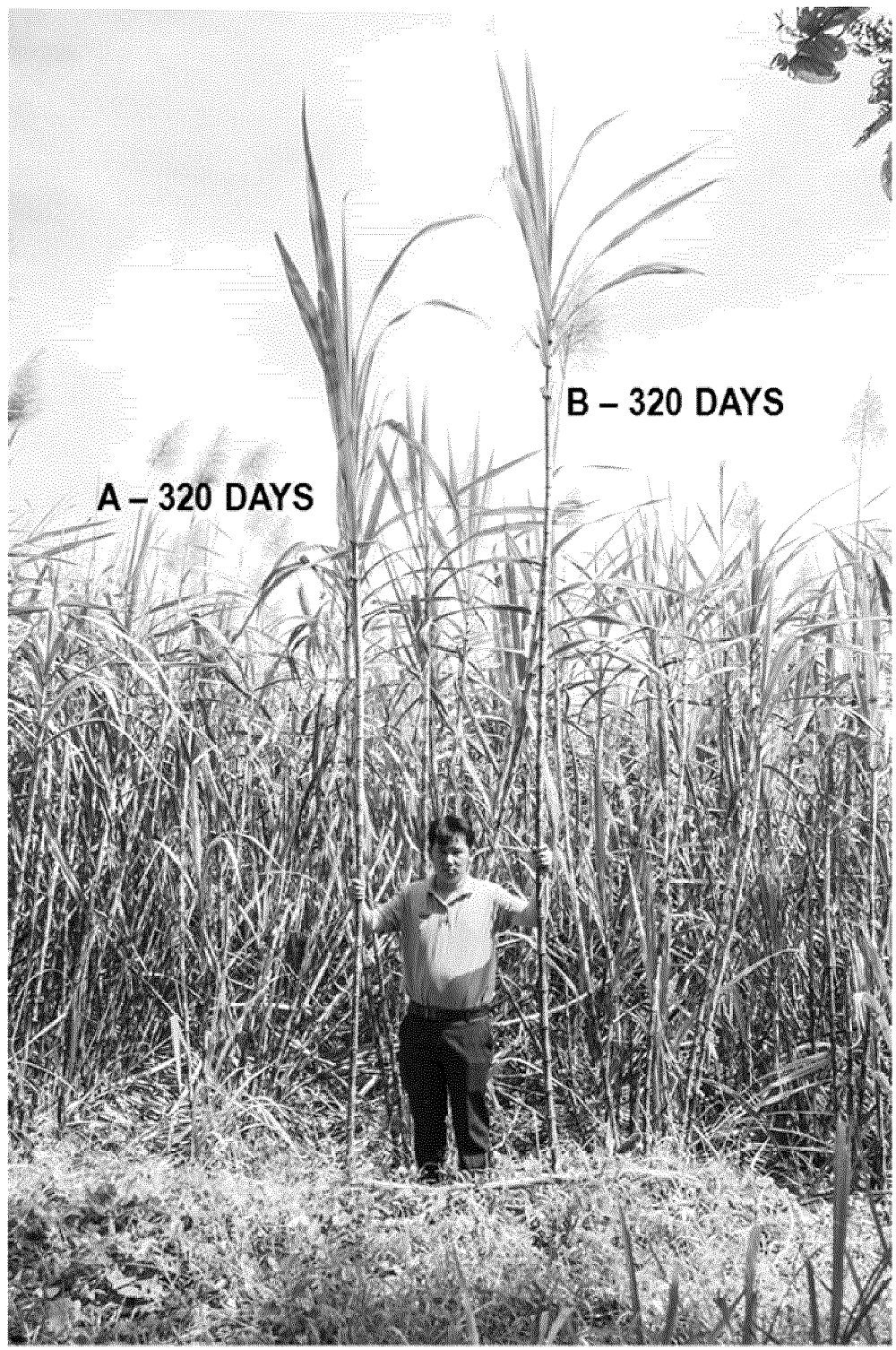
FIG. 24 is a photograph of sugarcane grown using the fertilizers of Examples 48 (A, on the left) and 49 (B, on the right) taken on day 320 after planting.

FIG. 24 is a photograph of sugarcane grown using the fertilizers of Examples 44 (A, on the left) and 45 (B, on the right) taken on day 320.

The yield of sugarcane grown with Example 49 was 56.5% higher than the yield of sugarcane grown with Example 48. The Brix and CCS, which are standard measurements in the sugarcane industry, were also more elevated when the fertilizer of Example 49 was used. Brix representing the sugar content of the sugarcane juice (i.e. the number of grams of sugar contained in 100 grams of sugarcane juice). CCS (Commercial Can Sugar) represents the total recoverable sugar percent in the cane.

| | Example 48 (comparative) | Example 49 |
|---|---|---|
| Yield (Ton/Ha) | 145.49 | 227.76 |
| Brix | 19.85% | 22.85% |
| CCS | 9.6% | 11.6% |

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

Varadachari Chandrika and Goertz Harvey M (2010), Slow-release and Controlled-release Nitrogen Fertilizers, In ING Bulletins on Regional Assessment of Reactive Nitrogen, Bulletin No. 11, (Ed. Bijay Singh), SCON-ING, New Delhi, pp i-iv & 1-42. My T:

U.S. Pat. No. 5,089,041;
U.S. Pat. No. 7,267,707;
Chinese patent CN 101875584; and
Chinese patent CN 104355874.

The invention claimed is:

1. A smart release potash fertilizer granule comprising:
a potash core;
an extended release layer covering the potash core, wherein the extended release layer comprises water-swellable copolymeric nanoparticles and at least one water-soluble organic acid or water-soluble organic carboxylate salt;
a controlled release layer covering the extended release layer, wherein the controlled release layer comprises water-swellable copolymeric nanoparticles; and
an anticaking layer covering the controlled release layer, wherein the anticaking layer comprises water-insoluble copolymeric nanoparticles.

2. The fertilizer granule of claim 1, wherein the copolymer making the water-insoluble copolymeric nanoparticles comprises repeat units comprising a plant hormone or a phosphorus solubilizer covalently or ionically attached as a pendant group.

3. The fertilizer granule of claim 2, wherein the copolymer making the water-insoluble copolymeric nanoparticles is of formula (II):

wherein:
Y1 represents styrene repeat units;
Y2 represents alkyl acrylate or alkyl methacrylate repeat units;
Y3 represents said repeat units comprising said plant hormone or said phosphorus solubilizer covalently or ionically attached as a pendant group;
a and b represents the weight percent of repeat units Y1 and Y2, respectively, based on the total weight of the copolymer, and vary between about 10 wt % to about 95 wt %; and
c represents the weight percent of repeat units Y3, based on the total weight of the copolymer, and vary between 0 wt % to about 30 wt %.

4. The fertilizer granule of claim 3, wherein Y3 represents repeat units of formula (III):

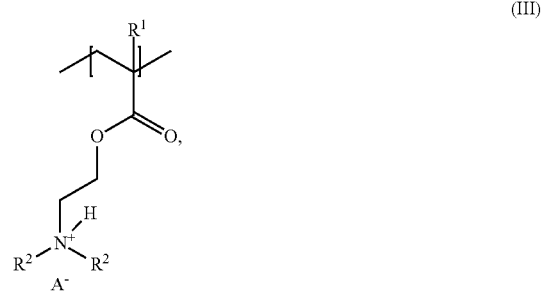

wherein:
$R^1$ is a hydrogen atom or methyl;
$R^2$ is the same or different $C_{1-6}$ alkyl; and
$A^-$ is a carboxylate anion of an organic acid that is a plant hormone or a phosphorus solubilizer.

5. The fertilizer granule of claim 4, wherein Y3 is a repeat unit obtained by polymerizing the following monomers:

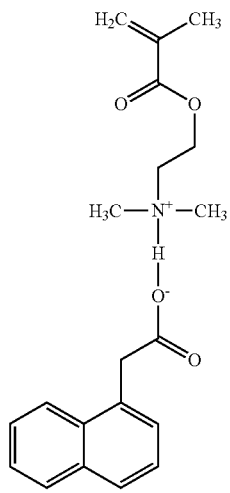

[2-(methacryloyloxy)ethyl]dimethyl-ammonium 1-naphthaleneacetate salt,

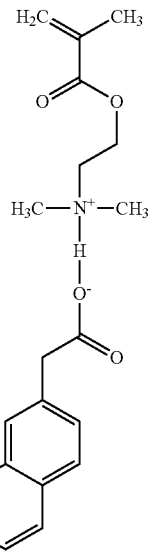

[2-(methacryloyloxy)ethyl]dimethyl-ammonium 1-naphthaleneacetate salt,

-continued

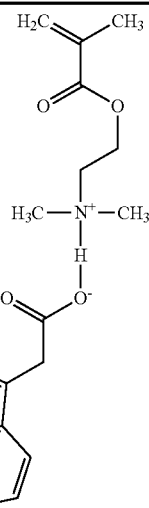

[2-(methacryloyloxy)ethyl]dimethyl-ammonium 3-indole acetate salt,

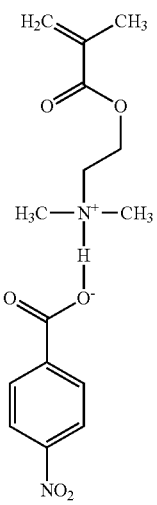

[2-(methacryloyloxy)ethyl]dimethyl-ammonium p-nitrobenzoate salt,

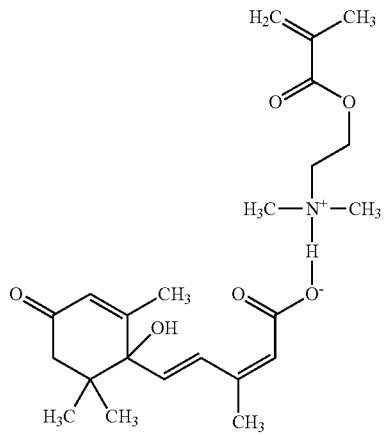

[2-(methacryloyloxy)ethyl]dimethyl-ammonium abscisicate salt,
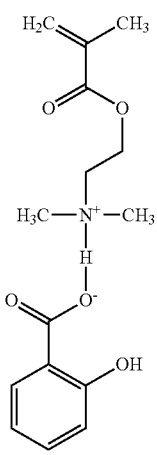
[2-(methacryloyloxy)ethyl]dimethyl-ammonium 2-hydroxybenzoate salt,
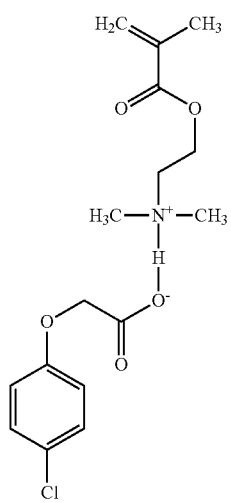
[2-(methacryloyloxy)ethyl]dimethyl-ammonium (4-chlorophenoxy) acetoate,
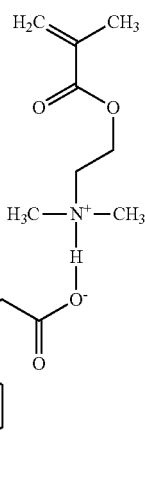
[2-(methacryloyloxy)ethyl]dimethyl-ammonium (2,4-dichlorophenoxy) acetoate,
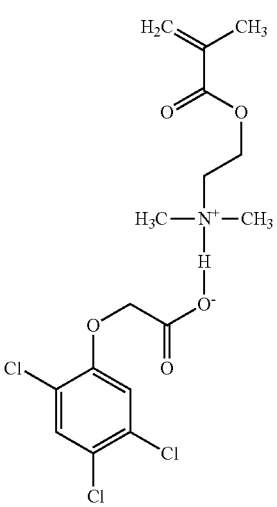
[2-(methacryloyloxy)ethyl]dimethyl-ammonium (2,4,5-trichlorophenoxy) acetoate,

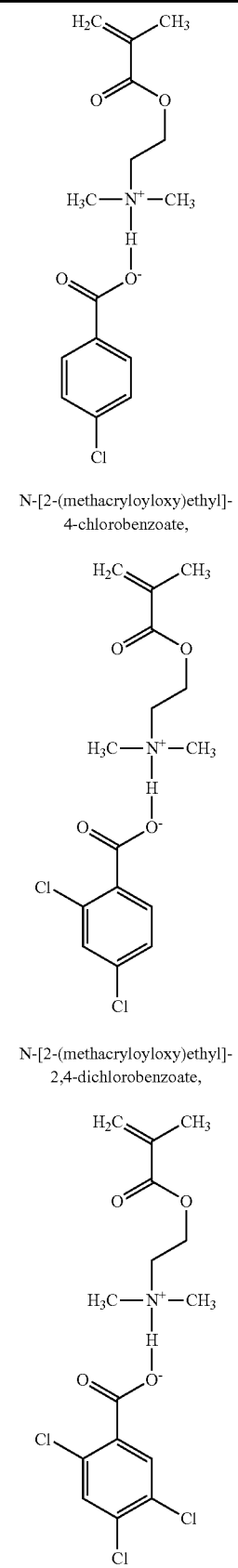
N-[2-(methacryloyloxy)ethyl]-
4-chlorobenzoate,
N-[2-(methacryloyloxy)ethyl]-
2,4-dichlorobenzoate,
N-[2-(methacryloyloxy)ethyl]-
2,4,5-trichlorobenzoate,
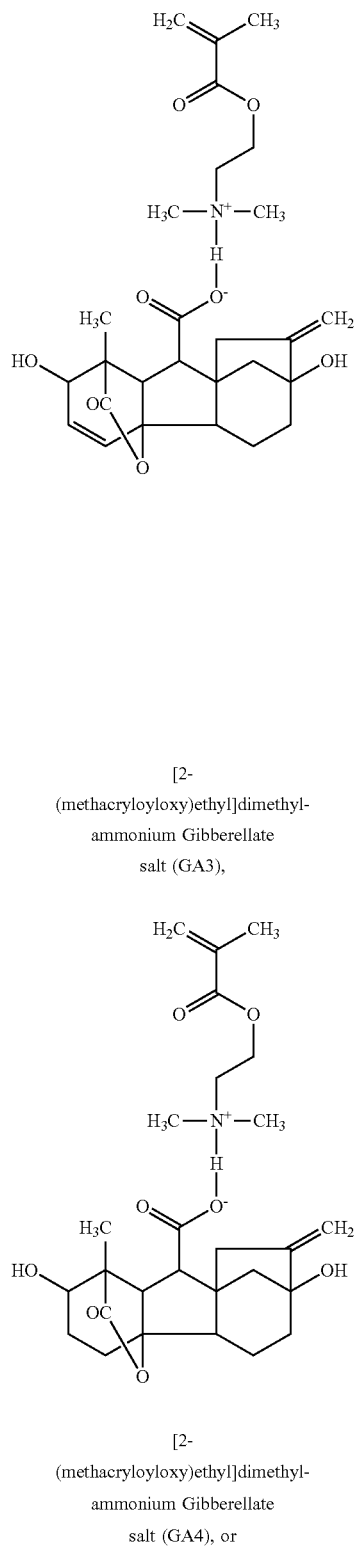
[2-(methacryloyloxy)ethyl]dimethyl-
ammonium Gibberellate
salt (GA3),
[2-(methacryloyloxy)ethyl]dimethyl-
ammonium Gibberellate
salt (GA4), or

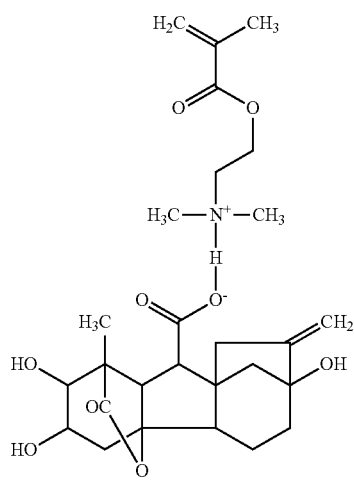

[2-(methacryloyloxy)ethyl]dimethyl-
ammonium Gibberellate
salt (GA13).

6. The fertilizer granule of claim 3, wherein Y3 represents repeat units of formula (IV):

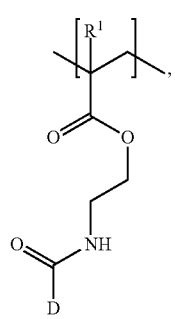

wherein:
R$^1$ is a hydrogen atom or methyl;
D-C(=O)— is a residue of an organic acid that is a plant hormone or a phosphorus solubilizer.

7. The fertilizer granule of claim 6, wherein the copolymer of formula (II) has the following chemical structure:

POLY-012,

POLY-013,

POLY-014, or

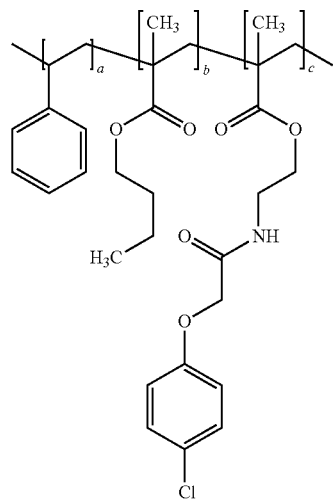
POLY-015.
8. The fertilizer granule of claim 3, wherein the copolymer of formula (II) has the following chemical structure:
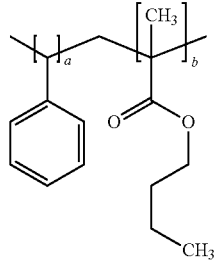
POLY-004,
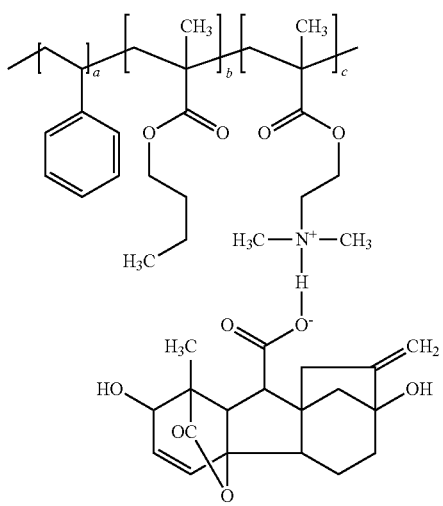
POLY-005/POLY-006,
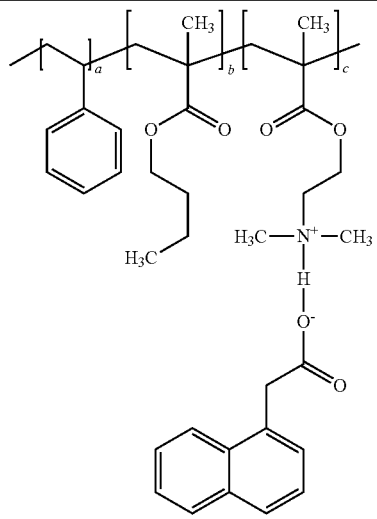
POLY-007/POLY-008,
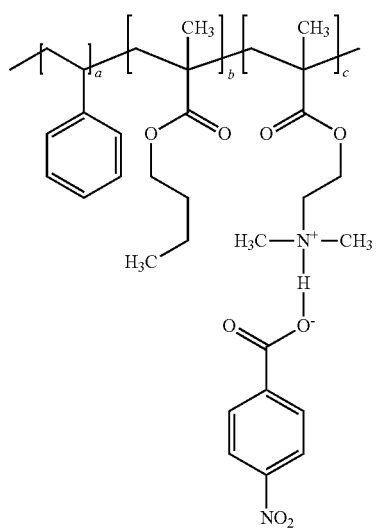
POLY-009,
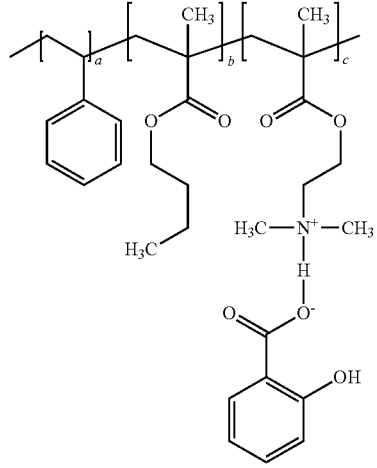
POLY-010, or

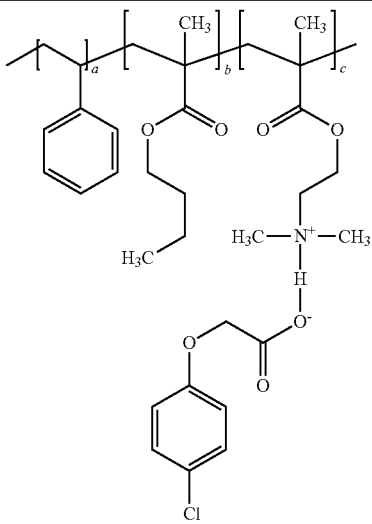

POLY-011.

9. The fertilizer granule of claim 2, wherein the plant hormone or phosphorus solubilizer is:

a residue of an organic acid that is a plant hormone or a phosphorus solubilizer or an organic carboxylate anion of an organic acid that is a plant hormone or a phosphorus solubilizer.

10. The fertilizer granule of claim 9, wherein the organic acid that is a plant hormone or a phosphorus solubilizer is:

a phosphorus solubilizer which is citric acid, lauric acid, alkyl sulfuric acid, oxalic acid, or gluconic acid, or a salt thereof, or a plant hormone which is:
abscisic acid,
an auxin,
a gibberellin,
gluconic acid,
salicylic acid,
jasmonic acid,
oxalic acid,
citric acid, or
pipecolic acid, or a salt thereof.

11. The fertilizer granule of claim 9, wherein the organic acid that is a plant hormone or a phosphorus solubilizer is gibberellic acid, indole-3-acetic acid, 1-naphthalene acetic acid, 2-naphthalene acetic acid, 4-nitrobenzoic acid, 4-chlorophenyloxyacetic acid, or salicylic acid.

12. The fertilizer granule of claim 1, wherein the organic acid or the organic carboxylate salt is a phosphorus solubilizer or a plant hormone.

13. The fertilizer granule of claim 12, wherein the phosphorus solubilizer is citric acid, lauric acid, alkyl sulfuric acid, oxalic acid, or gluconic acid, or a salt thereof.

14. The fertilizer granule of claim 12, wherein the plant hormone is 1-naphthalene acetic acid or gibberellic acid, or a salt thereof.

15. The fertilizer granule of claim 1, wherein the copolymer making the water-swellable copolymeric nanoparticles comprised in the extended release layer is of formula (I):

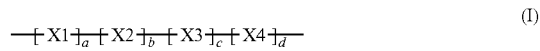

wherein:

X1 represents styrene repeat units;

X2 represents alkyl acrylate or alkyl methacrylate repeat units;

X3 represents alkoxy dialkyl vinylsilane, dialkoxy alkyl vinylsilane, or trialkoxy vinylsilane repeat units;

X4 represents acrylic acid, methacrylic acid, acrylamide, methacrylamide, vinyl phosphoric acid, or N,N-dimethylaminoethyl methacrylamide repeat units; and a, b, c and d represent the weight percent of repeat units X1, X2, X3, and X4, respectively, based on the total weight of the copolymer, and each vary between about 0.5 wt % and about 50 wt %, wherein the X3 repeat units are optionally crosslinked with each other within the nanoparticles.

16. The fertilizer granule of claim 15, wherein up to about 3% of the X3 repeat units are crosslinked with each other within the nanoparticles.

17. The fertilizer granule of claim 15, wherein the copolymer of formula (I) has the following chemical structure:

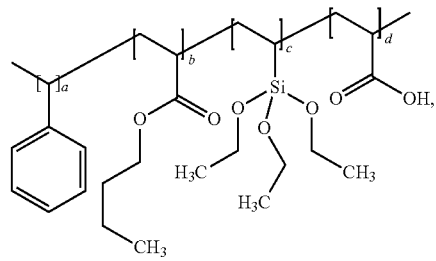

POLY-001

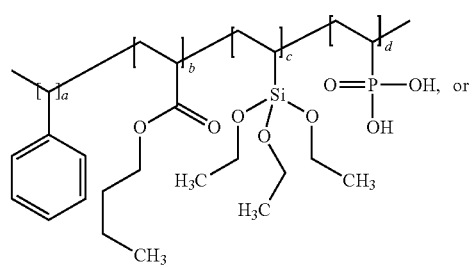

POLY-002

-continued

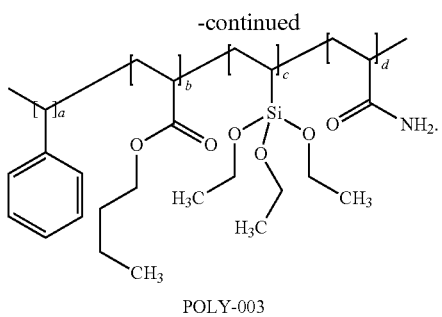

POLY-003

18. The fertilizer granule of claim 1, wherein the extended release layer comprises the organic carboxylate salt.

19. The fertilizer granule of claim 18, wherein the organic carboxylate salt is an alkaline carboxylate salt or alkaline earth carboxylate salt.

20. The fertilizer granule of claim 12, wherein the plant hormone is:
abscisic acid,
an auxin,
a gibberellin,
gluconic acid,
salicylic acid,
jasmonic acid,
oxalic acid,
citric acid, or
pipecolic acid,
or a salt thereof.

21. The fertilizer granule of claim 1, wherein the copolymer making the water-swellable copolymeric nanoparticles comprised in the controlled release layer is of formula (I):

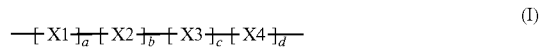

wherein:
X1 represents styrene repeat units;
X2 represents alkyl acrylate or alkyl methacrylate repeat units;
X3 represents alkoxy dialkyl vinylsilane, dialkoxy alkyl vinylsilane, or trialkoxy vinylsilane repeat units;
X4 represents acrylic acid, methacrylic acid, acrylamide, methacrylamide, vinyl phosphoric acid, or N,N-dimethylaminoethyl methacrylamide repeat units; and
a, b, c and d represent the weight percent of repeat units X1, X2, X3, and X4, respectively, based on the total weight of the copolymer, and each vary between about 0.5 wt % and about 50 wt %,
wherein the X3 repeat units are optionally crosslinked with each other within the nanoparticles.

22. The fertilizer granule of claim 1, wherein the controlled release layer is free from the water-soluble organic acid or the water-soluble organic carboxylate salt.

* * * * *